June 30, 1936. A. W. MILLS 2,046,082
MANUAL AND RECORD CONTROLLED MACHINE
Filed Feb. 27, 1935 19 Sheets-Sheet 1

June 30, 1936.  A. W. MILLS  2,046,082
MANUAL AND RECORD CONTROLLED MACHINE
Filed Feb. 27, 1935  19 Sheets-Sheet 2

INVENTOR.
Albert W. Mills
BY
W. M. Wilson
ATTORNEYS.

June 30, 1936.  A. W. MILLS  2,046,082

MANUAL AND RECORD CONTROLLED MACHINE

Filed Feb. 27, 1935   19 Sheets-Sheet 3

INVENTOR.
Albert W. Mills
BY
ATTORNEYS.

June 30, 1936.　　　A. W. MILLS　　　2,046,082
MANUAL AND RECORD CONTROLLED MACHINE
Filed Feb. 27, 1935　　　19 Sheets-Sheet 4

INVENTOR
Albert W. Mills
BY
ATTORNEY

June 30, 1936. A. W. MILLS 2,046,082
MANUAL AND RECORD CONTROLLED MACHINE
Filed Feb. 27, 1935 19 Sheets-Sheet 5

INVENTOR
Albert W. Mills
BY
ATTORNEY

June 30, 1936.  A. W. MILLS  2,046,082
MANUAL AND RECORD CONTROLLED MACHINE
Filed Feb. 27, 1935    19 Sheets-Sheet 6

INVENTOR
Albert W. Mills
BY
ATTORNEY

June 30, 1936. A. W. MILLS 2,046,082
MANUAL AND RECORD CONTROLLED MACHINE
Filed Feb. 27, 1935 19 Sheets-Sheet 7
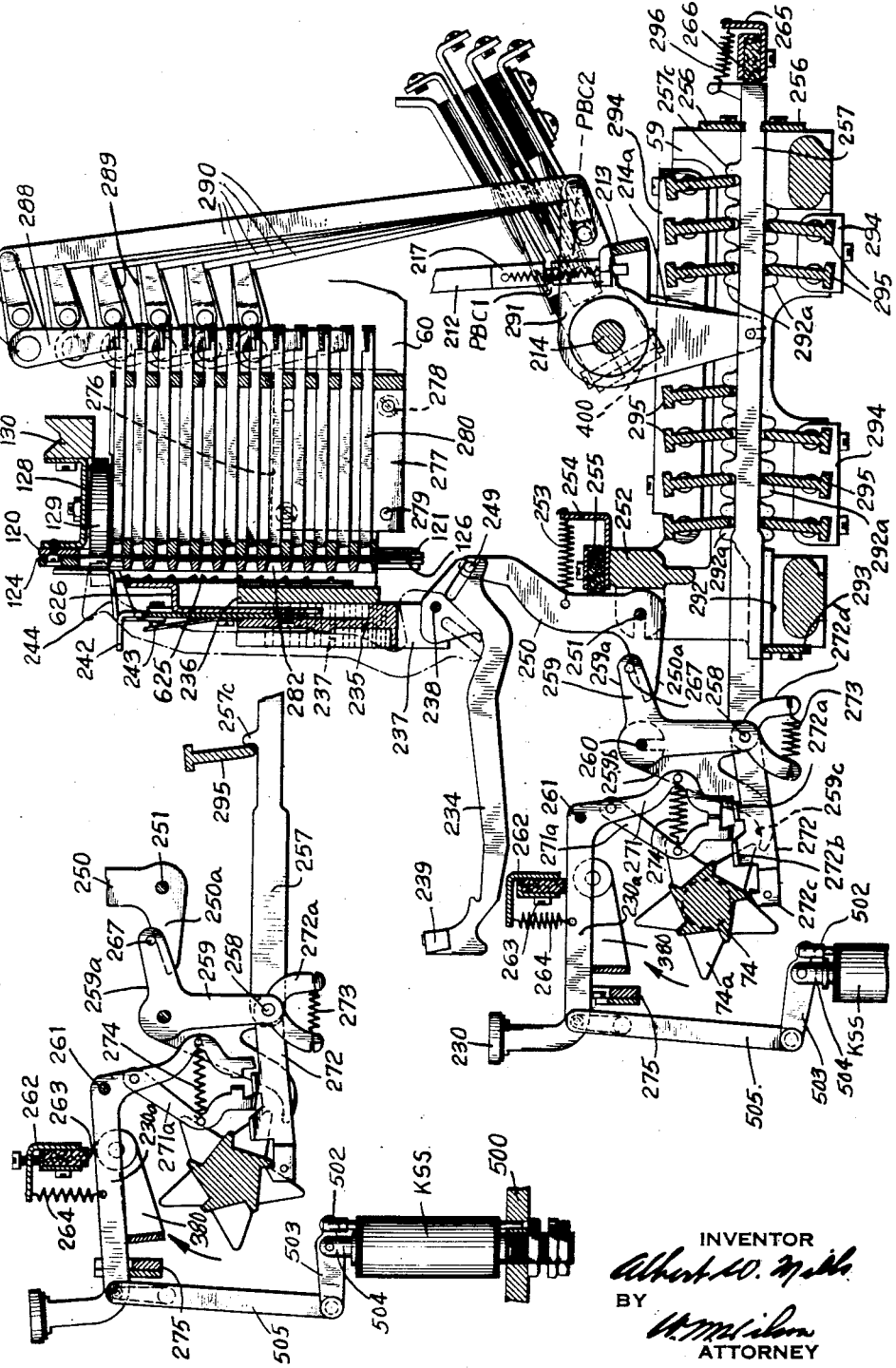

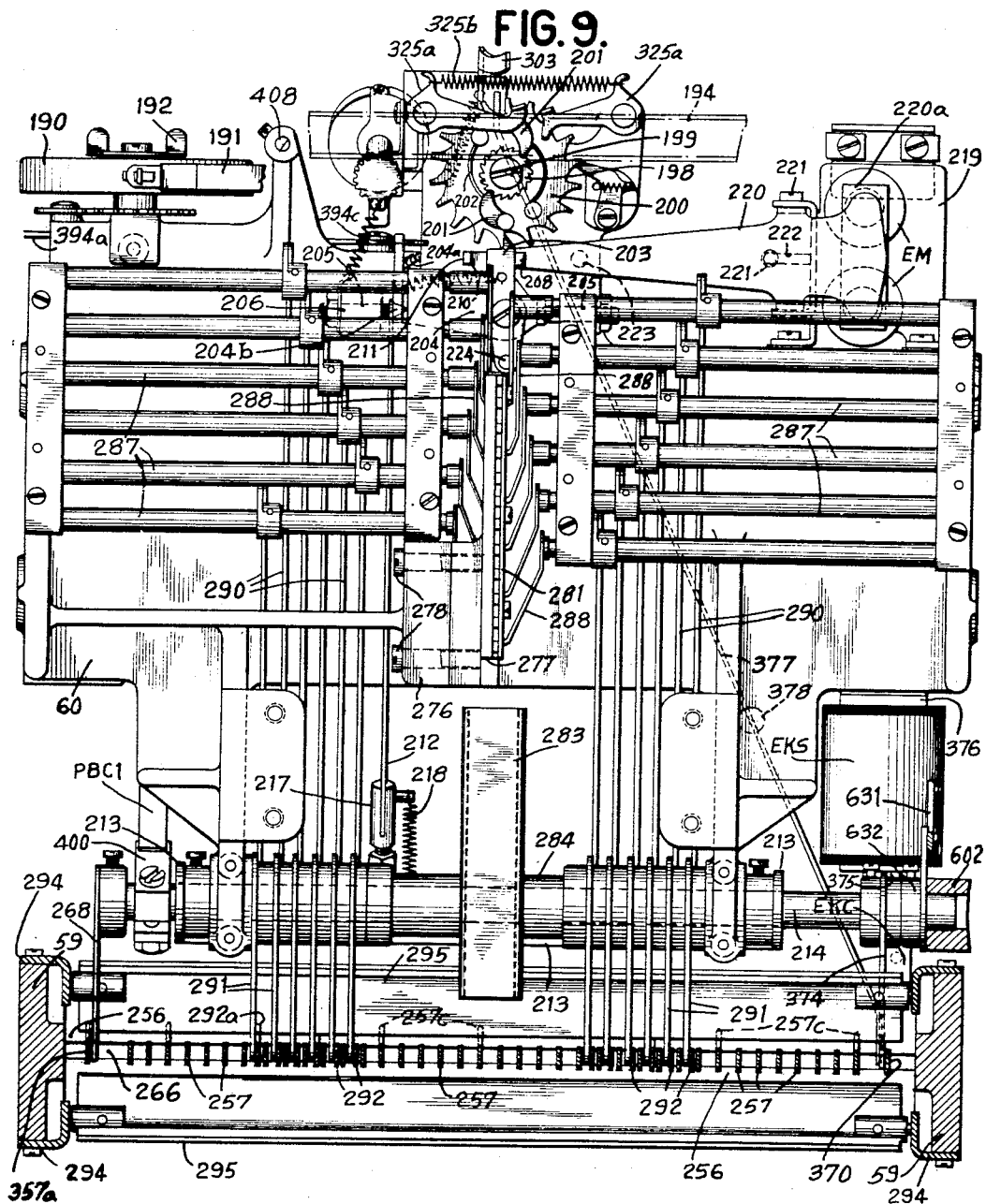

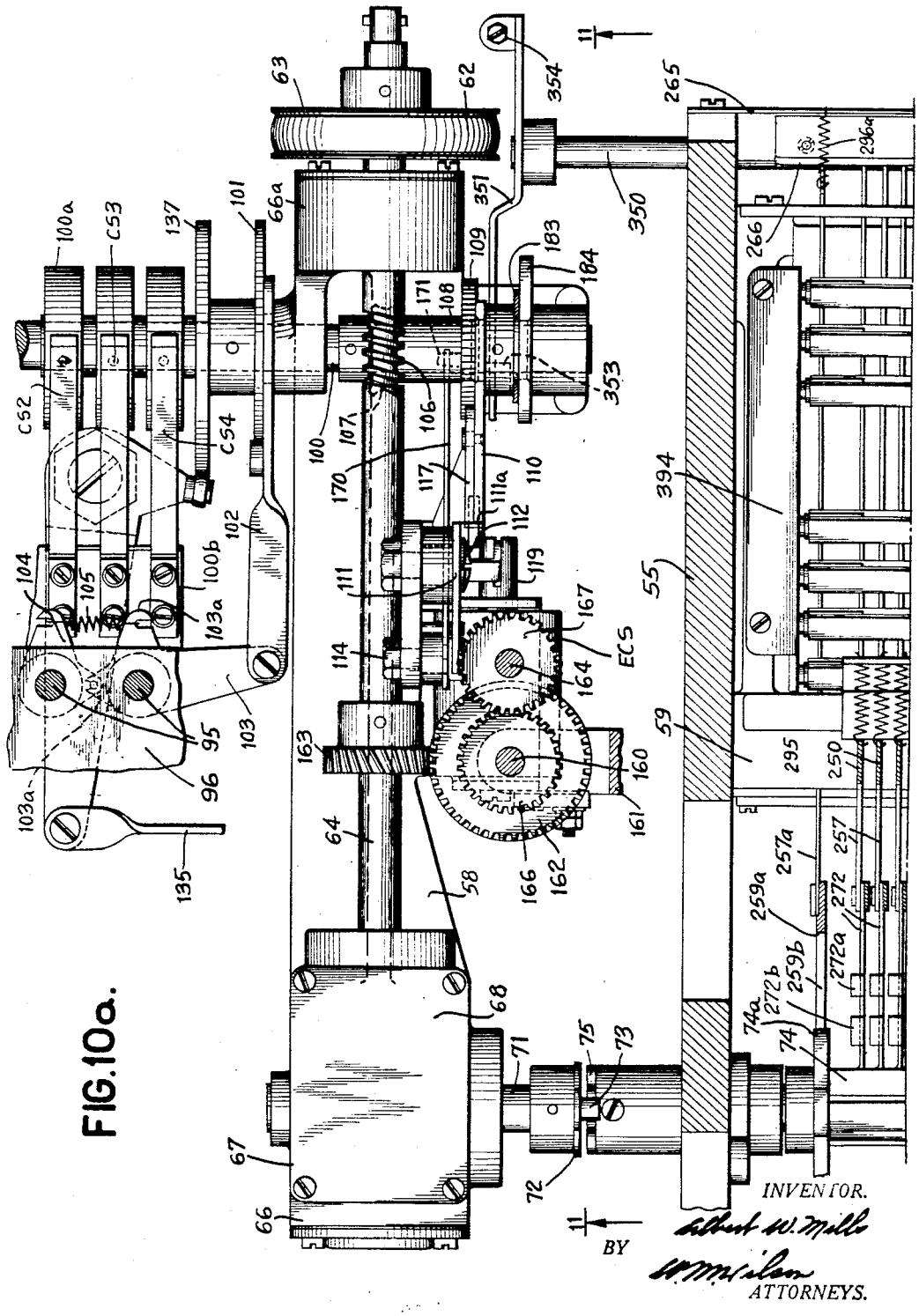

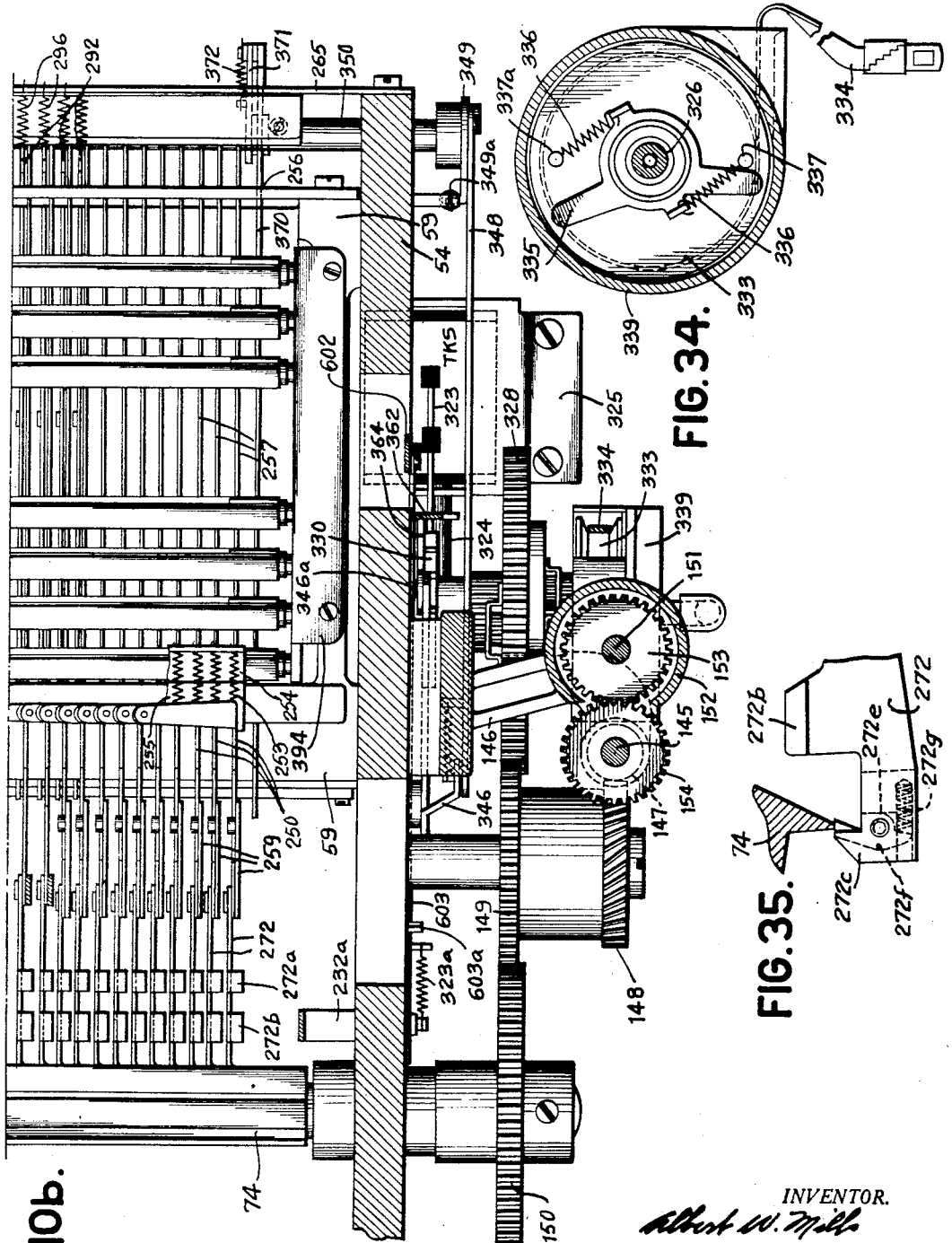

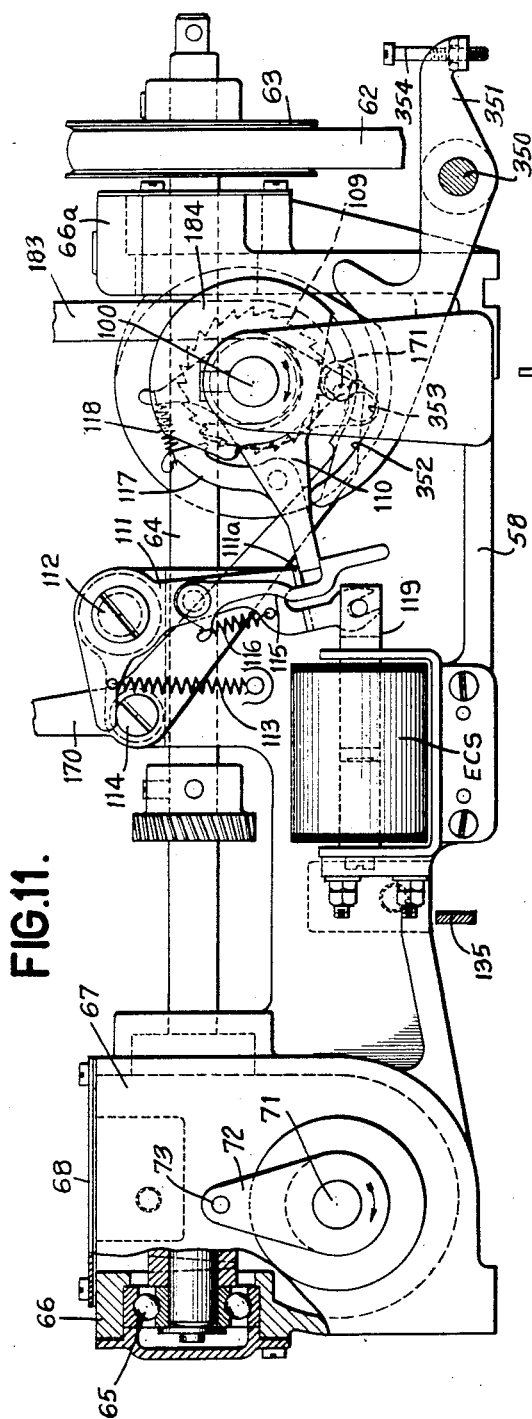

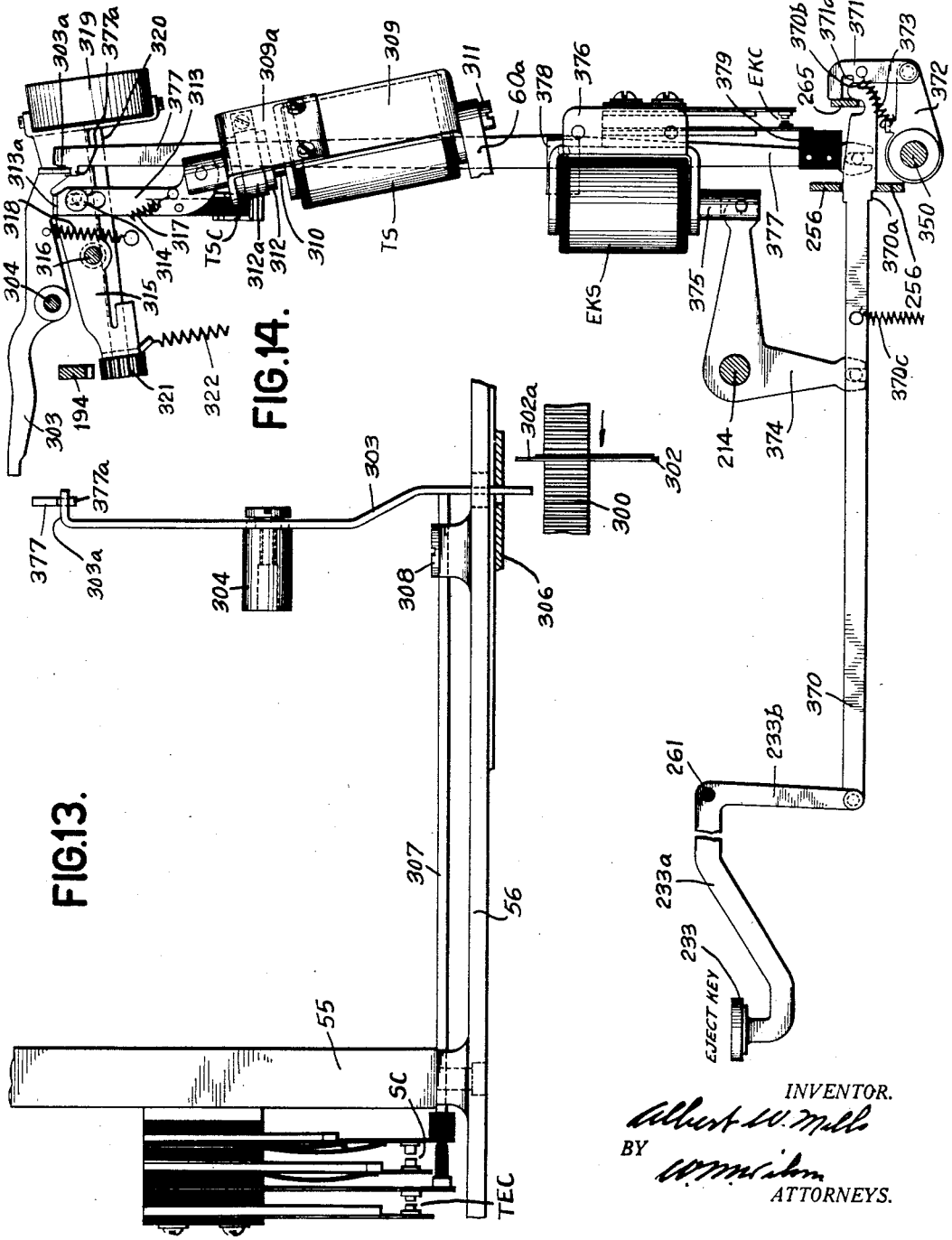

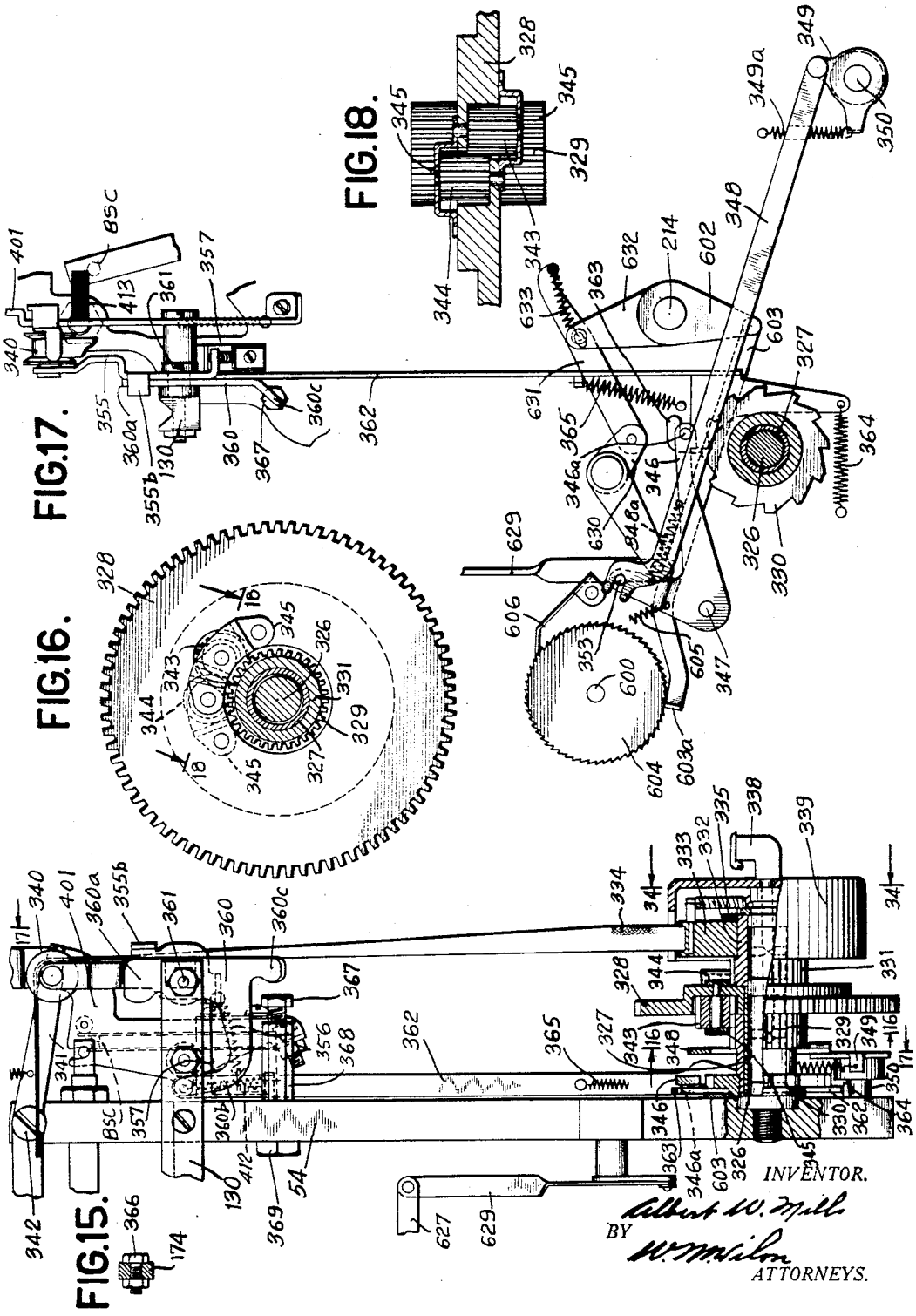

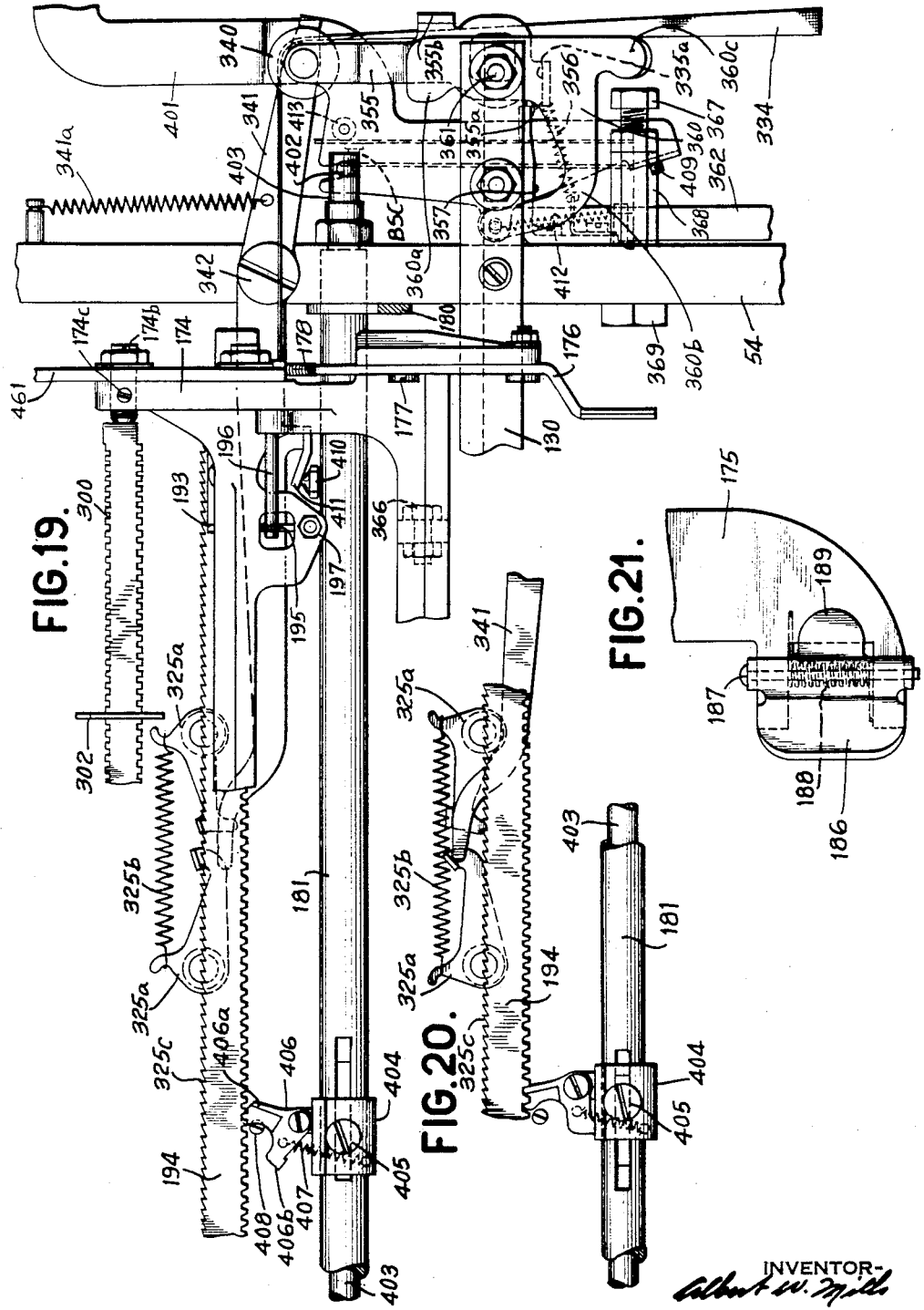

June 30, 1936.  A. W. MILLS  2,046,082
MANUAL AND RECORD CONTROLLED MACHINE
Filed Feb. 27, 1935   19 Sheets-Sheet 15
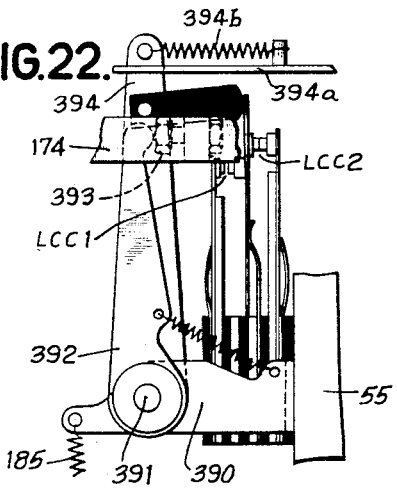
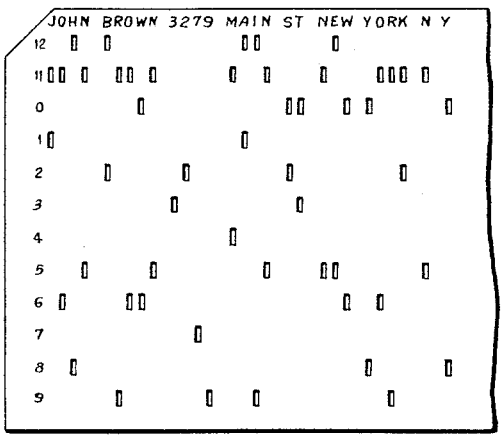
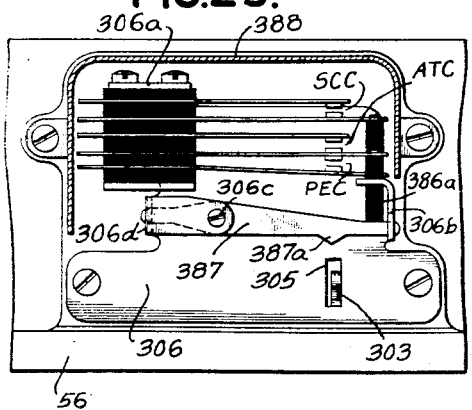
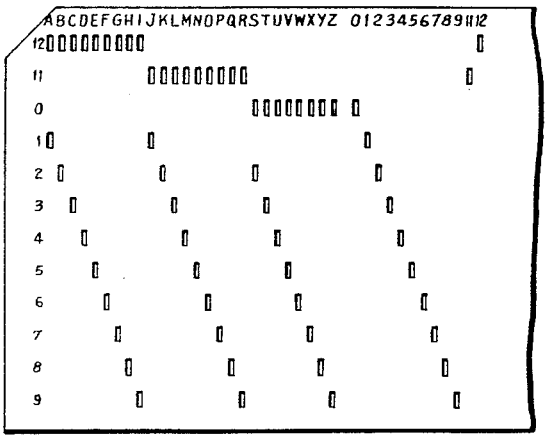
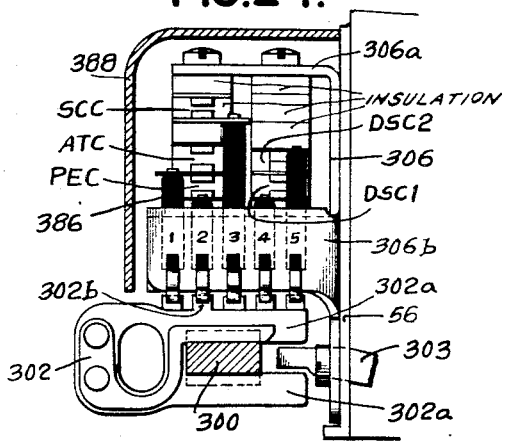
*INVENTOR.*
Albert W. Mills
BY
*ATTORNEYS.*

June 30, 1936. A. W. MILLS 2,046,082
MANUAL AND RECORD CONTROLLED MACHINE
Filed Feb. 27, 1935 19 Sheets-Sheet 16
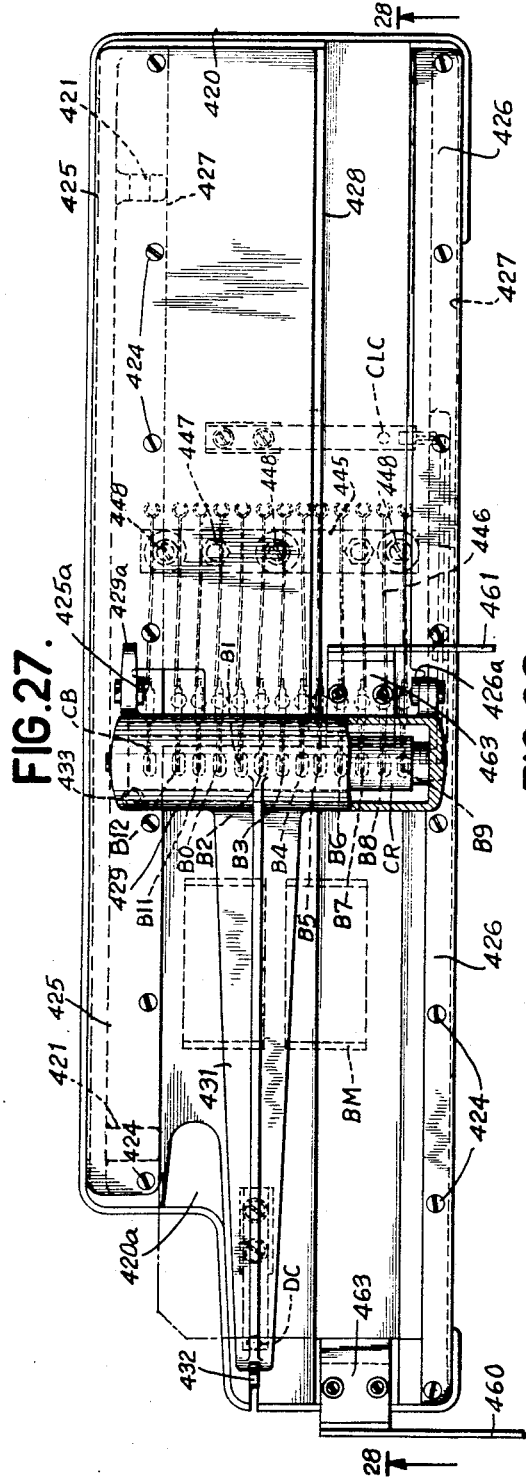
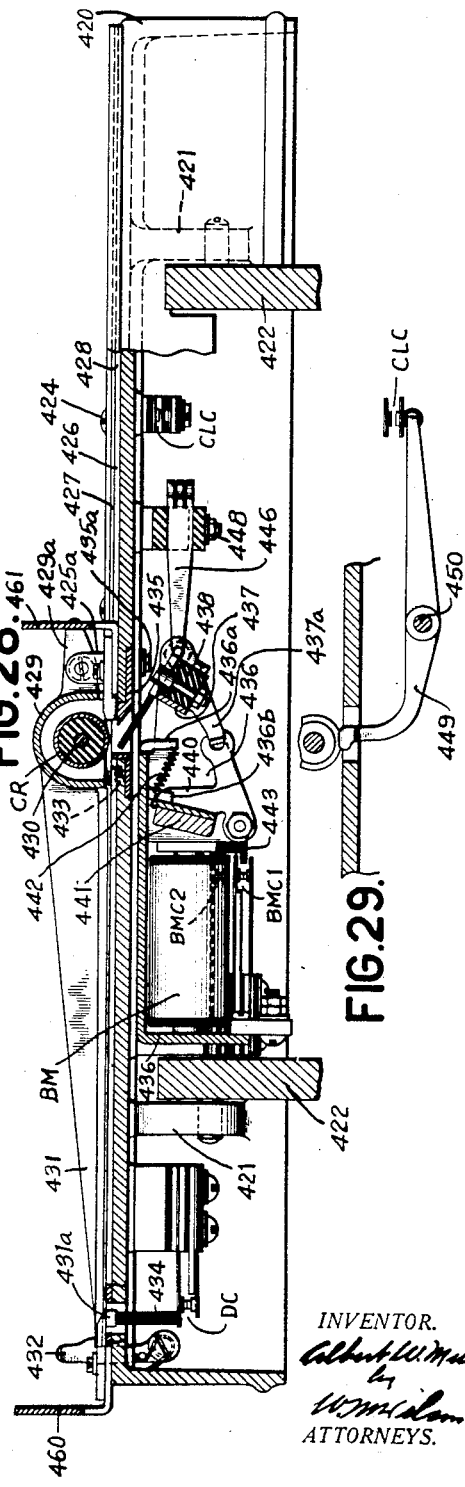
INVENTOR.
Albert W Mills
ATTORNEYS.

June 30, 1936.　　　A. W. MILLS　　　2,046,082

MANUAL AND RECORD CONTROLLED MACHINE

Filed Feb. 27, 1935　　19 Sheets-Sheet 18

June 30, 1936.  A. W. MILLS  2,046,082
MANUAL AND RECORD CONTROLLED MACHINE
Filed Feb. 27, 1935  19 Sheets-Sheet 19
FIG. 36.
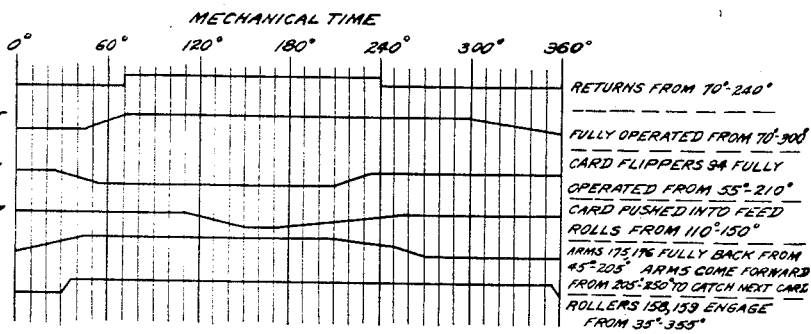
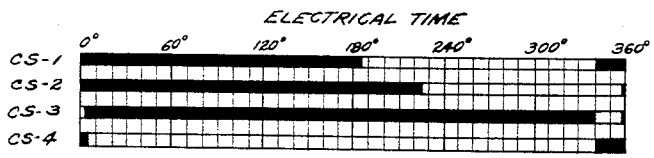
FIG. 38.
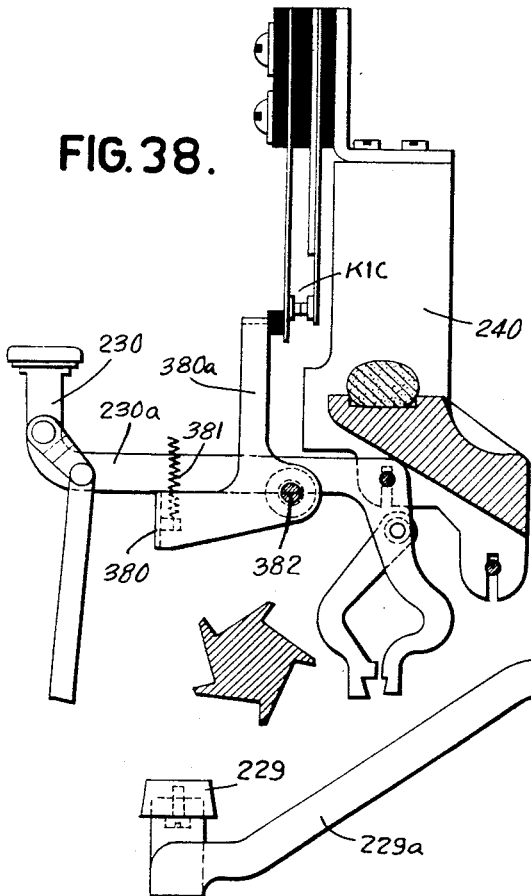
FIG. 37.
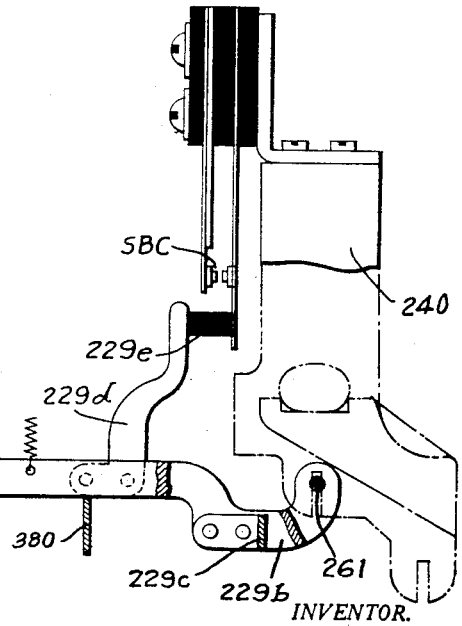
INVENTOR.
Albert W. Mills
BY
ATTORNEYS.

Patented June 30, 1936

2,046,082

UNITED STATES PATENT OFFICE 2,046,082

MANUAL AND RECORD CONTROLLED MACHINE

Albert W. Mills, Endicott, N. Y., assignor to International Business Machines Corporation, New York, N. Y., a corporation of New York Application February 27, 1935, Serial No. 8,445

70 Claims. (Cl. 164—113)

This invention relates to accounting machines in general.

The broad object of the invention is to provide a machine for punching data in accounting and statistical records such as those used in the well known Hollerith and Powers accounting machines.

An object is to provide a machine for printing data on accounting and statistical records.

Another object is to provide a machine designed to automatically duplicate either all or only selected portions of the data on a master record as by punching and/or printing such data in another record.

A further object is to provide a combined record punching and printing machine which can be operated completely automatically without intervention by the operator.

Still another object is to provide a novel power drive mechanism for the punching and/or printing mechanisms of accounting machines, typewriting machines, punching machines, and the like.

An object is to provide a positively engaging power drive mechanism for punches and/or type bars which is designed to prevent mis-operations or incomplete operations of punches and/or typebars.

Another object is to provide a combined typewriting and punching machine which may be completely electrically controlled.

A further object is to provide an improved automatic column skipping mechanism or tabulating mechanism.

Another object is to provide a novel record ejecting mechanism which is controlled automatically by movement of the carriage which feeds the records while they are being punched and/or printed.

Other broad objects are to generally improve record perforating and printing machines by making them simpler, more positive in operation, and less likely to get out of order, and by making them easier to operate.

Other objects will be pointed out specifically in the following description and claims or will be apparent from a study of the description, claims and drawings.

In the drawings:

Fig. 1 is a front elevation of the machine.
Fig. 2 is a top plan view.
Fig. 3 is a vertical section on the line 3—3 in Fig. 1.
Fig. 4 is a vertical section on the line 4—4 in Fig. 1.
Fig. 5 is a vertical section on the line 5—5 in Fig. 1.
Fig. 6 is a partial vertical section, showing the card carriage, card guides, and card feeding roller mechanism.
Fig. 7 is a vertical section showing the keys, type bar operating mechanism, and punch operating connections in normal position.
Fig. 8 is a detail view showing in operated position certain parts appearing in Fig. 7.
Fig. 9 is a front elevation of the punch operating mechanism and escapement mechanism.
Figs. 10a and 10b together form a top plan view, partly in section, of the main power shafts and various driving and operating connections.
Fig. 11 is a vertical section on the line 11—11 in Fig. 10a.
Fig. 12 is a detail view of the tabulating key and its connections.
Fig. 13 is a top plan view of certain parts of the tabulating mechanism.
Fig. 14 is a right side view of the eject key and part of the tabulating mechanism.
Fig. 15 is a front elevation of the carriage return mechanism.
Fig. 16 is a vertical section on the line 16—16 in Fig. 15.
Fig. 17 is a vertical section on the line 17—17 in Fig. 15.
Fig. 18 is a section on the line 18—18 in Fig. 16.
Fig. 19 is an enlarged front elevation of the right hand side of the card carriage and parts operated by or connected thereto.
Fig. 20 is a detail view showing in operated position certain parts appearing in Fig. 19.
Fig. 21 is an enlarged right side elevation of one of the card engaging fingers.
Fig. 22 is an enlarged front elevation of the mechanism for operating the last column contacts.
Fig. 23 is an enlarged front elevation of the contacts controlled by the column stops with the protecting cover shown in section.
Fig. 24 is a vertical section on the line 24—24 in Fig. 6 on a larger scale than Fig. 6.
Fig. 25 is a fragment of a specimen card.
Fig. 26 is a fragment of a card punched and printed to illustrate the combination hole code.
Fig. 27 is an enlarged plan view of the duplicator table.
Fig. 28 is a vertical section on line 28—28 in Fig. 27.
Fig. 29 is a detail view of certain parts shown by dotted lines in Fig. 27.

Figs. 30a and 30b together form a wiring diagram.

Fig. 31 is a top plan view of the escapement mechanism.

Fig. 34 is a vertical section on the line 34—34 in Fig. 15.

Fig. 35 is an enlarged view of one end of an operating hook.

Fig. 36 is a chart showing the electrical and mechanical timing of the machine.

Fig. 37 is a detail view of the space bar.

Fig. 38 is a detail view of the mechanism for operating the key interlock contacts.

Figure 1:
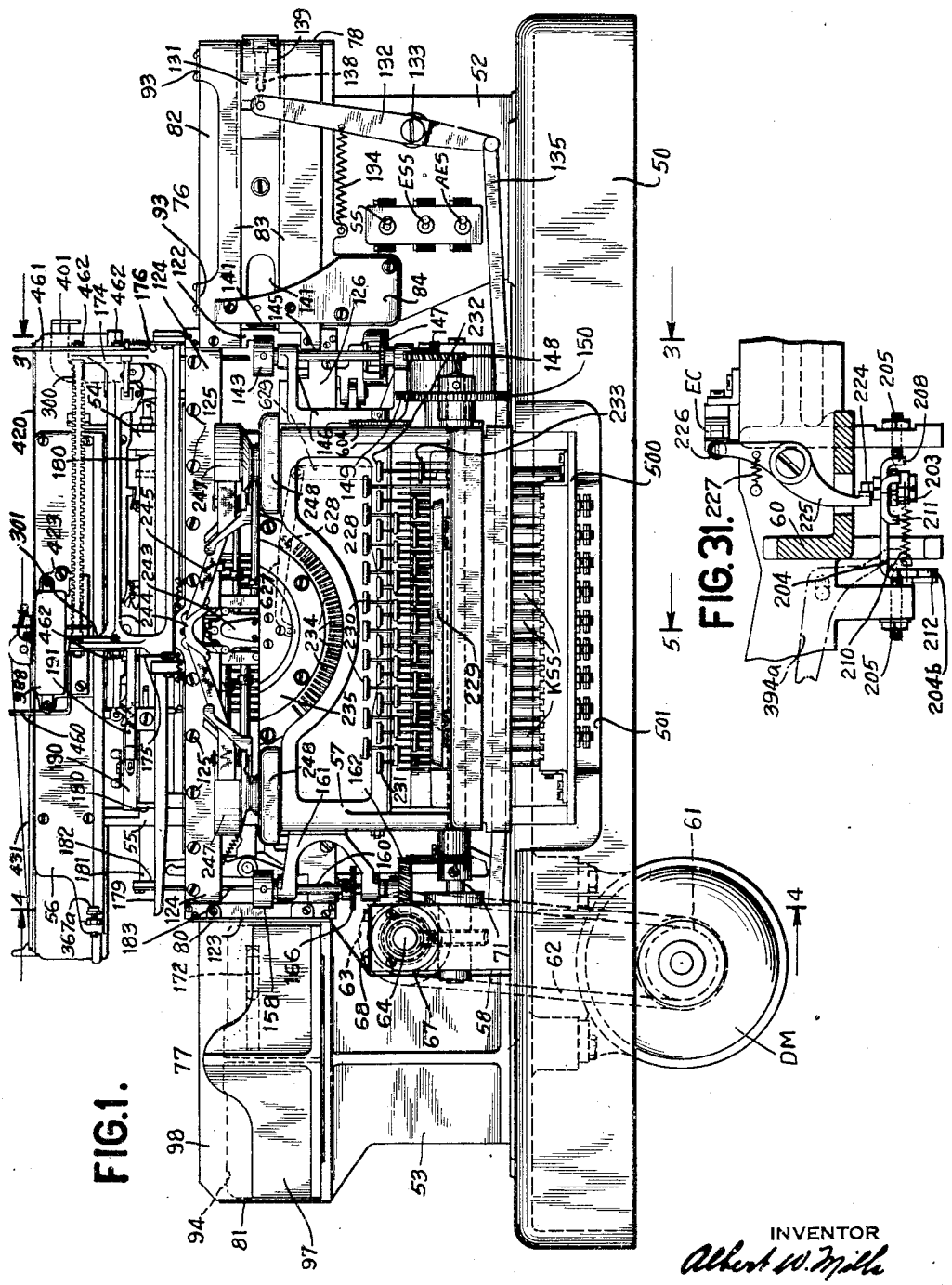

In the following description certain electrical devices such as contacts, magnets, relays, and switches will be mentioned from time to time. As a convenience in understanding their operation, tracing circuits, and so on, these various devices will be identified as far as possible by designating them with capital letters which are derived by taking the initial letters of the principal word or words comprising the name of the part. Thus the relays are designated R1, R2, etc., and the magnets are designated with the letter M preceded by the initial letter of the word denoting the function of the magnet. For example, EM denotes the automatic escapement magnet. This method of designating the electrical devices will make the wiring diagram (Figs. 30a, 30b) easier to understand and as nearly self-explanatory as possible.

I—The card

In Figs. 25 and 26 are shown the left hand halves of two tabulating machine record cards of a type now very commonly used in Hollerith electric tabulating machines. The portion of the card shown in Fig. 25 has been arbitrarily punched and printed to record name and address data in accordance with the code illustrated in Fig. 26. It will be noted that the letters of the alphabet are designated by pairs of holes, each hole of a pair being located in one of the twelve index-point positions of a column. Thus the letter "A" is designated by holes in the "12" and "1" positions of the same column.

It will be noted by reference to the code in Fig. 26 that the alphabet is divided into three groups. The letters of the first group A to I are designated by different combinations of a hole in the "12" position with holes in the "1" to "9" positions; the letters of the second group J to R are designated by a hole in the "11" position in combination with holes in the "1" to "9" positions; while the letters of the third group S to Z are identified by the combinations of a "0" hole with holes in the "2" to "9" positions. If desired, "0" and "1" holes together could be used to designate a punctuation mark or an arbitrary character like "$", but, as punctuation marks and monetary unit symbols are rarely used in tabulating machines, there need not be any character represented by the combination of a "0" hole and a "1" hole.

The code shown in Fig. 26 is quite arbitrary, in fact, several codes have been used or developed heretofore which made use of combinations of two holes to represent all the letters of the alphabet. The numerals are represented by single holes in the "0" to "9" positions.

Holes in the "11" and "12" positions do not ordinarily have any numerical significance but are often used for special control purposes in the tabulating machines, for instance, to identfy debits and credits, for class selection purposes, and so on. The machine described herein must be capable of punching not merely the letters of the alphabet and numerals, but also single holes in either the "11" or "12" positions. In the machine described herein the values "11" and "12" will be printed at the top of the card when "11" and "12" holes occur alone. When they are used as parts of combinations to designate letters only the proper letters will be printed adjacent the top edge of the card as shown in Figs. 25 and 26.

The cards may have as many columns for the reception of punched and printed data as may be desired. Standard cards are in use having 34, 45, and 80 columns for the reception of data. The drawings illustrate a machine designed to punch 80 column cards but obviously the machine could be designed to punch cards having different numbers of columns by suitable changes in the proportions of the machine and in the design of the carriage escapement mechanism to be described in detail herein.

The cards, when punched and printed in accordance with a predetermined plan, may be used in electrically or mechanically controlled accounting and statistical machines, reproducing machines, non-printing card duplicating machines, and automatic multiplying and dividing perforating machines of which a large number of each type are now in everyday use.

II—Framework

The entire mechanism is mounted on a suitable base 50 which is preferably in one piece and supported by four legs (not shown). Secured to this base are a number of frames and sub-frames which are designated 52 to 60 in the various figures. Frames 52, 53 (Fig. 1) support the supply hopper for the blank cards and the storage hopper for the perforated cards, respectively. Frames 54, 55 (Figs. 1 to 6, 10a, 10b, 13, 15, and 19) are spaced parallel to each other and provide the principal support for the mechanisms of the machine. Sub-frame 56 (Figs. 1 to 6) rigidly joins together the upper ends of frames 54, 55. The composite frame 57 secured to frames 54, 55 near the front edge (Fig. 2) of base 50 encloses the keyboard. Frame 58 is mounted on base 50 to the left of frame 55 (Figs. 1, 2, 4, 10a, and 11) and supports the main drive shaft, cam shaft, and cam shaft clutch mechanism. Sub-frame 59 (Figs. 5, 6, 7, 9, 10a, and 10b) joins frames 54, 55 together near base 50 and supports the slide bars which operate the punches and parts associated therewith. Sub-frame 60 (Figs. 5, 6, and 9) is a relatively large central frame mounted on frames 54, 55 and supporting the punches, escapement mechanism, part of the tabulating mechanism, and associated parts.

III—Power drive mechanism

Power to operate the machine is furnished by a drive motor DM (Figs. 1 and 4) having a driving pulley 61 connected by a belt 62 to a driven pulley 63 secured to the main drive shaft 64, the belt 62 passing through an opening in the base 50. The drive mechanism is shown in Figs. 1, 2, 4, 10a, and 11. The front end of shaft 64 is supported by a ball or roller bearing 65 (Fig. 11) mounted in a housing 66 formed in the front end of frame 58, while the rear end of said shaft is similarly supported in housing 66a forming part of the rear end of frame 58.

Near its front end, adjacent housing 66, frame 58 is formed as a gear case generally designated 67 in Figs. 1, 2, 4, 10a, and 11, which is closed by a cover 68 to exclude dirt and prevent spattering of gear lubricant in the case 67. Shaft 64 extends through gear case 67 and secured to said shaft within said case is a worm 69 (Fig. 4) meshing with a worm wheel 70 secured to a short shaft 71 journaled in the walls of the gear case below shaft 64. Shaft 71 extends toward frame 55 a short distance and secured to said shaft is an arm 72 (see Figs. 10a and 11) carrying a pin 73.

Coaxial with shaft 71 and journaled in frames 54, 55 is a fluted driver or universal actuator 74 to the left end of which is secured an arm 75 having an open slot designed to engage pin 73. The actuator 74 has the general shape of a ratchet wheel in transverse section (Figs. 5, 7, and 8) and operates the type bars and punches. Its operation and relation to other parts will be explained hereinafter at the proper points. Through suitable gearing, the right hand end of the actuator 74 also operates the carriage return mechanism and part of the mechanism for feeding blank cards into position to be gripped and fed by the card carriage. Shaft 64 and the actuator 74 rotate continually while the machine is in use.

IV—Card hoppers

Figure 2:
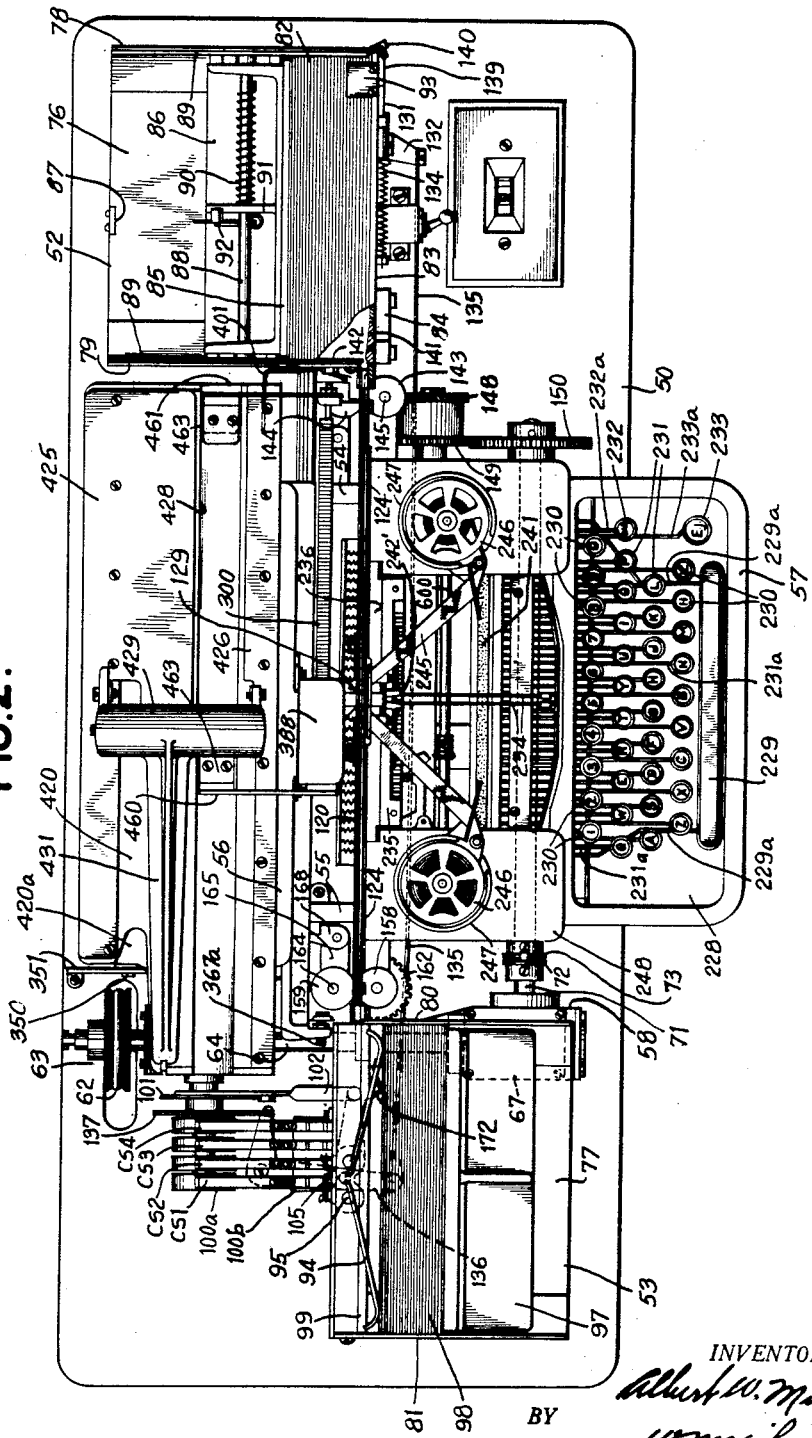

There are two card hoppers, one, which is generally designated 76 in Figs. 1 and 2, for the unpunched or blank cards, and the other, designated 77 in said figures, for the finished cards. These hoppers are mounted on the frame castings 52, 53, the substantially flat tops of which castings form the bottoms of the hoppers.

The sides of the hoppers are formed by plates 78, 79 (Figs. 1 and 2) in the case of the hopper 76, and plates 80, 81 in the case of the hopper 77, which plates are secured to the sides of the frame castings 52, 53, respectively. The unpunched blank cards 82 are placed in the hopper 76 so that they stand upright, facing forward, with their lower edges resting on the top surface of casting 52, and with their ends held in fairly close alignment by the plates 78, 79.

The front wall of hopper 76 is composed of a pair of guides 83 (Fig. 1) the right hand ends of which are secured to the front vertical edge of plate 78 while their left hand ends are supported by a bracket 84 secured to frame casting 52. The cards in hopper 76 are pressed toward guides 83 by means of a follower plate 85 (Fig. 2) carried by a frame 86 which is slidably mounted on the top of frame 52. Rearward movement of frame 86 is limited by a stop 87 secured to the rear edge of casting 52. Rotatably mounted in frame 86 is a shaft 88 to each end of which is secured a pinion (not shown). These pinions mesh with the undersides of suitable racks 89 secured to the top edges of plates 78, 79. A coil spring 90 surrounding shaft 88 has its ends secured to shaft 88 and a part of frame 86 and normally tends to rotate said shaft and pinions in such fashion that frame 86 and plate 85 tend to move forward and thereby press the unpunched cards against guides 83. Frame 86 is formed with a ring-shaped finger piece 91 which may be grasped to pull frame 86 and plate rearwardly when it is desired to insert a fresh batch of unpunched cards. A suitable spring-operated catch 92 is provided on frame 86 to snap over stop 87 to hold the frame against forward movement in response to spring 90 when the operator is inserting a batch of unpunched cards. Secured to the top edge of the upper guide 83 is a pair of lugs 93 which accurately position the cards adjacent the guides 83.

The rear part of hopper 77 is positioned forwardly of the plane of the foremost unpunched card in hopper 76. The plates 80, 81 form the side walls, the top surface of casting 53 the bottom, while there is no rear wall but, instead, there is provided a pair of card flippers 94 (Fig. 2) secured to the upper ends of two vertical shafts 95. Shafts 95 are journaled in holes in the top of frame casting 53 (Fig. 2) and in a lug 96 (Fig. 10a) formed in said casting. The manner in which the flippers 94 are operated will be explained in more detail later at the proper point.

A follower weight 97 is provided for the punched cards 98 in hopper 77. This weight is a casting having two flat walls making an acute dihedral angle with each other, one of which walls rests on the top of casting 53 while the other wall slopes downwardly from front to rear. After each punched card 98 has been fed into the hopper 77 by means presently to be described, flippers 94 are moved forwardly thus pushing all of the cards in the hopper 77 and weight 97 forwardly a slight amount sufficient to clear the way for the next punched card 98.

The punched cards 98 in hopper 77 lean slightly forward due to the shape of weight 97. In order to keep the lower edges of the cards 98 from sliding rearwardly, the top rear surface of casting 53 has a shoulder or rib 99 (Fig. 2) whose top surface slopes rearwardly flush with the surface of casting 53 while the front edge is raised enough from the surface of casting 53 to provide a shoulder in front of which the lower edge of each card 98 drops when pushed forward by pusher plates 94.

Normally the flippers 94 occupy the extreme forward position of Fig. 2 but are moved rearwardly at the proper time in each eject cycle to permit a finished card 98 to be fed into the hopper 77 in front of flippers 94 after which the latter are moved forwardly to push this card in front of rib 99. The rib 99 thus prevents the previously punched cards from sliding rearwardly when the flippers 94 are moved in the same direction.

Flippers 94 are operated by a cam shaft 100 which rotates only during eject cycles. This shaft is journaled in frame 58 (Figs. 4, 10a, and 11) beneath and at right angles to shaft 64. Secured to shaft 100 is a cam 101 (Fig. 10a) acting on a roller carried by a link 102 which is slotted to embrace shaft 100. Link 102 is pivoted to a rock lever 103 secured to the right hand shaft 95 which lever 103 has an arm 103a having a pin and slot connection to an arm 104 secured to the left hand shaft 95. A spring 105, connected to ears formed in lever 103 and arm 104, normally tends to rock both the flippers 94 rearwardly but such motion is controlled by rotation of cam 101. Obviously as cam 101 rotates, the roller thereon will follow the periphery of the cam and at the proper time plates 94 will be permitted to move rearwardly.

V—Eject clutch mechanism

The movements of cam shaft 100 are controlled by a clutch which will be termed the eject clutch for convenience. A worm 106 is cut in shaft 64 adjacent housing 66a (Figs. 4 and 10a) which worm drives a worm wheel 107 loosely mounted on shaft 100. Worm wheel 107 is secured to or is part of a sleeve 108 and fixed to the right hand end of such sleeve is a ratchet wheel 109. The latter rotates continually while the machine is in use. Secured to cam shaft 100 is a three armed lever 110 (Figs. 10a and 11), one arm of which is considerably longer than the others and extends forwardly and downwardly to engage a bent-over lug 111a formed in the end of one arm of a latch lever 111 pivoted on a screw stud 112 carried by an extension of frame 58. The other arm of latch lever 111 is held by a spring 113 against the head of a screw stud 114 also carried by the extension of frame 58. Spring 113 is connected to a pin on frame 58 and normally tends to hold the lug 111a in the path of the longer arm of lever 110 and thereby prevent the latter and shaft 100 from rotating in a clockwise direction (Fig. 11). Lever 111 also carries a latch 115 held by a spring 116 against the front side of the lug 111a and this latch 115 hooks over the end of the longer arm of lever 110 so as to prevent rotation of lever 110 and shaft 100 in a counterclockwise direction. Thus shaft 100 and lever 110 are normally locked against movement.

Pivoted on the longer arm of lever 110 is a coupling pawl 117 having an arm which is engaged by the lug 111a in latch lever 111 so that the pawl 117 is also normally locked against movement in a clockwise direction. The pawl 117 is provided with a tooth which is normally just out of the path of the teeth in ratchet 109 but is adapted to engage said teeth. A spring 118, connected to an ear in pawl 117 and an ear formed in one of the other arms of lever 110, normally tends to rock pawl 117 clockwise to draw the tooth in said pawl between the teeth of ratchet 109.

Latch lever 111 has a pin and slot connection to the plunger 119 of a solenoid ECS mounted on frame 58 (Fig. 11). When solenoid ECS is energized latch lever 111 will be rocked in a clockwise direction, withdrawing the lug 111a in said lever from engagement with the longer arm of lever 110 and the tail of pawl 117. Spring 118 will then rock pawl 117 in a clockwise direction to cause the tooth in said pawl to engage the teeth of ratchet 109. The latter will then drive the three armed lever 110 and shaft 100 positively in a clockwise direction. Deenergization of solenoid ECS permits spring 113 to restore the latch lever 111 to the position of Fig. 11 whereupon the lug 111a will be placed in the path of the tail of pawl 117. Eventually the tail of pawl 117 will strike lug 111a, causing the pawl to be rocked counterclockwise to disengage the tooth in said pawl from ratchet 109. Very shortly after this the longer arm of lever 110 will strike lug 111a and pawl 115 will snap beneath the end of said arm thereby preventing said arm from rebounding after striking the lug 111a. The solenoid ECS will be termed the eject clutch solenoid hereinafter.

Shaft 100 extends to the left (Figs. 2 and 10a) and carries four cams 100a which are made of insulating material such as "Bakelite". These cams actuate four pairs of contacts designated CS1 to CS4 and insulatably mounted on a bracket 100b secured to the rear part of frame casting 53 (Figs. 2 and 10a). These contacts have certain interlock and control functions which will be more fully explained hereinafter at the proper point. The relative timing of contacts CS1 to CS4 is shown in Fig. 36 in which the thick black lines indicate the length of time the contacts are closed.

VI—Card guide frame

Unpunched cards 82 are removed from hopper 76 one at a time by picker mechanism hereinafter to be described. Each card so removed is guided from right to left (Figs. 1, 2, and 6), while the card is being punched and printed, by means of an open card guide frame. This frame extends between the hoppers 76, 77 so that the punched card may pass into hopper 77 after the punching and printing operations have been completed. Feed rollers, working in connection with the picker mechanism, carry each blank card 82 into the card guide frame and other feed rollers remove the punched card 98 from the frame and carry such card into the hopper 77. These feed rollers will be described hereinafter.

Figure 3:
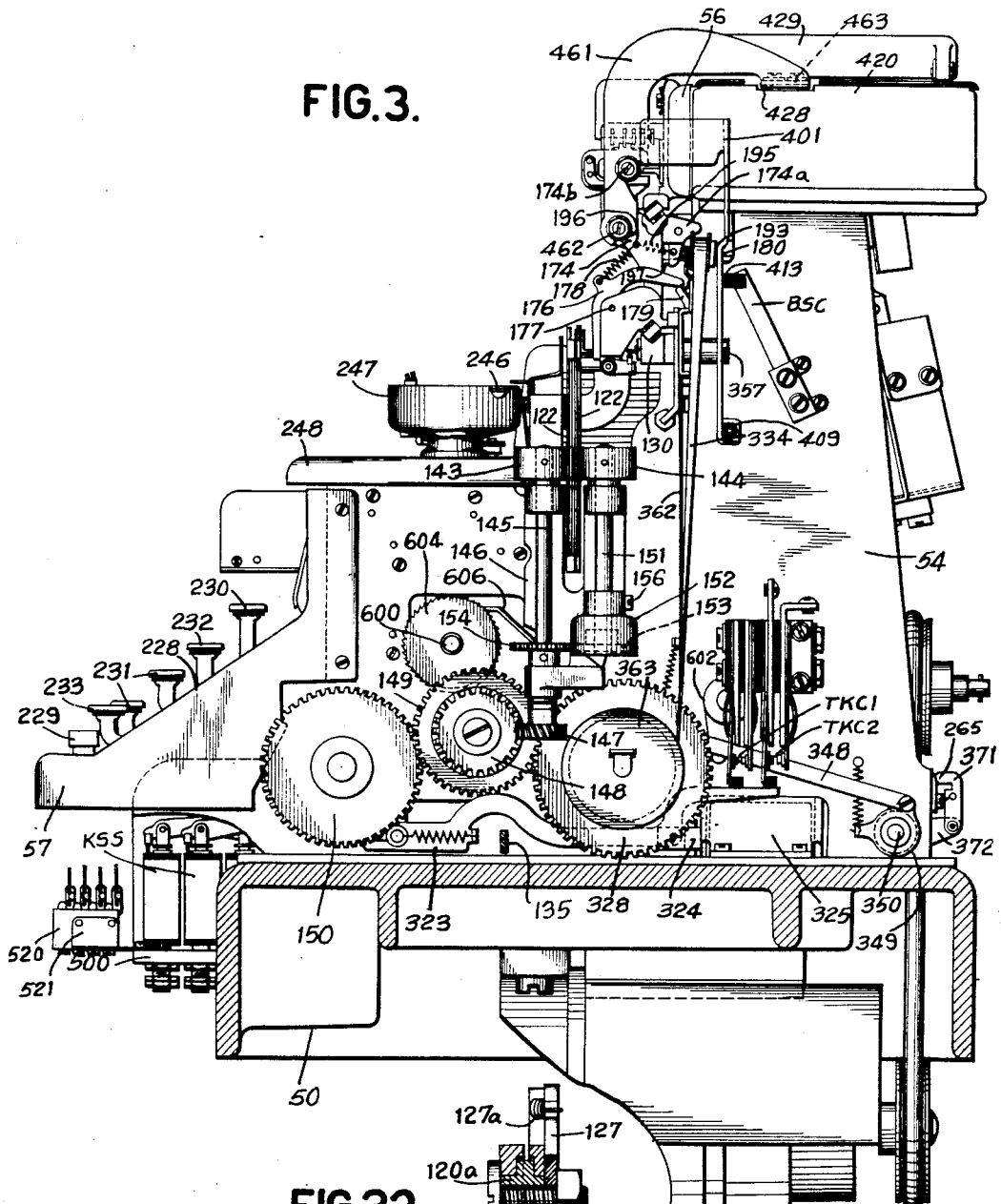

The card guiding frame comprises two rear guide members 120, 121 (Figs. 5, 6, and 7) which are held in spaced relation by two pairs of parallel bars generally designated 122, 123 (Figs. 1 and 6) which are secured to the guides 83 and plate 80, respectively, ears being formed in said plate for that purpose. The bars of the pair 122 are spaced apart a distance slightly greater than the thickness of the cards to permit each card to pass between, the confronting right hand edges of said bars being beveled as shown in Fig. 3 to facilitate free passage of the card between the bars. The pair of bars 123 is similarly constructed.

Figure 32:
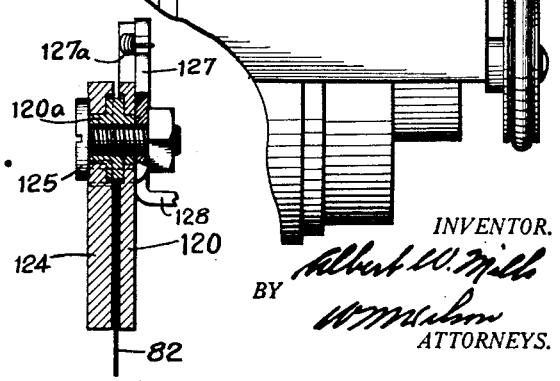
Fig. 32 is a vertical section on the line 32—32 in Fig. 6.

Secured to the front of guide member 120 (Figs. 1, 2, and 32) are two guide strips 124 which are spaced from member 120 by means of shouldered buttons 120a riveted to said member (Fig. 32), screws 125 threaded into the buttons 120a holding the strips 124 in place. Buttons 120a space the member 120 and strips 124 apart a distance sufficient to form a narrow channel in which the top edges of the unpunched cards 82 may travel as in Fig. 32, the buttons 120a also serving to limit vertical movement of the card to a very small amount. Guide strips 126 are secured in a similar manner to member 121 to form with the latter a similar channel to guide the lower edges of the cards. Buttons 120a of member 121 should be in line to prevent vertical vibration or "bumping" of the card as it passes from right to left while under control of the card carriage hereinafter to be described.

It is preferred to make guide strips 124 of transparent material to permit the operator to see the characters printed on the top edge of the card, but the guide strips 126 need not be of transparent material.

Since it is necessary that the spacing between the channels formed by members 120, 124 and 121, 126 be such as to permit free passage of the card from right to left without binding, the cards necessarily will slide rather loosely in these channels. It is highly important, on the other hand, that the holes punched in the cards be very accurately located with respect to the longer edges of the card. Accordingly, there is provided a pair of spring operated pressure shoes 127, best shown in Figs. 6 and 32, which conveniently may be pivoted to the rear side of member 120 by means of the screws 125 which secure the ends of guide strips 124 to said member near the center of the card guide frame. The pressure shoes 127 are bent forwardly through slots in members 120, 124 to intersect the space between member 120 and guide strips 124. The bent-over ends of shoes 127 are rounded slightly so that each card passing from right to left will lift said shoes slightly against the tension of springs 127a. The pressure shoes bear on the card with sufficient pressure to ensure that the lower edge of the card will always rest firmly on the lower row of spacing collars. The bent-over ends of shoes 127 are located a short distance on each side of the punches, the punch die, and the platen, to be described later, so that the lower edges of the cards are always accurately positioned with respect to the punches. The member 120 is provided near its center with an offset portion having holes which provide anchorages for the springs 127a operating the shoes 127. This offset portion also supports a bracket 128 on which is rotatably mounted the platen 129 (Figs. 2, 4, 5, and 7). Bracket 128 is also secured to a rail 130 secured to the front edges of frames 54, 55 (see Figs. 5 and 7). This construction provides a rigid backing to prevent bending of member 120 when the type bars strike. Platen 129 may be composed of a disk of resilient material and is freely rotatable on a stud carried by bracket 128.

VII—Card picker mechanism

Cards are removed from hopper 76 one at a time and the left hand ends pass between bars 122 and into the channels formed by guide elements 120, 124 and 121, 126. Slidable in grooves in guides 83 is a block 131 (Fig. 1) having a pin and slot connection to a lever 132 pivoted at 133 to frame casting 52. A spring 134, connected to the upper arm of lever 132 and a pin on frame casting 52, normally tends to draw the block 131 and the upper end of lever 132 to the left. A long link 135, pivoted to the lower arm of lever 132, extends almost the entire length of the machine, beneath frames 53, 54, 58, to the left of which frame 58 (Figs. 2 and 10a) said link is pivoted to one arm of a bell crank 136. The latter is pivoted on a post carried by base 50 and its other arm has a cam roller bearing on the periphery of a cam 137 secured to cam shaft 100. This cam controls the movement of block 131 in response to the pull of spring 134.

Pivoted on the right hand end of block 131 (Figs. 1 and 2) by means of a concealed screw 138, is a block 139 to the left edge of which is a picker knife 140. The latter is adjustably mounted on block 139 and projects rearwardly and to the left far enough from block 139 (against the rear surface of which the cards are pressed) to engage the right hand edge of the foremost card so that movement of blocks 131, 139 to the left in response to spring 134 will cause the foremost card to be pushed to the left into the channels formed by guide elements 120, 124 and 121, 126. As it is essential that only one card at a time be so removed, there is provided an adjustable throat block 141 (Fig. 1) secured to the rear face of bracket 84 which under guides 83 cooperates with an adjustable throat knife 142 (Fig. 2) secured to the right side of plate 79 behind block 141. The throat block 141 and throat knife 142 are adjusted to provide a narrow throat or gap just large enough to permit only one card at a time to pass to the left. This throat block and throat knife are well known features of card supply hoppers of record controlled machines such as tabulating machines, sorting machines, and record perforating machines, for this reason it is not shown in detail.

VIII—Card feed mechanism

The picker mechanism is capable of moving the cards only a short distance and, in order to bring each card moved by the picker into a position with the first column in front of the punches and remove the card when the punching operations have been finished, two separate pairs of feed rollers are provided. These feed rollers and/or their driving connections are shown in Figs. 1 to 4, 6, 10a, and 10b.

Feed rollers 143, 144 are provided to feed the card to a position to be punched in the first column where the card carriage, hereinafter to be described, then assumes control of the movement of the card from right to left. Feed roller 143 (Figs. 3 and 6) is secured to the upper end of a shaft 145 journaled in a frame casting 146 fastened to the right hand side of frame 54. A gear 147 is fixed to the lower end of shaft 145 and meshes with a gear 148 integrally connected to a gear 149 by means of a long hub or sleeve, gears 148, 149 being rotatable on a stud carried by frame 54. A gear 150 secured to the right hand end of the actuator 74 meshes with gear 149.

Figure 6:
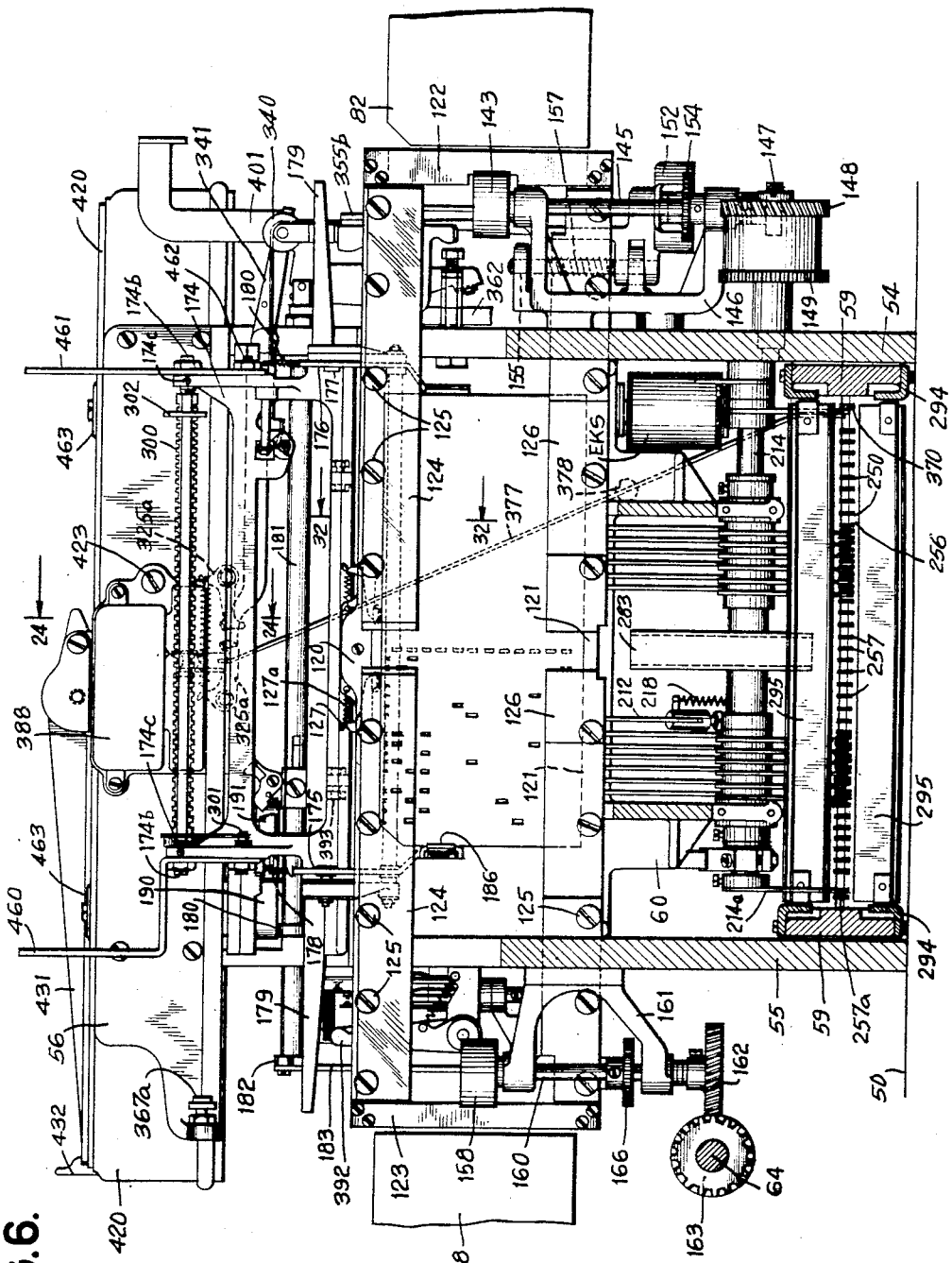

Feed roller 144 (Fig. 3) is fixed to the upper end of a shaft 151 journaled in a casting 152. A gear 153, secured to shaft 151, meshes with a similar gear 154 secured to shaft 145. Casting 152 is pivotally mounted on lugs formed in casting 146 as by means of a pin 155 (Fig. 6). This pin is secured to casting 152 by means of a set screw 156 which is shown in Fig. 3. Pin 155 is also slotted at its upper end to permit a screw driver or key to be used to rotate the pin. A coil spring 157 (Fig. 6) surrounds pin 155 and is hooked to said pin and the casting 146. The set screw 156 may be loosened and pin 155 turned with a screw driver or key to wind spring 157 in a direction to cause the casting 152 to press feed rollers 143, 144 together, the set screw 156 being tightened when the proper pressure is attained.

Since shaft 64 and the actuator 74 rotate constantly when the machine is in use, it is plain that feed rollers 143, 144 will likewise be driven constantly through the train of gears 153, 154, 147, 148, 149, 150 and a card pushed to the left by the picker mechanism will be gripped by said feed rollers and carried to the left until the right hand edge of the card is released by the feed rollers.

Feed rollers 158, 159 are provided to remove the punched card from the card guide frame and carry the punched card into hopper 77 after the punching and printing operations have been completed. Feed roller 158 (Fig. 4) is secured to the upper end of a shaft 160 journaled in a frame casting 161 secured to the left hand side of frame 55. A gear 162 mounted on the lower end of shaft 160 meshes with a gear 163 secured to shaft 64. The feed roller 159 is secured to the upper end of a shaft 164 journaled in a frame casting 165 and secured to shafts 160, 164 are intermeshing gears 166, 167, respectively. Casting 165 is pivotally mounted in a frame casting 168 in exactly the same fashion as frame casting 152 is mounted on casting 146, a slotted pivot pin and coil spring being provided which spring tends to press rollers 158, 159 together. Casting 168 is secured to the left hand face of frame 55.

Figure 4:
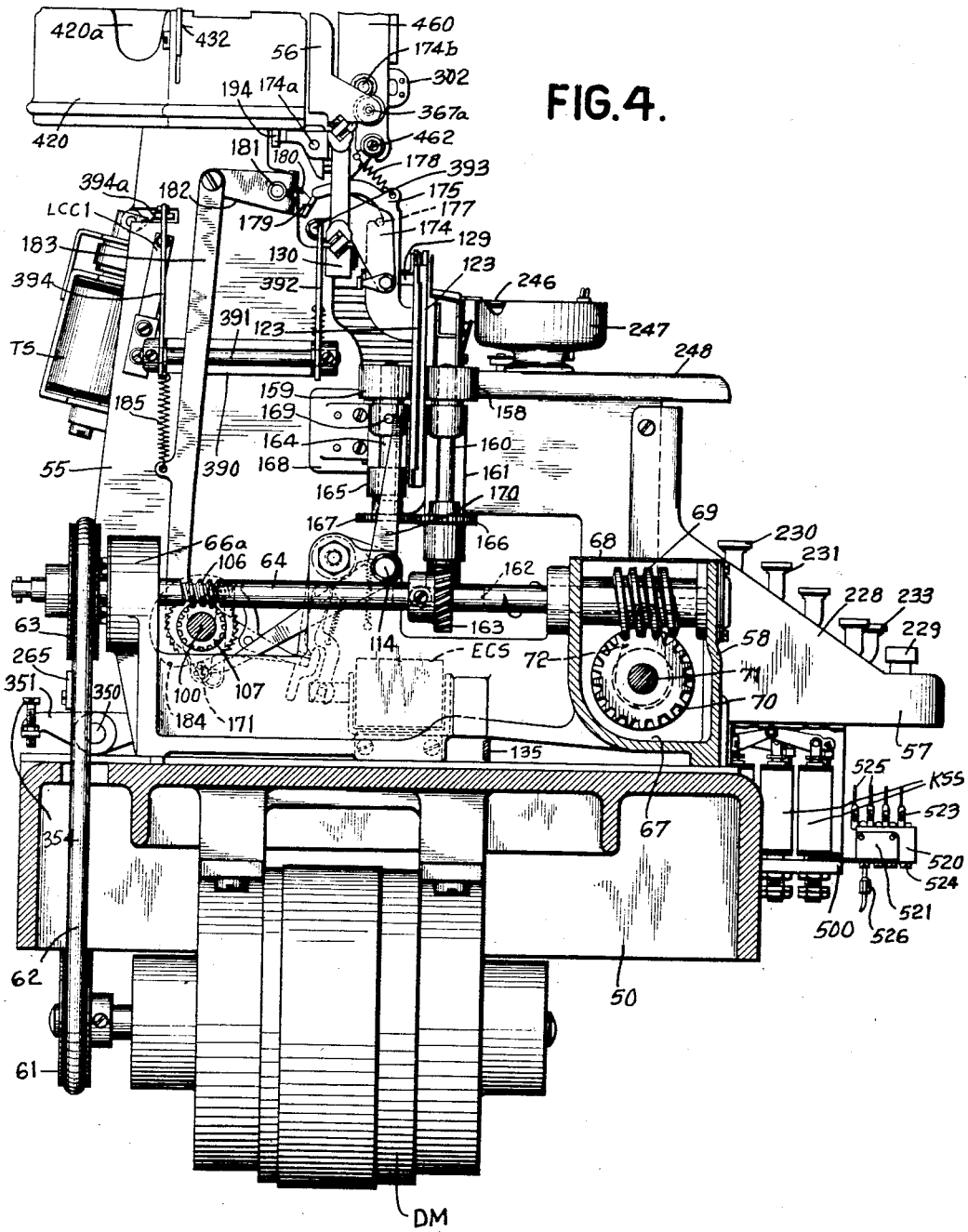

The feed rollers 158, 159 do not ordinarily make contact but are kept separated a distance sufficient to permit the left edge of the card which is being punched to move between said rollers without being gripped by them. A pin 169 (Fig. 4)

carried by casting 165 is engaged by one arm of a rock lever 170 pivoted on stud 114 (Figs. 10a and 11). The other arm of lever 170 bears against a pin 171 projecting from the side of the three armed lever 110. When cam shaft 100 is at rest with lever 110 latched, as in Fig. 11, the pin 171 holds lever 170 and casting 165 in a position to separate rollers 158, 159 and thereby prevent a card from being gripped by said rollers. After cam shaft 100 and pin 171 has turned approximately 35° (see Fig. 36), pin 171 clears the end of lever 170 and the spring acting upon casting 165 forces rollers 158, 159 together to grip the card and carry it into the hopper 77.

Since the feed rollers 158, 159 must be mounted far enough to one side of the hopper 77 to clear the cards therein, the last few steps of movement necessary to bring the left hand edge of each card against plate 81 must be accomplished by the momentum of the card. It has been found that the cards have some tendency to rebound back into the card guiding frame causing the card to become bent or torn when flippers 94 move forwardly. This is prevented by a spring finger 172 (Figs. 1 and 2) secured to the back of the right hand flipper 94 and projecting through an opening in the right hand flipper 94. When the flippers 94 are in their extreme rearward position finger 172 is in the path of each card fed from the card guiding frame by rollers 158, 159 and tends to bend or warp the upper edge of the card very slightly forward, not enough to damage it, but enough to cause the card to tilt forwardly as it enters the hopper. The trailing edge of the card is thus sprung forwardly after it passes plate 80 and is prevented by the plate from rebounding back into the card guiding frame and being caught by the front bar 123 or the rear edge of plate 80 when flippers 94 move forwardly.

IX—Card carriage

Figure 5:
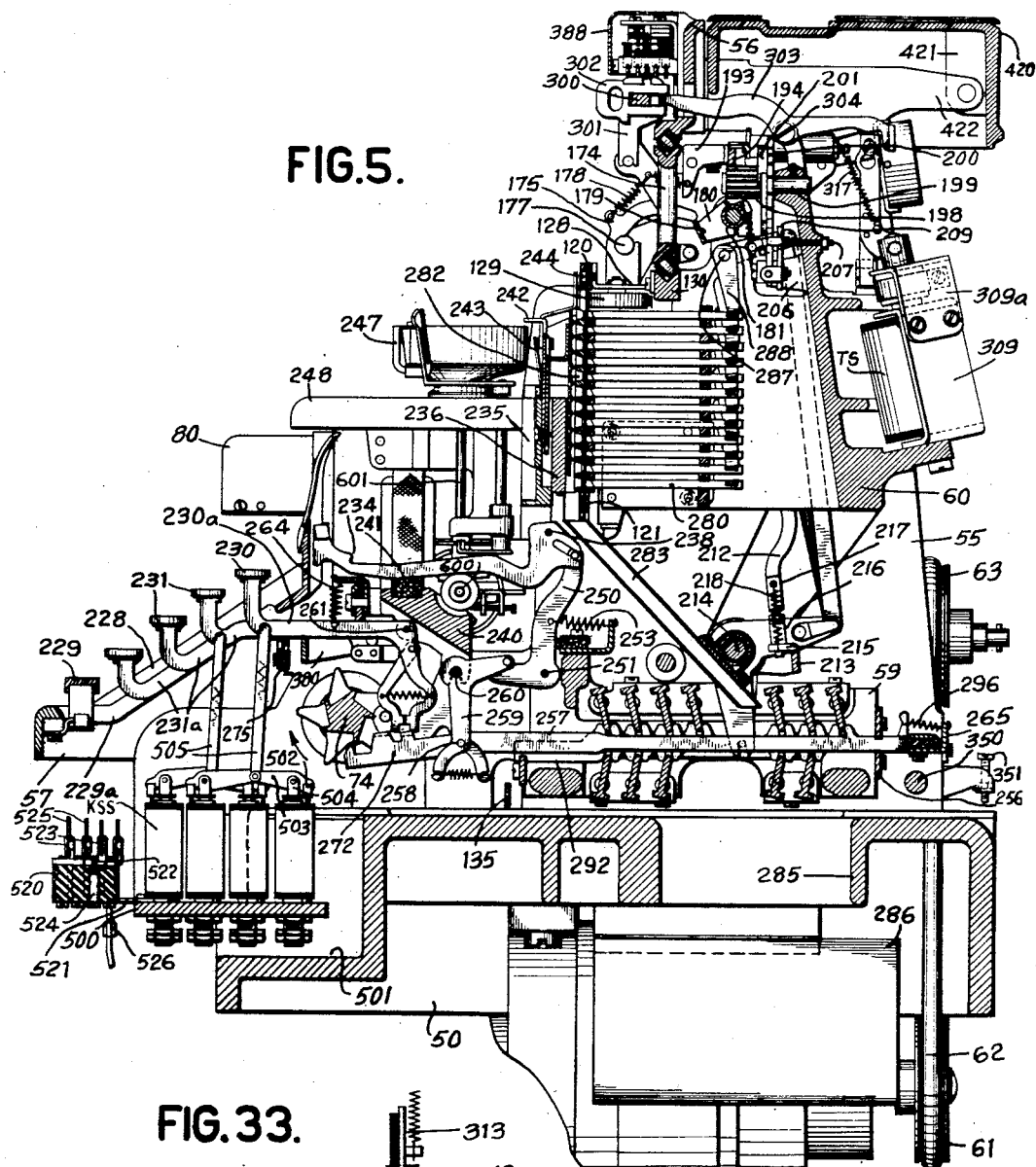

A card fed into the card guide frame by feed rollers 143, 144 is brought into a position to be gripped by the card carriage and thereafter moved by said carriage from right to left during the process of punching and printing the card. This card carriage is illustrated in Figs. 1 to 6, and 19, and comprises a main frame 174, best shown in Figs. 6 and 19. This frame 174 is movable transversely of the machine, the lower edge of frame 56 and the upper edge of bar 130 having grooves as shown in Figs. 3, 4 and 5 which confront similar grooves in frame 174, suitable anti-friction rollers riding in the grooves supporting the carriage frame after a fashion very common in typewriters.

Pivotally and removably mounted at each end of frame 174 are arms 175, 176. These arms have open slots which embrace studs 177 (Figs. 3, 4, 5, 6, and 19) which act as pivots for said arms. Springs 178, each connected to one of arms 175, 176 and to frame 174, normally tend to rock the arms 175, 176 in a clockwise direction (Fig. 5). The arms 175, 176 project both downwardly and forwardly into the space between guide elements 120, 124 and 121, 126 in which space the free ends of the arms travel when the card is being fed from the right to left by the carriage escapement mechanism or the tabulating mechanism which will be described later herein.

Movement of arms 175, 176 is controlled by means of a bail journaled in frames 54, 55. This bail consists of a bar or rail 179 secured to arms 180 rigidly mounted on a tube 181 journaled in frames 54, 55 (Figs. 1, 3, 5, and 6). Secured to the left hand end of tube 181 (see Figs. 1 and 4) is an arm 182 connected to a vertical link 183. The latter is slotted at its lower end to embrace the hub of a cam 184 secured to shaft 100 (Figs. 10a and 11). Link 183 has a cam roller constantly engaging cam 184, a spring 185, attached to said link and a part of the framework, tending to draw up said link and hold the roller in contact with the cam 184. The latter has three steps, a high point, a low point, and an intermediate point. Normally the roller rests on the low point in the cam and in this position the bar 179 is in its lowest position permitting spring 178 to rock the lower ends of arms 175, 175 as far forwardly as they can go. When in this position the ends of arms 175, 176 will engage both ends of a card in the card guide frame and movements of the card carriage will be communicated to the card.

Arm 175 is provided with a card engaging finger which is operative to hold the right hand edge of the card firmly against the arm 176. This finger is designated 186 in Fig. 21 and is formed of a single sheet metal blank. The finger 186 is pivotally connected to the arm 175 by means of bent-over lugs formed in said finger and a pin 187 which passes through holes in said lugs and a vertical hole in arm 175. A torsion spring 188 surrounding the pin 187 normally tends to rock the front end of finger 186 to the right, this movement being limited by virtue of a tail 189 in said finger which tail engages the right hand side of arm 175. The left hand side of the portion of arm 176 opposite (that is, immediately to the right) of finger 186 is slightly beveled as shown in Figs. 6 and 19. Finger 186 projects slightly further forwardly than the end of arm 176.

The operation of arms 175, 176 and the action of finger 186 and the aforementioned bevel in arm 176 will be brought out more clearly hereinafter when the operations performed during an eject cycle are described. It will be assumed for the present that arms 175, 176 are as far forward as they can go and are engaging a blank card in the card guiding frame as shown in Fig. 6.

X—Escapement mechanism

The carriage 174 is fed from right to left (Figs. 1 and 6) step-by-step under control of suitable escapement mechanism of a conventional type. The carriage 174 is normally urged to the left by means of a spring operated drum 190 (Figs. 1, 6, and 9) mounted on top of frame 60 and connected to the carriage frame by means of a tape 191. The tension applied to tape 191 by the spring operated drum 190 may be regulated by the usual key 192 (Fig. 9).

Pivotally mounted on lugs 174a, one at each end of frame 174, are arms 193 (Figs. 3, 4, 5, and 19) which extend rearwardly and support a rack 194 having gear teeth cut on its lower edge. A spring 195 (Figs. 3 and 19) connected to the right hand arm 193 and a pin 196 carried by frame 174 normally holds the arms 193 and rack 194 downwardly with a projection forming part of the right hand arm 193 abutting an adjustable stop stud 197 carried by frame 174. In this position of the rack 194 it meshes with the upper side of a wide pinion 198 rotatably mounted on a pin 199 carried by a projecting part of frame 60 (Figs. 5 and 9). Also rotatably mounted on pin 199 is an escapement ratchet 200 which is connected to pinion 198 for driving purposes by means of two pawls 201 pivotally mounted on studs carried by ratchet 200. The pawls 201 are pressed into contact with the teeth in pinion 198 by means of two bow springs 202 socketed in studs carried by ratchet wheel 200.

Since the card carriage has a tendency to move to the left, the rack 194 tends to rotate pinion 198 in a counterclockwise direction (Fig. 9) and this tendency is communicated to ratchet 200 by pawls 201. Movement of the ratchet 200 is controlled by a pawl 203 pivoted on a plate 204. The latter is pivoted on the conical ends of screw studs 205 carried by lugs like 206 in frame 60 whereby the plate may be rocked forwardly from a normal position in which the plate abuts an adjustable stop 207 carried by frame 60 (Fig. 5), a spring 204a holding the plate against the stop 207 (Fig. 9). Pawl 203 normally lies in the path of the teeth in ratchet 200 and the tendency of said ratchet to rotate causes said pawl to be forced against a stop lug 208 formed in plate 204 thereby normally preventing rotation of the ratchet and movement of the carriage to the left.

When plate 204 is rocked forwardly, a lug 209 (Fig. 5) similar in shape to the end of pawl 203 and formed in plate 204 behind pawl 203, engages the tooth which said pawl engages before the latter is fully disengaged from said tooth. A spring 210 (Fig. 9) connected to pawl 203 and plate 204 rocks said pawl to the left against a stop lug 211 similar to lug 208 when the end of the pawl clears the teeth of the ratchet wheel, but the lug 209 prevents movement of ratchet 200. When the plate 204 rocks back to its normal position, pawl 203 moves into the path of the next tooth of ratchet 200 before lug 209 clears the teeth of said ratchet. When lug 209 finally clears ratchet 200, the latter will be permitted to rotate one tooth space to force pawl 203 back against lug 208, the spring 210 being weaker than the spring in drum 190 thereby permitting such action. It is plain that one complete oscillation of plate 204 forward and back will cause ratchet 200 to turn the angular distance between two successive teeth in said ratchet. This movement allows the card carriage to move to the left the distance between two adjacent columns in the cards being punched, or a column space as it may be aptly termed.

Plate 204 may be oscillated in two ways. One way is by drawing down a link 212 (Fig. 9) connected by a pin and slot connection to a forwardly extending arm 204b attached to or forming part of plate 204. The link 212 is adjustably pivoted to a bail 213 secured to a shaft 214 journaled in frame 60. Bail 213 will be termed the punch bail hereinafter. As shown in Figs. 5 and 7, punch bail 213 is formed with a forwardly extending lug 215 in which is loosely socketed a shouldered portion of a nut 216 threaded on the end of a stud 217 riveted to the lower end of link 212. A spring 218 connects lug 215 with stud 217 so as to hold nut 216 firmly socketed in lug 215. Nut 216 may be turned to adjust the effective length of link 212 and locked by means of a lock nut as shown in Fig. 7.

Punch bail 213 is vibrated each time a hole or combination of holes is punched and the corresponding character printed. The means for vibrating punch bail 213 will be described later herein when the construction and operation of the punching mechanism is explained.

The other means for vibrating plate 204 is electrical in nature. Mounted on frame 60 adjacent frame 54 is a magnet coil support frame 219 (Fig. 9) in which are mounted the coils EM of a bipolar electromagnet hereinafter to be called the escapement magnet. Magnet EM actuates an armature 220a secured to the right hand end of a lever 220 pivoted on a screw 221 passing through holes in vertically aligned lugs formed in both the frame 219 and lever 220. Lever 220 extends to the left behind plate 204 and, when the magnet EM is energized, the plate 204 is rocked forwardly against the tension of spring 204a. A spring 221 connected to the back of lever 220 and to a pin 222 normally holds lever 220 against an adjustable stop 223 on frame 60.

Each time plate 204 rocks forwardly certain contacts are opened which will be termed the escapement contacts since they are operated every time the escapement mechanism is actuated. Pawl 203 (Fig. 31) has a pin 224 extending rearwardly to the right of a lug formed in a lever 225 and bent downwardly at right angles to the plane of said lever which is pivoted horizontally on frame 60. One arm of lever 225 extends rearwardly through an opening in frame 60 and carries a downwardly extending pin 226 of insulating material. A light spring 227, connected to a pin on frame 60 and to the rear arm of lever 225, normally holds pin 224 in contact with the lever 225 but such spring 227 is considerably weaker than spring 210. Pin 226 extends downwardly to the left of the free end of the left hand member of a pair of spring contact members EC insulatably mounted on the rear of frame 60. Contacts EC are the escapement contacts mentioned above. Normally contacts EC are kept closed due to the action of the spring in drum 190 but will be opened each time pawl 203 (Fig. 9) is rocked to the left by spring 210 and reclosed when the carriage moves a column space to carry pawl 203 back to its original position. Escapement contacts EC will also be opened and reclosed each time escapement magnet EM operates the plate 204.

XI—Keyboard

The machine may be manually controlled by means of a keyboard which is generally designated 228 in Figs. 1 to 5 and comprises a space bar 229, character keys comprising numerical keys 230 and letter keys 231, a tabulating key 232, and an eject key 233. The arrangement of the character keys is the same as in standard typewriter keyboards. Space bar 229 controls the escapement mechanism to cause the card carriage to move one column space to the left each time said bar is depressed. Numerical keys 230 control both printing of the numerals 0 to 12 on the card and punching the holes designating said numerals. Letter keys 231 control printing of the letters A to Z and punching the combinations of holes designating such letters. The tabulating key 231, as usual in typewriting machines, controls the tabulating mechanism by means of which the card carriage is caused to move a plurality of columns without printing or punching data. The eject key 233, when depressed, initiates an eject cycle during which a punched card is placed or "ejected" into hopper 77 and a blank card brought into position between arms 175, 176 on the card carriage. During the eject cycle the card carriage is also drawn to the right by carriage return mechanism to bring the carriage back to starting position. The various mechanisms controlled by the space bar 229 and keys 230 to 233 will be described hereinafter at the proper points.

XII—Printing mechanism

Printing of letters and numerals along the upper edge of the card is effected by means of a series of type bars 234 of more or less conventional form which are operated by the actuator 74 under control of keys 230, 231. Type bars 234 are pivotally mounted in a segment 235 secured to a cross frame 236 mounted on frames 54, 55. Only two of the type bars 234 appear in Fig. 2 and only one in Fig. 5 in order to show more clearly certain parts beneath or adjacent the type bars. The latter are pivoted to segment 235 in a manner common in the typewriter art, that is, the lower edge of the segment is arcuate in contour and provided with slots 237 (see Figs. 1, 5 and 7), radial of the center of curvature of the lower edge of segment 235, in which slots the type bars are pivoted by means of a curved wire or rod 238 mounted in a groove cut in the rear face of segment 235 and concentric with the lower edge of said segment. The wire 238 is removably held in place by means of suitable screws not shown. A segment of the type shown is sometimes called a "wire segment" because of the manner in which the type bars are pivoted to the segment.

Each type bar has a type head 239 on which is embossed or swaged a single character. Normally the type bars lie in a substantially horizontal position and are supported by a frame 240 carried by frames 54, 55. Frame 240 has its upper part curved concentrically with the lower edge of the segment 235 and secured in a groove or channel in this curved part of frame 240 is a rebound pad 241 of any suitabe construction upon which pad the type bars rest. In the drawings the pad 241 is shown as consisting of a tubular fabric bag filled with small shot, a construction commonly used in commercial typewriting machines. This bag reduces noise and prevents rebounding of the type bars when they are returned after making an impression on the card.

The type bars, as usual in the typewriter art and illustrated in Fig. 7 by broken lines, swing in an arc of a circle of approximately 90°, when operated in the manner hereinafter described, to strike the upper edge of the card at a point directly in front of platen 129. In order to secure accurate alignment and spacing of the printed characters, there is secured to the rear face of segment 235, adjacent the upper edge, a type bar guide 242 (Figs. 1, 2, 5 and 7) which is of conventional form and is bifurcated to guide the type heads 239 when they strike the card. A flat leaf spring 243 is secured to the front of the upper end of guide 242 and serves to reduce shock, minimize noise, and ensure that sticking of the type bars in guide 242 cannot occur.

Guide 242 also supports a ribbon guide 244 (Figs. 1, 5 and 7) which guides the inking ribbon 245. The latter is wound on two spools 246 rotatably mounted in housing 247 carried by plates or covers 248 secured to frames 54, 55. The type heads always strike on the lower edge of the ribbon immediately above the space between the bifurcations in guide 242.

Each type bar 234 is slotted as shown in Fig. 7 to receive a pin 249 carried by one arm of a type bar operating lever 250 pivoted on a wire 251 laid in a horizontal straight groove cut lengthwise of a cross piece 252 forming part of frame 59, each lever 250 being mounted in a vertical slot cut in cross piece 252. Springs 253, each anchored to a lever 250 and to an angle strip 254 secured to cross piece 252, hold levers 250 against the edge of a strip of "bakelite" or similar material 255 secured to the top of angle strip 254 by the screws which secure said strip to said cross piece. The bakelite strip 255 helps to prevent rebound of levers 250 and their associated type bars and also makes these parts operate quietly.

The vertical arms of levers 250 carrying pins 249 vary in length and are bent to right or left of the planes of the horizontal arms to accommodate for the varying heights of the type bars 234 above cross piece 252 due to the curved shape of the lower edge of segment 235 (see Figs. 10a and 10b). Obviously counterclockwise movement of any lever 250 (Fig. 7) will cause its type bar 234 to be rocked in a clockwise direction due to the camming effect of pin 249 on walls of the slot in the type bar.

Slidably mounted in two combs 256 supported by frame 59 is a plurality of slide bars 257, the forward ends of which are pivoted at 258 to the vertical arms of bell cranks 259. The latter are pivoted on a wire 260 secured in a horizontal groove cut in frame 240 and mounted in vertical slots cut in the frame 240. The wires 251 and 260, like the wire acting as pivot for typebars 234, are held in their respective slots by suitable screws. The above described method of mounting typebars 234 and levers 250, 259, greatly facilitates assembly, repair or replacement of the typebars and levers.

The key levers 230a to 233a of keys 230 to 233 are pivoted in frame 240 by means of a wire 261, said space bar and keys being mounted in the same slots which receive levers 259. Secured to the front of frame 240 is an angle bar 262 and bakelite strip 263 like the angle bar 254 and bakelite strip 255. Anchored to angle bar 262 are springs 264 attached to the key levers 230a to 233a. Similar springs are attached to two arms or levers 229a, 229b of a bail supporting the ends of space bar 229. Springs 264 normally hold the key levers and space bar arms 229a, 229b against the strip 263, which acts as a sound deadening adjustable stop, and said springs return keys to normal position after being depressed. A similar angle strip 265 is secured to the rear edges of frames 54 and 55 and carries a bakelite strip 266 acting as a stop for bars 257, against which strip the rear ends of said bars normally abut.

Each lever 259 has a rearwardly and upwardly extending arm 259a carrying a pin 267 which overlies and is in contact with the forwardly extending arm 250a of one of the levers 250. When a slide bar 257 is drawn forward, that is, to the left (Figs. 5, 7 and 8), its associated lever 259 will be rocked clockwise thereby rocking one of the levers 250 counterclockwise, and the operated lever 250 will propel the corresponding typebar toward printing position. There is a bar 257, a lever 259, a lever 250, and a typebar 234 associated with each of the keys 230, 231.

Slide bars 257 are operated by power derived from the actuator 74 and for that purpose may be selectively coupled to said driver by means of keys 230, 231. The actuator 74, as shown in Figs. 5, 7, 8, 9, 10a and 10b, is shaped in section like a ratchet wheel of five teeth and closely resembles a straight reamer with five flutes in general appearance. It constantly rotates in bearings carried by frames 54, 55 and extends crosswise of the machine almost directly in front of the forward ends of slide bars 257 and beneath the key levers 230a, 231a.

Each key lever 230a, 231a has a downwardly extending arm 271 (see Figs. 7 and 8). Pivoted to each slide bar 257 at 258 is an operating hook 272 having two bent-over lugs 272a, 272b, a hook shaped portion 272c, and an arm 272d. A spring 273 connected to each arm 272d and an extension of lever 259 (Fig. 7) normally tends to rock each hook 272 clockwise to force lug 272a against the lower end of one of the arms 271. When the operating hooks 272 are in this position, the lugs 272b and hook portions 272c are clear of the ribs formed by the flutes in the actuator 74.

Associated with each arm 271 is a second arm 271a which is pivoted on arm 271. Both arms 271, 271a of each key are notched at their extreme lower ends to provide a recess which confronts the lugs 272a immediately below. Arm 271a is slightly further downwardly than arm 271. A spring 274 connected to both arms 271, 271a tends to draw said arms toward each other to hold a bent-over lug in arm 271a in contact with a projecting part of arm 271.

When a numerical key or letter key is manually depressed, its arm 271 moves rearwardly (or to the right in Fig. 7) to the position of Fig. 8 while arm 271a catches on the front edge of lug 272a and thus remains in the position of Fig. 7, creating a space into which lug 272a slips, thereby releasing the associated operating hook 272 which will then be rocked slightly clockwise by its spring 273. As a result the hook portion 272c will slip into one of the flutes or grooves in actuator 74 and eventually will be engaged by a rib as in Fig. 8. As the actuator continues its rotation, the operating hook 272 and its slide bar 257 will be drawn to the left thereby operating the typebar corresponding to the selected key to print the selected letter or numeral on the top edge of the card.

During movement of the selected operating hook to the left, its lug 272b will be carried into the path of the next succeeding rib on the actuator 74 and will be engaged by such rib with the result that the operating hook will be gradually cammed out of engagement with the actuator, this action occurring after the typebar has moved approximately 45°, so that the actual impression is made with a hammer blow due to inertia of the typebar.

Also, while operating hook 272 is moving to the left, arm 271a will be pushed forwardly or to the left by lug 272a beyond the normal position of arm 271a. When the hook is cammed downwardly due to lug 272b engaging a rib in the actuator, arm 271a will be freed from the lug 272b and be drawn by spring 274 back into engagement with arm 271 and will then occupy a position above lug 272a, which at this time will have been displaced to the left the maximum distance.

Assuming that the selected key has been promptly released by the operator, spring 253 will now restore arms 250, 259, slide bar 257, and hook 272 to the position of Fig. 7. While hook 272 is moving to the right lug 272a will pass underneath the lower end of arm 271a which will, by engaging said lug, prevent reengagement of hook portion 272c and lug 272b with the ribs on the actuator 74. When the hook 272 arrives in the position of Fig. 7 the lug 272a will slip off the end of arm 271a and rise slightly to resume its position behind the arm 271a and abutting the end of arm 271.

If the operator should hold a key down too long, either deliberately or by failure to promptly remove his fingers from the keys, or if sticking of the parts should prevent prompt return of the selected key to normal position, arm 271a, when freed from lug 272a, will be drawn by spring 274 to the right of the normal position of arm 271a. In this position arm 271a will overlie lug 272a and hold the hook 272 out of engagement with the ribs of the actuator 74 when said hook is almost fully returned to its normal position. Upon release of the key, it will be moved by its spring 264 back to the position of Fig. 7, lug 272a rising to its normal position behind the lower end of arm 271a when the key reaches its normal position.

The purpose of arm 271a is to prevent repeated operation of a typebar in case a key is held down too long or slight sticking may make the keys sluggish in returning to normal position. This result is obtained by making arm 271a slightly longer than arm 271 and by making the recess formed by the notches in the ends of arms 271, 271a when said arms are in normal position too small to ordinarily receive lug 272 so that the arms must be moved apart far enough to expand the recess sufficiently to allow the lug 272a to enter such recess. Obviously the only time the recess can be expanded is when arms 271, 271a are in the normal position of Fig. 7 with lug 272a behind the lower end of arm 271a.

It has been discovered that there are times when the hook portion 272c of an operating hook 272 tends to merely hit the sharp edge of one of the ribs in actuator 272 with a glancing blow. In other words, the release of a hook 272 by the key may occur at such a time that the hook portion 272c does not slip directly into a flute in the actuator before being engaged by a rib, but instead, the pointed part of the hook portion 272c is struck by the rib with a glancing blow or "kick", causing the hook 272 to "bounce" away from the actuator. When this happens, the machine may react in several different ways.

The blow may be sufficient to cause the punches to operate fully (as only a small movement of bar 257 is required to punch the card) but the typebar may not acquire sufficient momentum to move all the way to printing position. Under these circumstances the hook 272 might be fully restored to normal position underneath arm 271, but the escapement mechanism might or might not be fully operated, depending on the force of the glancing blow by the driver. Either the machine would punch the proper holes and the card carriage escape to the next column, in which case the card would be correctly punched but the proper character would not be printed, or the card would be punched properly and fail to escape. In the first case the only bad result would be failure to print at the top of the column. This could easily be remedied, if discovered immediately, by back spacing the carriage and depressing the same key again. In the second case, the operator, working rapidly according to a touch system, would most likely depress a different key, assuming that the machine had operated properly, with the result that the card would be incorrectly punched with more holes than necessary, some of which would be in the wrong column. As a result the card would be ruined and a new one would have to be punched.

On the other hand, the hook 272 might receive a light blow insufficient to fully operate typebar, punches, or escapement, but sufficient to cause the hook to be properly restored to normal position. The operator, assuming that the machine has operated properly, or due to rapid operation of the keys, might immediately depress another key thereby causing holes to be punched in the wrong column and ruining the card.

Means is provided in the present machine to prevent misoperations like those mentioned above to ensure that the card will be properly punched and printed regardless of the relation between the actuator 74 and a hook 272 at the moment of release of the hook by a key. This means is best shown in Fig. 35 which is an enlarged view of one of the hooks 272 and a rib of actuator 74.

The hook portion 272c is thicker than the rest of the hook and is provided with a vertical slot 272e in which is pivotally mounted a pawl 272f whose upper end is flat and flush with the pointed part of the hook portion 272c. A spring 272g, in a horizontal hole in thick part of hook 272, presses against the tail of pawl 272f and holds the pawl in the position shown, one edge of pawl 272f abutting the wall at the end of the slot to limit clockwise movement of the pawl.

Let it be assumed that the release of the hook by the key occurs at a time when a rib in the actuator 74 is about to pass the hook portion with the result that the sharp edge of the rib would strike the sharp edge of the hook portion with point-to-point contact if pawl 272f were not there. The hook portion, however, cannot at this time positively engage the driver as the flat top of the pawl 272f strikes the slightly flattened part of the rib and prevents further movement of the hook in response to its spring 273, as shown in Fig. 35. The rib of actuator 74, under this condition, merely rides over the flat top of the pawl 272f and the slightly flattened end of hook portion 272c and eventually will clear them and slip into the next flute on the rib. The spring 272g is very weak and offers little resistance to the actuator 74 and, when the next rib strikes said pawl, the pawl will yield readily without producing movement of the hook until the rib positively engages the hook portion 272c and drives the typebar and (as will be seen later) operates the punches.

It may happen that the upper right hand corner or pointed end of the pawl 272f (Fig. 35) strikes the sharp edge of a rib with point-to-point contact. Due to the weakness of spring 272g the hook 272 will not receive a "kick" but the rib will merely cam the pawl inwardly in its slot 272e and pass by the pawl. Since no movement is imparted to the hook 272 under these conditions, its spring 273 will draw it into engagement with the next rib and the typebar will be positively and fully operated.

The pawl 272f functions to (a) momentarily prevent engagement of the hook with driver 74 when conditions are not favorable to the hook portion 272c slipping directly into a flute, and (b) prevent the hook from receiving a "kick" or blow when the pawl and driver tend to engage by point-to-point contact. The pawl 272f thus serves to delay engagement of the hook with the driver when conditions are not favorable to positive engagement.

As there would be likelihood of damage to the machine resulting if two keys were depressed together, or at the worst, jamming of the typebars 234, a suitable key arrester device may be provided to prevent depressing two keys at a time or depressing a key before a previously depressed key has been fully returned to its normal position. This key arrester device is generally designated 275 in Figs. 5, 7 and 8, but will not be described herein as quite a number of suitable forms are well known in the typewriter and punch arts.

XIII—Perforating mechanism

Actuator 74, through slide bars 257, also operates the punching mechanism which will now be described. Frame 60 (Figs. 7 and 9) is formed with a forwardly extending bracket or lug 276 secured to which is a punch carrier plate 277, screws 278 and dowel pins 279 serving to secure the plate rigidly to said bracket. On the right-hand side of plate 277, adjacent its front and rear vertical edges are two ribs forming part of the plate and these ribs are slotted to horizontally and slidably support a group of twelve punches 280 which are rectangular in cross sectional shape. The punches 280 are held in the slots in said ribs by means of two flat strips 281 attached to said ribs by screws (Fig. 9), and the axes of platen 128 and punches 280 are in a common vertical plane so that the holes in each column will be punched in the card in vertical alignment with the corresponding printed characters as shown in Fig. 25.

Secured to the back of the frame 236 is the punch die 282 (Figs. 5 and 7) having twelve rectangular die openings directly opposite the ends of the punches 280. Die 282 is spaced from the front edge of plate 277 a distance sufficient to permit free passage of the cards between the punches and the die. The die is provided with a deep channel in front of the openings to permit the paper chips to drop down into the open end of a chute 283 (Figs. 5, 6, and 9). This chute is clamped to a sleeve 234, surrounding and supporting shaft 214, and slopes downwardly to a point over bars 257. Base 50 has an opening 285 (Fig. 5) beneath which is a removable hopper 286 for receiving the punchings which drop from the lower end of chute 283 and fall between bars 257 through opening 285 into hopper 286.

Rotatably mounted on frames 60 are a plurality of short shafts 287 (Figs. 5, 7 and 9), one for each punch 280. Six of the shafts are mounted on one side of plate 277 and the remainder on the other side (Fig. 9) and on the end of each shaft nearest to said plate is secured an arm 288. The arms 288 have bent over lugs which extend into notches in the rear ends of punches 280 (Fig. 7). As shown in Fig. 7, the left hand group of shafts 287 and arms 288 correspond to the punches for the "12", "0", "2", "4", "6", and "8" index point positions, while the right hand group of shafts and arms correspond to the punches for the other six index point positions. Also secured to shafts 287 are rearwardly extending arms 289 to which are pivoted links 290 (Figs. 7 and 9). Loosely mounted on sleeve 284 are bell cranks 291 having rearwardly extending arms overlying bail 213 to which arms links 290 are pivoted. Bell cranks 291 are spaced apart by suitable spacing collars or hubs.

Each bell crank 291 has a pin and slot connection to a slide bar 292, the latter being slidably mounted in combs 256 and a comb 293 carried by the front part of frame 59. Slide bars 292 are arranged in two groups, each group being beneath the corresponding group of shafts 287, (Fig. 9) and are interspersed with bars 257. Pivoted at each end to angle bars 294 mounted in frame 59, is a series of twelve connector bars 295 extending across bars 257, 292, each bar 295 corresponding to one of the punches 280. Connector bars 295 are made somewhat T-shaped in cross section to secure rigidity and are pivoted to bars 294 by means of trunnions riveted to the ends of the bars so that in effect they are bails. Seven of the bars 295 are mounted above slide bars 257, 292 (Fig. 7), while the other five are mounted below for sake of compactness. Referring to Fig. 7, and reading from left to right, the top row of bars corresponds to the "11", "12", "1", "2", "3", "4", and "5" punches, while the lower row corresponds to the "6", "7", "8", "9", and "0" punches, respectively. It will be understood that each time one of the bars 295 is vibrated in a clockwise direction (Fig. 7) the corresponding punch will be forced into the die, thereby punching a hole in the corresponding index point position of a card between the punches and die.

Each slide bar 292 has a lug 292a which extends upwardly or downwardly, as the case may be, in front of one of the bars 295 as shown in Figs. 7 and 9. Each of the slide bars 257 corresponding to the numerical keys 230 has a similar lug 257c extending behind one of the bars 295. When any numeral key is depressed, causing the proper slide bar 257 to be operated as described, the lug 257c on such slide bar will swing forwardly the connector bar 295 of the punch corresponding to such key. This causes the slide bar 295 to move the slide bar 292 corresponding to the proper punch forwardly, thus rocking the associated bell crank 291 and arm 289, shaft 287, and arm 288 in a clockwise direction (Fig. 7), forcing the punch 280 corresponding to the selected key through the card. At the same time, bail 213 will be rocked clockwise by the bell crank 291 to operate the escapement mechanism. Slide bars 292 are restored to normal position by springs 296 connected to angle bar 265 and upstanding lugs formed in the rear ends of the slide bars 292. These springs also assist in retracting slide bars 257 and the punches.

Each slide bar 257 associated with a letter key 231 has two lugs 257c which are located behind the two connector bars 295 associated with the two punches which will punch the combination of holes representing the letter corresponding to such bar and key. The location of the lugs 257c on the slide bar 257 associated with the "A" key, for example, is such that the connector bars 295 and punches corresponding to the "1" and "12" index point positions will be operated whenever the "A" slide bar 257 is drawn forwardly. Reference to Fig. 26 illustrating the code, will show how the lugs 257c of the other slide bars 257 are located. Thus, the slide bar 257 corresponding to the letter "R" has its lugs 257c located to operate the bars 295 corresponding to the punches for the "9" and "11" positions. It is possible that the punches may stick in the card or that the mechanism including hooks 272, bell cranks 259, slide bars 257, 292, bars 295, arms 291, links 290, and shafts 287 may be sluggish in responding to the restoring action of springs 253, 296. In order to insure positive action in restoring these parts after the card has been printed and punched, there is provided a slide bar 257a similar in general shape and mounting to the bars 257 and located to the left of the last bar 257 on the left (Fig. 9). Bar 257a is not provided with lugs 257c. The bar 257a is ordinarily retracted by means of a spring 296a connected similarly to springs 296. Bar 257a has a pin and slot connection to an arm 214a secured to shaft 214 (Figs. 9 and 10a) so that the slide bar 257a is moved forwardly each time the bail 213 is rocked clockwise during the punching operation.

The forward end of bar 257a is pivotally connected to one arm of a lever 259b which is pivotally mounted (like levers 250) on wire 261 in a slot in frame 240. Lever 259b has a gooseneck shaped arm 259c which extends forwardly and downwardly in the rear of a star cam 74a rigidly mounted on the actuator 74 but is normally just out of the path of the lobes of said cam.

When any bar 257 is drawn forwardly during the printing of a character such as a letter or numeral and the punching of a hole or holes designating such character, bail 213 is rocked clockwise (Fig. 7) and pushes bar 257a forwardly forcing the free end of arm 259c into the path of one of the lobes in cam 74a. About the time the hook portion 272c of the active operating hook is cammed clear of the actuator 74 one of the lobes of cam 74a will strike the end of arm 259c and cam it rearwardly thereby forcing slide bar 257a backwardly against the bakelite strip 266, assisted by spring 296a. Bail 213 will be rocked positively by slide bar 257a in a counterclockwise direction, forcibly withdrawing any punch that may be sticking or sluggish in action. As this will also cause slides 292 to be positively pushed rearwardly, lugs 292a engaging bars 295 will rock said bars rearwardly thereby forcing the operative bar 257 rearwardly. This positive restoring movement is assisted by springs 253, 296, 296a acting together.

It is quite evident that the operation of the printing and punching mechanism is positive and fully accomplished by power, consequently very light springs may be used, making the machine cheaper to construct, very compact, and reducing power consumption and wear.

XIV—Tabulating mechanism

The operation of the tabulating mechanism may be initiated by depression of key 232 and is controlled electrically by both the key and by column stops settable at the proper points on a stop bar mounted on the carriage and designated 300 in Figs. 1, 2, 5, 6, 13, 19, and 24. The ends of the bar are supported by conical screw studs 174b threaded into holes in the ends of the frame 174 and locked by set screws 174c. This permits longitudinal adjustment of the bar to compensate for slight inaccuracies of the assembled parts. As the bar would be likely to turn on the conical points of the set screws, there is provided a flat strip 301 (Figs. 1, 5, and 6) having a rectangular notch which fits snugly in slots cut in the top and under sides of bar 300 near its left end. The other end of the bar has a vertical slot which embraces the end of a stud carried by frame 174. Strip 301, and hence bar 300, is thereby prevented from turning without interference with adjustment of bar 300 when necessary.

Bar 300, as usual in typewriting machines, is provided with slots on the upper and lower sides, there being a pair of vertically aligned slots for each column of the card. In these slots may be set column stops 302 which may have the same general shape as others now in common use in typewriters, differing only in certain details to adapt them for use in the machine described herein. Affixed to the front of bar 300 is a suitable scale of numbers to indicate the columns on the cards with which the pairs of slots correspond or, if desired, the scale may be directly engraved or embossed on bar 300. Stops 302 are somewhat longer than is usually the case and extend rearwardly of the bar 300 (see Fig. 24) to provide stop portions 302a which are adapted to cooperate at the proper time with a stop finger 303 pivoted at 304 to frame 60 (Figs. 5, 9 and 13). Normally the forward end of lever 303 occupies a position directly behind bar 300 and between the lines of travel of the stop portions 302a in stops 302.

Stop finger 303 extends through a large opening in frame 56 and a rectangular slot 305 (Fig. 23) cut in a contact supporting frame 306 secured to the face of frame 56. Slot 305 is long enough and wide enough to permit the free end of finger 303 to move vertically into the path of one of the upper stop portions 302a and also, when struck by said stop during movement of the carriage to the left, to permit finger 303 to move to the left a slight amount relative to frames 56 and 306.

This latter movement is utilized to operate two pairs of contacts TEC and SC (Fig. 13), called the tabulating escapement and stop contacts, respectively, which are mounted on the left hand side of frame 55. A rod 307 is slidably mounted in grooves cut in lugs formed in frame 56 and carries on its left-hand end a button of insulative material, while the right hand end of rod 307 abuts the forward end of finger 303. Rod 307 is loosely held in the left hand slot in frame 56 by the presence of frame 55 and in the right hand slot by the head of a screw 308. Each time a stop portion 302a strikes the free end of finger 303 the latter will be forced to the left (Fig. 13) against the left wall of slot 305 pushing rod 307 to the left to close contacts TEC and SC.

Figure 33:
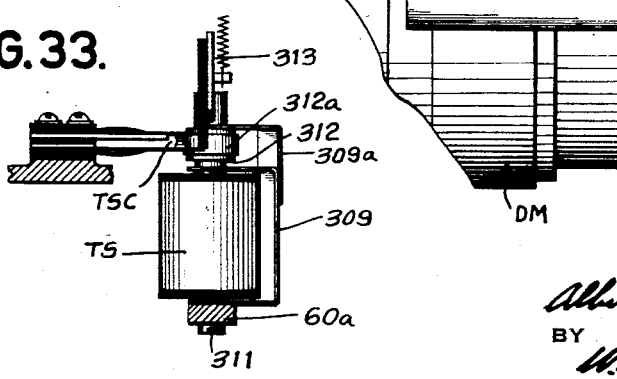
Fig. 33 is a detail view of the tabulating solenoid and associated parts.

The stop finger 303 may be rocked in a vertical plane by means of a tabulating solenoid mounted on a lug 60a formed in frame 60 (see Figs. 5, 14, and 33). The tabulating solenoid includes a coil TS, a U-shaped frame 309 supporting the coil TS, a sub-frame 309a secured to frame 309, and a plunger 310 slidably mounted in coil TS and the frames 309, 309a. Frame 309 is secured to lug 60a by means of a screw 311. A split fibre collar 312 is clamped to plunger 310 between the bent-over part of sub-frame 308a and the upper part of frame 309 by means of a strap clamp 312a like a hose clamp. This fibre collar acts as an adjustable stop which limits movement of the plunger 310.

Pivoted to the upper end of plunger 310 is a link 313 (Fig. 14) which extends vertically and is slotted to hook over a headed stud 314 riveted to a frame 315 pivoted at 316 to frame 60. A spring 317 anchored to frame 60 normally holds link 313 in the position of Figs. 5 and 14 with stop collar 312 against frame 309a. The upper end of link 313 is provided with a bent-over lug 313a upon which rests the rear end of stop finger 303, a light spring 318 attached to frame 60 and the rear end of finger 303 holding the latter in contact with lug 313a.

Frame 315 preferably is formed from a single stamping and is provided with ears supporting a governor 319 which may be of a form well known in the typewriter art. The front end of the shaft 320 of governor 319 is journaled in a lug formed in the front end of frame 315 and is provided with a pinion 321 beneath rack 194 but normally just out of mesh with such rack. A spring 322, superior in tension to spring 318 and attached to a tab formed in the front end of frame 315 and to frame 60, normally holds the frame 315 in the position of Figs. 5 and 14, with stud 314 in the upper end of the slot in link 313.

Solenoid TS may be controlled either by the tabulating key 232 or by a stop 302 on bar 300. When energized, solenoid TS draws plunger 310 and link 313 downwardly thereby rocking frame 315 clockwise (Fig. 14), lifting pinion 321 into engagement with rack 194, raising the latter a distance sufficient to disengage it from the escapement pinion 198 (Fig. 5). Spring 318, acting on the rear end of stop finger 303, causes said finger to rock clockwise in response to downward movement of link 313, thereby elevating the forward end of stop finger 303 into the path of the lug 302a on one of the stops. The parts are so proportioned that finger 303 will move into the path of a lug 302a before rack 194 clears pinion 198. When the last named movement takes place, the spring operated drum 190 and tape 191 become effective to draw the carriage to the left until the upper stop portion 302a of a stop 302 strikes stop finger 303 and moves the latter to the left a slight amount thereby closing contacts TEC and SC. The carriage is thus arrested in its leftward movement and closure of contacts SC, as will be explained hereinafter in connection with the wiring diagram, effects deenergization of the coil TS. This permits the parts to return to normal position, pinion 198 reengaging rack 194 before stop finger 303 is fully released from the stop portion 302a of the column stop now abutting said stop lever.

The key lever 232a of tabulating key 232 (Fig. 12) has a downwardly extending arm 232b provided with a pin in a slot formed in a horizontal link 323. A spring 323a, connected to link 323 and the pin on arm 232b, holds the pin in the right hand end of the slot. The rear end of link 323 is pivoted to the plunger 324 of a solenoid mounted in a shallow recess cast in base 50, the frame 325 supporting the coil TKS being secured to base 50 adjacent the recess. Link 323 has an upwardly and rearwardly extending portion provided with two pieces of insulating material abutting the ends of two sets of contacts TKC1, TKC2, hereinafter to be termed the tabulating key contacts. When the key 232 is depressed manually, both sets of contacts close. This result can also be secured by energizing coil TKS. The solenoid TKS will be termed hereinafter the tabulating key solenoid. Solenoid TKS may be energized under control of one of the column stops 302 as will be explained later in connection with the wiring diagram.

XV—Rebound mechanism

It has been found by experience that the carriage has a tendency to rebound while it is being fed by the escapement mechanism and also when the stops 302 are arrested by the stop finger 303. In order to prevent rebound there is provided a simple rebound mechanism which includes a pair of rebound pawls 325a (Figs. 6, 9 and 19) pivotally mounted on frame 60. These pawls are connected by a common operating spring 325b attached to ears formed in the pawls. Both pawls have bent-over lugs engaging ratchet teeth 325c formed in the top edge of rack 194. There are as many teeth 325c as there are teeth in the lower edge of rack 194 adapted to engage pinion 198.

The right-hand pawl 325a (Fig. 19) is designed to prevent rebound when the carriage is being fed under control of the escapement and its bent-over lug is designed to drop behind a tooth 325 when the escapement pawl 203 is about to strike stop lug 208 (Fig. 9) during escapement operations. Only sufficient clearance is provided to ensure that the right-hand pawl will drop behind a tooth 325c in the rack 194 and not engage such tooth by point-to-point contact when the carriage is arrested in each column position.

Rebound during tabulating operations is prevented by the left-hand pawl 325a and its bent-over lug is designed to drop behind a tooth 325c when the carriage is approximately halfway between successive column positions. The reason for this construction is to ensure that rack 194 will remesh with pinion 198 properly and avoid the possibility that a tooth in rack 194 might engage point-to-point with a tooth in pinion 198 and be liable to pass by the active tooth in pinion 198 when finger 303 is freed from a stop 302. This action, if permitted to occur during tabulating movement of the carriage, would cause the carriage to stop one column space further to the left than desired.

The combined action of stop finger 303 and the left-hand rebound pawl 325c is to positively stop the carriage approximately halfway between two successive column positions.

XVI—Carriage return mechanism

After each card has been punched, printed, and gripped by the feed rollers 158, 159, the card carriage is returned to a position to receive a blank card. This return movement takes place during an eject cycle and is effected by power. The power driven carriage return mechanism is illustrated in Figs. 3, 6, 10b, 15 to 19, and 34.

Screwed into a threaded hole in frame 54 and projecting toward the right (Fig. 15) is a long stud 326. Rotatably mounted on shoulders formed on this stud is a thin walled sleeve 327 to the right hand end of which is secured a gear 328 meshing with gear 149. Obviously gear 328 and sleeve 327 will rotate continuously while the machine is in operation. Loosely mounted on sleeve 327, to the left of gear 328, is a pinion 329 to which is secured a ratchet wheel 330. A second pinion 331 is loosely mounted on the shoulders in stud 326 to the right of gear 328 and is integral with a sleeve 332. Preferably pinion 331 and sleeve 323 are formed from a single piece. Loosely mounted on sleeve 332 is a narrow tape drum 333 to which is secured one end of a carriage return tape 334. Secured to the right hand end of sleeve 332 is a double armed member 335 (Fig. 34). Springs 336, anchored to ears formed in member 335 and to pins 337, 337a carried by drum 333, normally holds one of the arms of member 335 against pin 337, with the other arm of said member spaced from the second pin 337a.

The assembly of parts mounted on sleeves 327, 332 is held against axial movement on the stud 326 by means of a split ring sprung into a groove in said stud, a loose washer being interposed between said ring and sleeve 332. Stud 326 is drilled longitudinally and radially to provide oil holes which connect the spaces between sleeves 327, 332 and the shoulders in stud 326 with an oil cup 338 screwed into the right hand end of stud 326. A cover 339 is also mounted on the right-hand end of stud 326 and is held in place by the oil cup 338. A throat is moulded or stamped in cover 339 to permit the tape 334 to wind or unwind freely. The tape 334 passes over a pulley 340 (Fig. 15) rotatably mounted on a lever 341 pivoted at 342 to the front edge of frame 54 and said tape is secured to the carriage 174.

Gear 328 carries two intermeshing pinions 343 and 344 (Figs. 15 and 34) which are rotatably mounted in communicating recesses in the gear on pins supported partly by the gear and partly by brackets 345 fastened to opposite sides of the gear (Figs. 16 and 18). Pinion 343 meshes with pinion 329 while pinion 344 meshes with pinion 331. By this means the pinions 329, 331 and gear 328 are always operatively connected.

Normally the pull exerted by the tape 191 is considerably greater than the friction between the parts assembled on stud 326 so that with the carriage 174 at rest, drum 333 remains stationary, pinion 344 rolls over pinion 331 in a counter-clockwise direction (Fig. 16), gear 328 rotates in the same direction, and ratchet 330 is thereby driven idly in a clockwise direction (Fig. 17) by pinion 343. If the ratchet 330 is arrested by means about to be described, pinion 329 will become immovable, pinion 343 will roll in a clockwise direction about pinion 329, and pinion 344 will drive pinion 331 and drum 333 in the same direction, as the force derived from gear 328 is superior to the force exerted by tape 194. As a result tape 334 will be wound on drum 333 and the carriage 174 will be drawn to the right (Figs. 6 and 19).

The stoppage of ratchet 330 is effected by means of a hook 346 (Fig. 17) pivoted at 347 to frame 54 and adapted to engage ratchet 330. A long link 348 has a pin and slot connection to an arm forming part of hook 346 and is pivoted to a bell crank 349 fixed to the right-hand end of a shaft 350 journaled in frames 54, 55 (Figs. 10a, 10b). A spring 348a, connected to a pin on link 348 and the pin on hook 346, provides a yielding connection between said pin and link. Secured to the left-hand of shaft 350 (Figs. 4, 10a and 11) is a rock lever 351 best shown in Fig. 11. One arm of the lever 351 has an arcuate cam surface 352 bearing against a pin 353 carried by the three armed lever 110 which also carries the eject clutch coupling pawl 117. A bent-over lug formed in the other arm of lever 351 has an adjusting screw 354 adapted to limit clockwise movement of lever 351 by striking base 50. A spring 349a (Fig. 17) normally holds the arcuate cam surface 352 in contact with pin 353 in which position hook 346 is clear of ratchet 330 so that the latter may rotate freely. The spring 349a also tends, through arm 349 and link 348 to engage hook 346 with ratchet wheel 330.

During each eject cycle pin 353 will move in a clockwise direction (Fig. 11) and clear the cam surface 352 after about 45° of rotation of shaft 100, thereby permitting lever 351 and shaft 350 to rock clockwise until adjusting screw 354 strikes base 50. This results in drawing link 348 to the right (Fig. 17) permitting the hook 346 to engage ratchet 330 and arrest movement of the latter. As a result the tape 334 will be wound on drum 333 as described, drawing the carriage to the right (Figs. 15 and 19).

Before the carriage can be returned, however, it is necessary to disengage rebound pawls 325a from rack 194. For this purpose lever 341 extends to the left underneath the lugs in said pawls (Fig. 19). The initial tensioning of tape 334 causes pulley 340 and the right-hand end of lever 341 to be drawn downwardly against the tension of a spring 341a thereby raising the left-hand arm of lever 341 and lifting pawls 325a to the position of Fig. 20.

Lever 341 is held in the position of Fig. 20 by means of a latch 355 pivoted to the right hand end of lever 341 (Figs. 15 and 19) by means of the stud carrying pulley 340. Latch 355 has a lug 355a and a spring 356 attached to said latch normally holds the lug 355a against the right hand edge of a bracket 357 secured to frame 54. When the lever 341 is rocked as described lug 355a snaps under the edge of the bracket 351 and holds the lever in rocked position.

A three-armed lever 360 is pivoted on a stud 361 carried by rail 130. Stud 361 projects through a rectangular opening in latch 355 and is turned with a wide groove to permit the latch 355 to swing freely the limited amount necessary for latching purposes. One arm 360a of lever 360 projects upwardly in front of a bent-over lug 355b formed in latch 355. Another arm 360b of lever 360 is curved to the right and upwardly to a point near frame 54 and pivoted at this point to arm 360b is a vertical link 362 having a bent-over hook shaped part 363 embracing a stud 346a in hook 346. A spring 364, attached to frame 54 and to the lower end of link 362, holds the lower end of the link in contact with the hub of ratchet 330. A second spring 365 attached to frame 55 and link 362, normally tends to pull the link downwardly.

When the carriage is in the column 1 position the head of an adjusting screw 366 carried by a lug formed in carriage 174 engages the arm 360a and holds lever 360 in a position with arm 364a engaging lug 355b. In this position of the parts hook 346 is held out of engagement with ratchet 330. Also the third arm 360c of lever 360 does not quite engage the head of an adjusting screw 367 threaded into a stud 368 attached to frame 54 by a nut 369. In any position other than column 1 the parts occupy the position of Figs. 15 and 17 in which the pin 353 in the slot of link 348 prevents engagement of hook 346 with ratchet 330. When shaft 350 rocks clockwise to initiate a carriage return operation, hook 346 is drawn downwardly into engagement with ratchet 330. This causes link 362 to move downwardly, rocking lever 360 slightly counterclockwise from the position of Fig. 15.

Near the end of the carriage return movement of the head of screw 366 will strike arm 360 and rock it clockwise (Fig. 15), disengaging latch 355, and lifting link 362 far enough to disengage hook 346 from ratchet 330. Arm 360c strikes adjusting screw 367 when the carriage has traveled slightly farther to the right than the column 1 position. This slight overthrow of the carriage ensures that the pawls 201 (Fig. 9) will drop behind the proper teeth of pinion 198 before the returning movement of the carriage ceases. The carriage is drawn back to the column 1 position by the spring drum 190 and tape 191. The adjusting screw 367, and an adjustable stop 367a carried by the left hand end of frame 56 (Figs. 1 to 4, and 6) limit movements of the carriage to the right and to the left, respectively.

*XVII—Eject key mechanism*

An eject cycle may be initiated by depression of the eject key 233. The mechanism controlled by this key is best illustrated in Fig. 14.

The eject key lever 233a is provided with a downwardly extending arm 233b pivoted to a horizontal link 370 slidable at its rear end in combs 256. Forwardly of combs 256 the link has a step or shoulder 370a adapted, when the key 233 is depressed, to permit the link to be drawn downwardly slightly by a spring 370c and lock the key in depressed position by contact with the side of the lower comb 256. The rear end of the link 370 has another shoulder 370b and also abuts the free end of a hook-shaped coupler or latch 371 pivoted on an arm 372 secured to shaft 350 adjacent frame 54. A spring 373, connected to latch 371 and arm 372, holds the latch in the normal position of Fig. 14 with the nose of the hook portion of the latch bearing against the rear side of angle strip 265.

Link 370 has a pin and slot connection to one arm of a bell crank 374 pivoted on shaft 214. The other arm of said bell crank has a pin and slot connection to the plunger 375 of a solenoid whose coil is designated EKS. The coil EKS is mounted in a solenoid frame 376 secured to frame 60. This solenoid will be termed the eject key solenoid. Obviously, energization of solenoid EKS will cause depression of the eject key 233 and movement of link 370 rearwardly to latching position.

When link 370 is moved rearwardly, either by the solenoid EKS, or manually by depression of key 233, the link is latched by its shoulder 370a and also moves latch 371 away from angle strip 265. The subsequent rotation of shaft 350 as described to initiate a carriage return operation causes arm 372 to be depressed, pulling down latch 371 until a shoulder 371a therein slips underneath shoulder 370b of link 370, spring 373 then rocking latch 371 back against the end of link 370. Near the end of an eject cycle or after about 300° of rotation of shaft 100 (Fig. 36), shaft 350 starts to return to normal position and, by coaction of latch 371 with shoulder 370b, lifts the link 370 far enough to free shoulder 370a from comb 256 and permit the key 233 and link 370 to return to normal position as in Fig. 14. The actual point at which the key 233 returns is somewhat indefinite due to the small size of shoulder 370a and permissible slight variations in the dimensions of the parts permitted by production standards. This does no harm as the least 40° of shaft 100 is mainly idle movement.

Link 370 also has a pin and slot connection to a long lever 377 pivoted at 378 to frame 60. Lever 377 extends diagonally upwardly (Figs. 6 and 9) to a point beneath the rear end of stop finger 303 which has a slotted bent-over lug 303a in the slot of which the upper end of lever 377 is guided, a lug 377a in lever 377 extending into the slot in said lug. The slot is long enough to permit the stop finger 303 to rock clockwise (Fig. 14) as described above, the lug 377a merely guiding the finger 303. When the eject key is depressed the upper end of lever 377 moves into the slot in the finger 303 and obstructs movement of said finger into the path of any of the stops 302.

Lever 377 is provided to prevent movement of stop finger 303 when it is desired to initiate an eject cycle automatically or manually when the card carriage is not in its last column position.

Secured to the lower end of lever 377 is a block of insulating material 379 (Fig. 14) abutting one member of a pair of contacts EKC which are mounted on frame 376. When the eject key 233 is depressed block 379 is moved to the right closing contacts EKC. These contacts will be termed the eject key contacts.

*XVIII—Miscellaneous control contacts*

There are a number of special control contacts, not mentioned so far, which will now be described in detail.

Figure 30A:
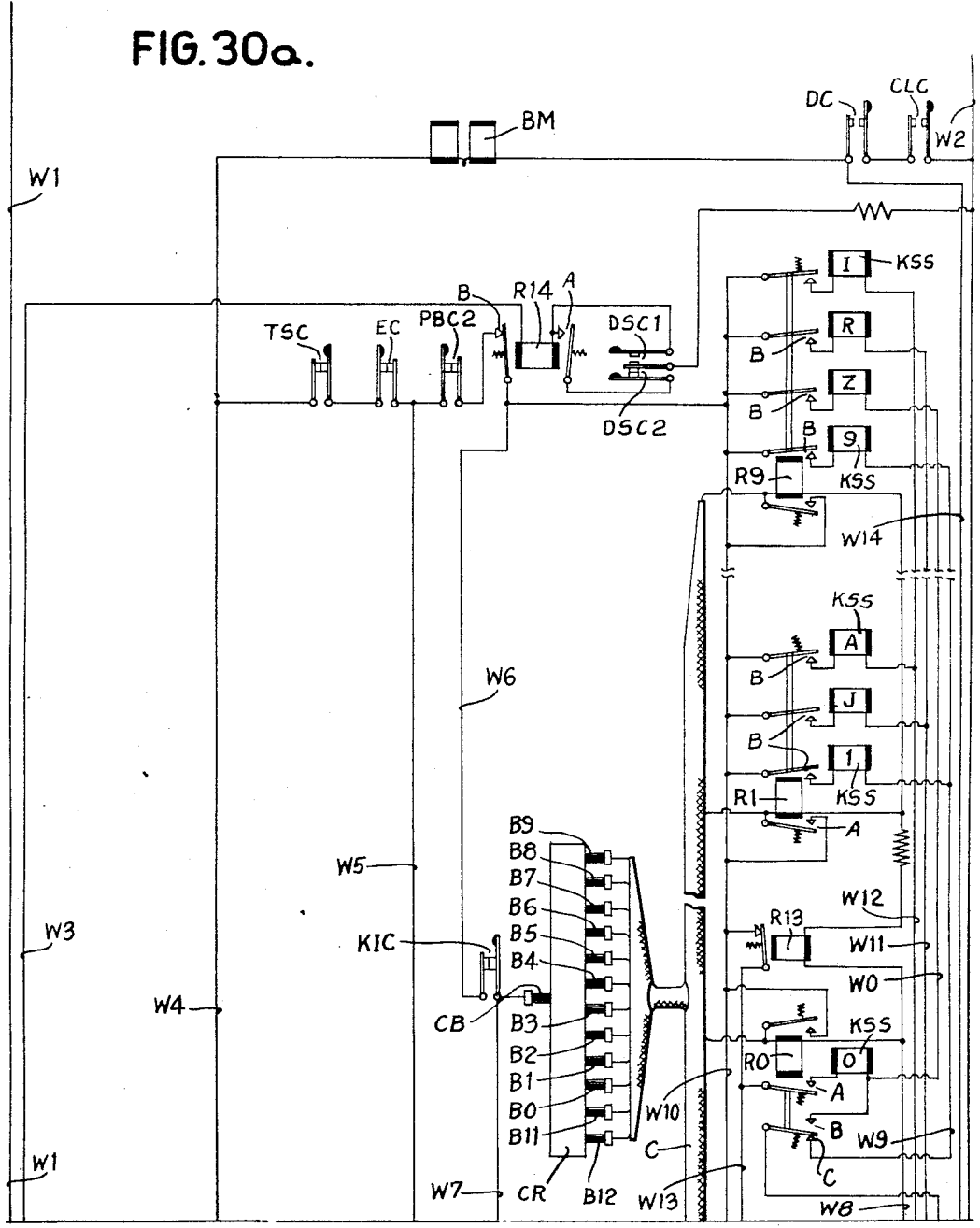
Figure 30B:
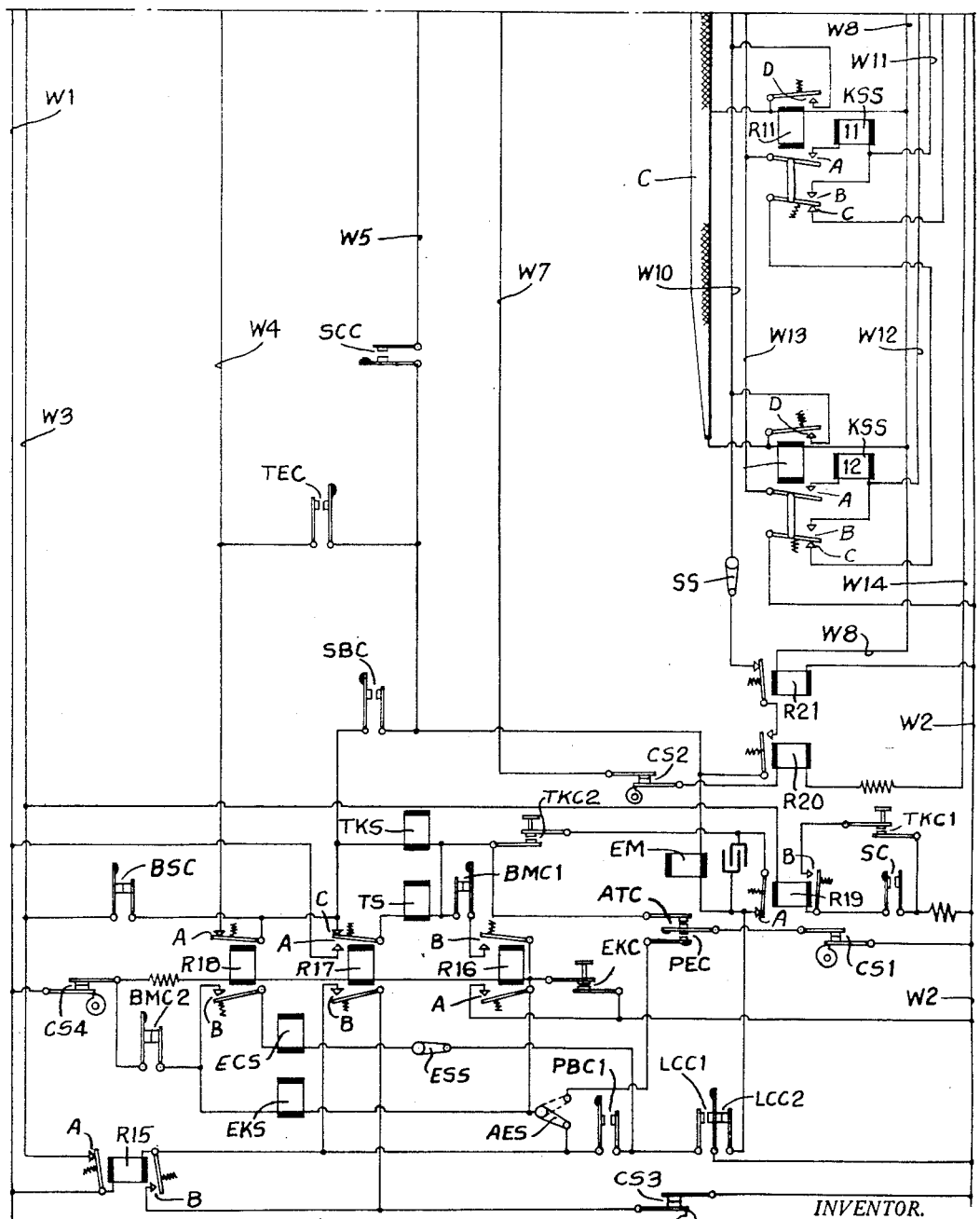

The space bar 229 actuates certain contacts called the space bar contacts and designated SBC in Figs. 30b and 37. These contacts are normally open and are mounted on the left hand end of frame 240. The arms 229a, 229b of the ball which supports the space bar 229 are joined by a stiffening cross bar 229c riveted to said arms.

Riveted to arm 229b is a finger 229d carrying at its upper end an insulating button or stud 229e which normally keeps contacts SBC separated. When the space bar is depressed, however, finger 229d moves forwardly and permits contacts SBC to close. These contacts control escapement magnet EM as will be explained more fully hereinafter.

Extending beneath arms 229a, 229b and key levers 230a to 233a, inclusive, is a bail 380 (Fig. 38) pivoted on studs 382 carried by frames 54, 55. A spring 381, connected to a pin at the mid point of bail 380 and the angle bar 262, normally holds the bail against the lower edges of the key levers. The right hand end of bail 380 has an arm 380a carrying an insulating button bearing against one member of a pair of contacts KIC, hereinafter to be termed the key interlock contacts. Normally spring 381 holds the contacts KIC closed but depression of any key or the space bar 229 causes contacts KIC to open. As will be shown later herein contacts KIC interrupt the automatic duplicating circuits when printing and punching is being controlled by manual operation of the keys.

The stops 302 on the carriage control a group of contacts to cause certain operations to be initiated or terminated automatically without requiring depression of keys or other manual operations. There are five possible controls which can be effected automatically under control of stops 302. The respective contacts for these controls are listed below together with their function.

1. Automatic tabulating contacts ATC initiate operation of the tabulating mechanism automatically at any column of a card.

2. Predetermined eject contacts PEC automatically initiate an eject cycle when the carriage is in a position to print and punch in a predetermined column.

3. Single column space contacts SCC cause escapement magnet EM to be energized once to skip a single column without punching or printing.

4. Duplicating stop contacts DSC1 cause duplicating to stop automatically at a predetermined column of the card.

5. Duplicating start contacts DSC2 cause duplicating to start in a predetermined column.

The five sets of contacts enumerated above are carried by two rows of spring contact members insulated from each other and a bent over lug 306a (Figs. 23 and 24) on which they are mounted and which is formed in the frame 306 already mentioned. These contacts are controlled by suitable cam lugs 302b (Fig. 24) formed in the stops 302. There are five different stops 302 so provided with cam lugs 302b which are located different distances from the stop portions 302a. The stop having its lug 302b farthest from the stop portion 302a will be called the No. 1 stop, the one foremost in Fig. 24 the No. 2 stop, and so on, from left to right.

The first or left hand vertical row of contacts (Fig. 24) comprises the contacts PEC, ATC, and SCC while the right hand row comprises contacts DSC1 and DSC2, reading from bottom up in each case.

These contacts are operated by five pins 386 of insulating material which are secured to certain of the contact members and guided by vertical holes in a flange formed in a comb 306b integral with frame 306. Each pin bears on top of the right hand end (Fig. 23) of a lever 387 pivoted on a long stud 306c carried by a second comb 306d also integral with frame 306. Each lever 387 is guided in the slots formed in combs 306b, 306d, which slots are open at the bottom. The upper ends of the slots limit the movement of the levers 387 to the small amount necessary to operate the various contacts. The levers 387 have cam projections 387a adapted to be engaged by the respective cam lugs 302b of the stops 302 during movement of the carriage 174 which movement causes the levers to be pushed upwardly to operate the respective contacts.

The No. 1 stop 302 causes the extreme left hand pin to be pushed upwardly. This pin is secured to the end of the contact member common to contacts ATC and PEC so that contacts ATC close when this pin is pushed upwardly. The second pin from the left is secured to the lowest contact member in the first row and has the effect of closing contacts PEC when pushed up by the action of the No. 2 stop. The third pin on the right is secured to the second contact member from the top in the first row and, when pushed upwardly by the action of the No. 3 stop, causes contacts SCC to close. The fourth and fifth pins from the right are secured to the lowest and uppermost members of the second row, respectively, so that contacts DSC1 close and DSC2 open when their respective pins 386 are pushed upwardly in response to coaction of the Nos. 4 and 5 stops with their levers 387.

The five positions of the cam lugs 302b are indicated in Fig. 24 by the small numerals 1 to 5 above the notches in comb 306b. Figs. 23 and 24 show the normal position of the contacts. A cover 388 secured to frame 56 protects the contacts from dirt and accidental damage or tampering by the operator.

In addition to stops provided with lugs 302b, there may be one or more stops 302 which do not have such lugs. These latter stops will be termed the No. 6 stops and merely engage the stop finger 303 during tabulating operations to arrest the carriage when it is being tabulated either automatically, under control of a stop with lug 302b in the first position, which causes contacts ATC to close, or manually under control of the tabulating key 232 which has already been mentioned. If desired, any one of the stops provided with a lug 302b may be used for the latter purpose by reversing its position on the rack so that its lug 302b projects below instead of above the rack 300. By means of these stops 302, the machine may be completely automatically controlled in various ways so as to operate continuously without the intervention of the operator other than to insert blank cards or remove the punched cards when necessary. The manner in which these different stops automatically control the various operations with which they are concerned will be brought out more fully hereinafter in connection with the wiring diagram.

When the carriage is moving from the next-to-the-last column position to the last column position, certain contacts called the last column contacts are operated. These contacts are designated LCC1 and LCC2 in Fig. 22 and are mounted on the left hand side of the frame 55 adjacent the rear end of a two armed bracket 390 secured to said frame. Journaled in the two arms of the bracket 390 is a short shaft 391 to the front end of which is secured an arm 392 connected by a spring to the front arm of said bracket. The upper end of arm 392 is rounded and adapted to engage the head of an adjusting screw 393 carried by the rear side of carriage 174 (see Fig. 6). Secured to the rear end of the shaft 391 is a second and longer arm 394 having an insulating pin 395 which normally bears against the common member of contacts LCC1 and LCC2 holding contacts LCC2 closed and LCC1 open. When the carriage reaches the next-to-the-last column position, the adjusting screw 393 barely touches the upper end of lever 392. In escaping to the last column position, the arm 392 is rocked counterclockwise (Fig. 22) causing contacts LCC1 to close and contacts LCC2 to open, this condition being attained when the carriage comes to rest in the last column position. These contacts, besides having certain interlock functions, also initiate an eject cycle automatically when the carriage comes into the position in which the punched card is to be ejected and a blank unpunched card is to be substituted therefor. Arm 394 also controls a slide 394a adapted to lock the escapement against operation when the carriage is in the last column position. The left hand end of the slide is shown in Fig. 22 as slotted to embrace the upper end of lever 394 to which it is yieldingly connected by a spring 394b. The slide 394a extends through a slot in frame 55 (Fig. 4) to a point in the rear and slightly to the right of an extension 204a of plate 204 (Figs. 9 and 31). At this point it is guided for leftward sliding movement by a screw stud extending through a slot in the slide and threaded into the top part of frame 60. The slide has a hook portion 394c adapted, when the slide is moved to the left, to engage extension 204a and lock the plate 204 against forward movement. Obviously the rocking of arm 394 by the carriage when it moves to the last column position will cause slide 394a to move to the left (Figs. 9 and 22) and lock the escapement mechanism against operation. Spring 218 permits bail 213 (Fig. 9) to rock during the operation of the punching the last column without danger of breakage of or jamming of any of the parts. The purpose of the mechanism just described is to lock the escapement in normal position when punching in the last column to prevent the carriage from slipping from the column 1 position to the column 2 position when the carriage return mechanism is disengaged after returning the carriage to the column 1 position.

Rocking of the shaft 214 and the bail 213 operates certain contacts called punch bail contacts and designated PBC1 and PBC2, respectively in Fig. 7. Secured to the left hand end of the shaft 214 (Fig. 9) is a block of insulating material 400 which has two lugs each underlying one member of the contacts PBC1 and PBC2 which are secured to frame 60. When the shaft 214 and bail 213 rock clockwise (Fig. 7), contacts PBC1 close and contacts PBC2 open.

XIX—Back-space mechanism

Certain contacts BSC called the back spacing contacts are opened whenever back-spacing lever 401 (Figs. 3 and 19) is operated. The back-spacing lever is pivoted near its lower end on the stud 357 and has a notch engaging a pin 402 on the slotted end of a rod 403 slidably mounted in the tube 181. The back space lever projects into the slot in rod 403. The tube 181 is slotted to guide a block 404 secured to the rod 403 by means of a screw 405. Pivotally mounted on block 404 is a back-space dog 406 normally urged in a counterclockwise direction (Fig. 19) by means of a spring 407 secured to pins carried by the block 404 and dog 406. The latter has a tooth portion 406a adapted to engage the teeth of rack 194 but in the normal position of the parts shown in Fig. 19, it is prevented from doing this by a pin 408 carried by the frame 60. Pin 408 has a flat milled thereon, against which the dog bears, and is adjustably rotatable in frame 60 to provide for a limited amount of adjustment. For this purpose the pin is secured in a hole in the frame by means of a set screw shown in Fig. 9.

When the back-space lever 401 is rocked clockwise manually (Fig. 19), the rod 403 will be drawn to the right and spring 407 will rock the dog 406 counterclockwise (Fig. 19) as the rod 403 moves to the right, thus carrying the tooth portion 406a of the dog into engagement with the teeth on rack 194. Full engagement of the tooth portion 406a takes place before the rod 403 has moved to a limiting position determined by an adjusting screw 409 carried by back space lever 401 striking frame 54. During the rest of the movement of the rod 403, the rack 194 will be forced to the right (Fig. 19) thus back-spacing the carriage. The adjustment of the screw 409 is such that the movement imparted to the carriage will be equal to one column space. At the point where movement of the carriage actually begins a tail in the dog 406b will engage the top of the block 404 and prevent further rocking movement of the dog on the block 404 so that the carriage will be positively removed the required distance.

As the rebound pawls 325a always tend to engage the teeth in the upper edge of rack 194, it is necessary to lift these pawls out of contact with rack 194 before the dog 406 commences to move the carriage in back-spacing operations. For this purpose, the tube 181 is slotted near its right hand end and extending through this slot and screwed into rod 403 is a conical stud 410 which normally abuts an inclined lug 411 formed in the left hand end of lever 341. The initial movement of rod 403 to the right (Fig. 19) causes the left hand end of lever 341 to become lifted thus raising the dogs 325b out of contact with the rack 194 as shown in Fig. 20. Fig. 20 shows the condition of the parts at the end of the back spacing movement. When released, the back-space lever 401 is restored by means of a spring 412 thus forcing rod 403 back to the position of Fig. 19.

The back-space lever is provided with an offset pin 413 (Fig. 3) of insulating material which engages one member of contacts BSC mounted on the right hand side of frame 54. When the back space lever is operated to back-space the carriage, the pin 413 is effective to open the contacts BSC.

XX—Duplicating mechanism

Means is provided for controlling the machine automatically by means of a master card punched like the ones shown in Figs. 25 and 26. Either an entire master card may be duplicated automatically or only selected parts of the master card will be duplicated, the selected parts which are to be automatically duplicated being punched under control of Nos. 4 and 5 stops 302 set at the proper column positions on the rack bar 300. The mechanism for automatically duplicating master cards comprises a card reading table, certain relay mechanism, and key selecting solenoids for operating the numerical and letter keys of the machine.

The card reading table is generally designated 420 (Figs. 1 to 6, 27 and 28), and is composed of a long narrow casting formed with two lugs 421 (Figs. 5, 27 and 28), which lugs are pivotally connected to rearward extensions or arms 422 in the frames 54, 55. In the present case, the table 420 is horizontal and is held in such position by means of a screw stud 423 (Figs. 1 and 6) which is threaded into a hole in the frame 56 and has a turned shoulder closely fitting a hole in the front part of the casting which comprises the table 420. The casting comprising table 420 is slotted to embrace the frames 54, 55 which frames contact with the upper ends of the slots to support the table 420 (see Figs. 5 and 28). While the table has been shown as mounted in a horizontal position, it may be more convenient in some cases to mount it in an inclined position sloping upwardly from front to rear at an angle of approximately 45° in order to give the operator a better view of the master card while cards are being punched.

Secured to the top face of the card table 420, as by screws 424, is a pair of guide plates 425, 426 which are raised or spaced from the surface of the table by means of thin spacer strips 427 shown in dotted lines in Fig. 27. A shallow rectangular groove 428 is cut lengthwise of the table 420 near its front edge (Fig. 28). At a point substantially near the center of the table, plates 425, 426 are formed with upturned lugs 425a, 426a to which is pivoted a housing 429. The upper half of housing 429 is substantially semi-cylindrical and closed at both ends, and rotatably mounted therein is a contact roll CR which consists of a metallic cylinder mounted on a tube of insulating material. A long screw stud 430 rotatably supports the contact roll CR in the housing 429.

Integral with housing 429 is a long arm 431 which extends to the left to a point adjacent the extreme left hand end of table 420. Mounted in a vertical slot in the table 420 to the left of the free end of arm 431, is a spring operated latch 432 adapted to hook over the end of the arm 431 and hold the latter in a horizontal position as in Figs. 27 and 28. When the latch 432 is pushed to the left, a coil spring 433, located in a socket formed in table 420 presses on the underside of housing 429 to the left of lug 425a and causes the arm 431 and housing to rise far enough to lift the contact roll CR clear of the table 420. This movement is limited by contact of a lug 429a formed in the housing with the top surface of plate 425.

The spacers 427 are spaced apart slightly more than the width of a punched card (Fig. 25) so as to act as guides for the passage of the master card from right to left during punching operations. The inner edges of those parts of plates 425, 426 to the left of lugs 425a, 426a coincide with the inner edges of spacers 427. By releasing the latch 432 a punched master card can be slipped under the arm 431 and laid face up between the spacers 427 with the right hand shorter edge of the card beneath contact roll CR, as shown in broken lines in Fig. 27. The arm 431 is then pushed down into latching engagement with latch 432. The arm 431 thus keeps the master card flat on the card table in the shallow channel formed by spacers 427.

Arm 431 has been termed the "door" in machines of this type. It also operates certain contacts called the door contacts and designated DC in Figs. 27, 28 and 30a. These contacts consist of two spring contact members which normally tend to separate and are insulatably mounted on a lug integral with that part of the casting comprising card table 420 underneath the left hand end of door 431. A long pin 434 of insulating material is secured to the upper contact member and extends into a vertical hole in the top of table 420. A button 431a is secured to door 431 opposite the end of pin 434 and bears on the latter when the door 431 is latched thereby holding the door contacts DC closed. When the latch 432 is released and the door is raised in response to spring 433, button 431a moves away from pin 434 and allows the door contacts DC to open.

The inner edges of those parts of plates 425, 426 to the right of lugs 425a, 426a extend nearly over the edges of groove 428 so as to overlie the master card when it is moved to the right of housing 429 and prevent such card from buckling or springing upwardly. In order to facilitate insertion and removal of the master card, the table is shaped with a deep pocket 420a open at its left hand end which permits the operator to insert several fingers under the master card to remove or insert it.

When the door 431 is latched as in Figs. 27 and 28, the cylindrical surface of the contact roll CR will bear lightly on the surface of the master card. Opposite the contact roll is an oblong opening in the surface of the table 420 and secured in this opening is an analyzing brush guide block 435 made of insulating material, block 435 being secured to the underside of table 420 by means of screws 435a. The upper face of the brush guide block is flush with the surface of the table 420 so as to offer no obstruction to free movement of the card. There are thirteen openings or throats formed in the block 435, twelve of which are opposite the twelve index point positions of the card columns of the master card, while the thirteenth is to one side of the top edge of the master card (Fig. 28). Into the openings in block 435 project thirteen card analyzing brushes designated B0 to B12, and CB. Brushes B0 to B12 are adapted to bear on the underside of the master card when raised by mechanism about to be described. Brush CB is a common brush which never touches the card but connects contact roll CR to the duplicating circuits when the brushes are raised for duplicating operations.

Secured to the underside of table 420 is a sheet metal frame 436 in the sides of which is pivoted a bail 437. A bar of insulating material 438 is secured to bail 437 and has thirteen transverse slots in which the brushes CB, and B0 to B12 are secured by means of eyebolts 439 of special shape. The two arms of bail 437 have extension 437a provided with bent-over lugs extending into slots formed in the arms of a second bail 440 also pivoted in the sides of frame 436 to the left of bail 437. Secured to bail 440 is the armature 441 of a bipolar magnet BM, hereinafter termed the brush magnet, mounted in frame 436. A spring 442, connected to the center of bail 440 and to a bent over lug 436a formed in frame 436, normally tends to pull the bail 440 and armature 441 to the right away from the poles of magnet BM and thereby hold the brushes B0 to B12 down away from the underside of the master card. Movement of the bail 440 to the right in response to spring 442 is limited by a second lug 436b in frame 436 which lug acts as a stop. When magnet BM is energized bail 440 is rocked counterclockwise (Fig. 28) rocking bail 437 clockwise and raising brushes B0 to B12 into contact with the master card and brush CB into contact with the contact roll CR.

Bail 440 also operates certain contacts called the brush magnet contacts and designated BMC1, BMC2 in Figs. 27, 28 and 30b. Secured to the rear arm of bail 440 is a block 443 of insulating material. Contacts BMC1, BMC2 are mounted on the inside of frame 436 in the rear of magnet BM and are normally closed. Block 443 has two lugs, one for each pair of contacts and these lugs act to separate both pairs of contacts when bail 440 is rocked counterclockwise to raise the brushes into contact with the master card.

In order to connect brushes B0 to B12, and CB to the duplicating circuits, the shank of each projects beyond block 438 through the axis of the pivots for bail 437. A boss or lug formed in the underside of table 420 carries two strips of insulating material 444, 445. The uppper strip 444 has thirteen vertical and parallel slots on its underside adapted to receive thirteen contact fingers 446 which extend to the left and bear against the flattened shanks of brushes CB and B0 to B12. Fingers 446 projects slightly below the lower face of the upper strip 444. The lower strip 445 bears against the lower edges of the fingers 446 and is clamped to strip 444 by means of two bolts. Three screws 448, passing through both strips 444, 445 secure this assembly to aforesaid boss on the underside of the card table 420. In effect the shanks of the brushes pivot on the ends of fingers 446, thus contact is always made regardless of the position of the brushes.

Card lever contacts are provided which are closed only when the master card is in its proper position. These contacts are designated CLC in Figs. 27, 28, 29, and 30a. They comprise spring contact members mounted on the underside of table 420 and extend forwardly almost to the front wall of table 420. Contacts CLC normally tend to separate by spring action. The contact roll CR is cut away at its forward end (Figs. 27 and 29) between the brush B9 and the lower edge of the master card. Opposite the cut away portion is the rounded end of a card lever 449 pivoted at 450 to the front wall of table 420. Secured to the right hand end of lever 449 is a pin made of insulating material and underlying the lowest number of contacts CLC.

When there is no master card on the table 420 the spring tension of the lower contact member is sufficient to hold the left hand end of lever 449 in the position of Fig. 29 where contacts CLC are open and the rounded end of lever 449 projects slightly above the top surface of table 420 into the cut away portion of contact roll CR. When latch 432 is released and door 431 raised to insert a master card, the right hand lower corner of such card will slip over the rounded end of lever 449. Closure of the door and lowering of contact roll CR causes the master card to be pressed flat against the top surface of card table 420 and the pressure of the card on lever 449 will cause the contacts CLC to close.

The master card is fed by the card carriage 174 through the medium of arms 460, 461 (Figs. 1 to 4, 6, 19, 27, and 28). These arms are removably secured to the carriage frame 174 by means of nuts threaded on the screw studs 174b which are used to adjust bar 300, as shown in Figs. 6 and 19, the arms having slots open at the rear which embrace the screw studs. The extreme lower ends of arms 460, 461 are secured to carriage 174 by means of nuts on screw studs 462 threaded into holes in the carriage.

The arms 460, 461 extend above the level of table 420 (Fig. 3) and rearwardly along the surface of said table. Above the groove 428 the arms extend downwardly a slight amount into the groove and are bent parallel with the flat bottom of the groove (Figs. 27 and 28) to provide short lugs to which are secured pusher blocks 463 of insulating material. These pusher blocks engage the ends of the master card and compel it to travel in unison with the carriage. Adjacent the groove 428 the right hand side of brush guide block 435 is cut away or recessed down to the level of the groove and far enough to the left to permit the right hand block 463 to push the master card to the last column position.

When it is desired to make repairs or adjustments to the duplicating table and parts concealed underneath it, the nuts on studs 174b and 462 may be loosened permitting arms 460, 461 to be swung forwardly about screw studs 462 as pivots far enough to clear table 420. Screw 423 can then be loosened enough to permit swinging card table 420 upwardly and rearwardly to render accessible the parts of the machine beneath or mounted on the underside of the card table.

In order to compensate for the length of the blocks 463 and to enable arm 460 to clear cover 388, the arm 460 is made Z-shaped as viewed from the front (Fig. 6) while arm 461 is straight. The master card is thereby offset to the left relative to the card between arms 175, 176 and the brushes B0 to B12, and CB are so located that when the card carriage 174 is in a given column position said brushes will be directly beneath, if not actually contacting the corresponding column of the master card. The brushes will actually be in contact with the master card only when magnet BM is energized.

The brushes B0 to B12 control the keys 230, 231 through key selecting solenoids designated KSS in Figs. 1, 3 to 5, 7, 30a, and 30b. The electrical connections and operation of solenoids will be explained more fully hereinafter in connection with the wiring diagram.

As shown in Figs. 1, and 3 to 5, inclusive, the solenoids KSS are adjustably secured to the top of a plate 500 and project upwardly beneath the key levers of the numeral and letter keys 230, 231. There is a solenoid KSS for each numeral and letter key. Plate 500 is secured to forwardly and downwardly extending parts of frames 54, 55. In order to provide room for mounting plate 500 and solenoids KSS, the base 50 is formed with a shelf portion 501 (Figs. 1 and 5). There are four rows of solenoids KSS which are arranged according to the same plan as the keys so that there is a solenoid KSS directly beneath each key 230, 231. Solenoids KSS are of the iron clad type in which the coils are completely enclosed by a shell which forms part of the magnetic circuit and secured to the upper end of each shell is a slotted fulcrum post 502 in the slot of which is pivoted one end of a short lever 503. Adjacent fulcrum posts 502 the levers 503 are pivoted in the slotted ends of the plungers 504 of the solenoids. The levers 503 of the two rear rows project forwardly while the reverse is the case with the two forward rows. The free ends of the levers 503 are pivotally connected to the corresponding key levers 230a, 231a by means of links 505 arranged in two rows.

Obviously the energization of any solenoid KSS will cause its associated key lever to be depressed and the machine will operate to print and punch the card in exactly the same manner as when the key lever is manually depressed. The brushes B0 to B12 control the selection of the solenoids KSS through certain relays designated R0 to R12 of which only five are shown in Figs. 30a and 30b. The operation of these relays under control of brushes B0 to B12 will be explained in a following section. The coils of relays R0 to R12 are connected directly to the brushes B0 to B12, respectively, through the wires of a cable C. The keys which the relays KSS control are indicated by the letters and numerals within the symbols identified by the letters KSS in Figs. 30a and 30b. The top four solenoids in Fig. 30a operate the I, R, Z, and 9 keys respectively.

In order to facilitate assembly, repair or replacement, adjustment, and testing of the solenoids KSS, there is provided a terminal board 520 mounted on two forwardly projecting brackets 521 secured to plate 500 (Figs. 1, 3 and 5). This terminal board consists of a bar of insulating material having at least twice as many slots cut in its top surface as there are solenoids KSS. These slots are intersected by vertical holes which receive clamping screws or eye bolts 522, the upper ends of which have rectangular openings adjacent the slots. Into each of these openings in screws 522 projects one arm of an L-shaped terminal lug 523 which also is embraced by corresponding slot in bar 520 and thereby the screws and lugs are prevented from turning about the longitudinal axis of the screws. The lower ends of the clamping screws are threaded into the ends of slotted clamping sleeves or thimbles 524 received in the lower ends of the vertical holes in bar 520. By turning thimbles 524 with a screw driver, the screws 522 are drawn downwardly thus securely clamping the terminal lugs 523 in the slots in bar 520. The two ends of the winding of each solenoid KSS are connected to separate lugs 523. In order to secure compactness and at the same time prevent danger of contact between the different lugs 523, the vertical holes in bar 520 are staggered and arranged in four parallel rows. The wires 525 which connect the solenoids KSS to the various relays and circuits of the machine are provided with round plugs 526 which are forced into the holes in the slotted ends of thimbles 524. Said plugs fit the thimbles tightly enough to prevent the plugs from loosening readily but they may be easily withdrawn by means of pliers or similar tool.

XXI—Inking ribbon feed mechanism

The inking ribbon feeding mechanism forms no part of the present invention and only a few parts have been shown in Figs. 2 and 5, mainly the shaft 600 from which the feeding movement is derived and the short vertical shafts 601 which connect shaft 600 to the ribbon spools 246. This section will deal only with the means for rotating said shafts. The mechanism connected to shaft 600 by means of which the feed imparted to spools 246 is reversed may take any well known form and will not be described herein. Shaft 600 always rotates in a counterclockwise direction (Figs. 3, 5, and 17) and derives its movement from shaft 214. The latter extends to the right and terminates just flush with the left hand face of frame 54 and on the right hand side of said frame (Figs. 3 and 17) an arm 602 is secured to shaft 214 by means of a long hub extending through a hole in frame 54. Pivoted to arm 602 is a link 603 extending forwardly beneath a ratchet wheel 604 secured to the right hand end of shaft 600. The free end of link 603 has a bent-over beveled lug 603a adapted to engage the teeth of the ratchet 604. A spring 605 attached to link 603 and frame 54 holds the lug 603a against ratchet 604. Obviously the link 603 will be vibrated to the left and back (Fig. 17) each time bail 213 and shaft 214 oscillate during a punching operation and will cause the ratchet wheel 604 and shaft 600 to rotate an increment. This movement is communicated to shafts 601 and ribbon spools 246 through the ribbon reversing mechanism. A pawl 606 carried by frame 54 prevents reverse movement of ratchet 604.

XXII—Chip agitator

The chips from the punches have a tendency to accumulate in front of the die 282 (Fig. 7) sufficiently to interfere with the operation of the punches. In order to prevent the accumulation of chips there is provided a chip agitator 625. This part consists of a narrow metallic strip with a number of rearwardly extending prongs or tabs formed therein which project downwardly and rearwardly fairly close to the openings in the die 282. This strip is adapted to be reciprocated vertically in the narrow channel in die 282 and for this purpose is secured to a member 626 bent forwardly and downwardly into a space formed in the rear part of segment 235 and in front of frame 236. A rock lever 627 shown in dotted lines in Fig. 1, is mounted in a horizontal recess in segment 235 connected with the space into which member 626 extends, the lever 627 being pivoted on a shoulder in the rear end of a screw stud 628 carried by the segment. The lower end of member 626 is pivoted to the left hand end of lever 627 while the right end of said lever is pivoted to a vertical link 629. The latter (Figs. 15 and 17) is pivotally connected to one arm of a bell crank 630 pivoted on a stud carried by the left hand side of frame 54. The other arm of bell crank 630 is connected by a link 631 to an arm 632 secured to shaft 214 (see Fig. 9 also). Link 631 is connected to arm 632 by a pin and slot connection, a spring 633 connected to the pin on arm 632 and the end of link 631 normally holding the pin in the rear end of the slot. When shaft 214 is oscillated during a punching and printing operation, the parts just described are effective to first raise then draw down the chip agitator 625. If the latter should partly jam on the down stroke, spring 633 will yield and the pin on arm 632 will move idly in the slot in link 631 thereby preventing damage to the chip agitator.

XXIII—Operation with manual control

It will be assumed that the card carriage 174 is in its extreme right hand or column 1 position and that no card is between the arms 175, 176. In order to get a blank card in position to be punched, it is necessary to initiate an eject cycle by depressing eject key 233. With the automatic eject switch AES and eject stop switch ESS in full line positions (Fig. 30b) the following operations take place when the eject key is depressed:

Eject key contacts EKC close (Figs. 14 and 30b) and the eject key is latched down by shoulder 370a. A circuit is then established as follows:

Line wire W1, contacts CS4, coils of relays R18, R17, R16, and eject key contact EKC, to line wire W2. Relay R18 opens its contacts A, thereby completely disconnecting wire W4 and the automatic spacing and duplicating circuits connected to said wire, and closes its contacts B.

Relay R17 closes its contacts A and opens its contacts C to connect the tabulating solenoid TS directly to the line wire W1, and closes its contacts B. Relay R16 closes its contacts A to establish a holding circuit for relays R16, R17, R18, and closes its contacts B thereby completing a circuit through tabulating solenoid TS extending from line wire W1, contacts A of relay R17, tabulating solenoid TS, brush magnet contacts BMC1, contacts B of relay R16, and eject key contacts EKC and contacts A of relay R16, to line wire W2. Closure of contacts EKC also energizes relay R15 through switch AES and the eject key solenoid EKS through contacts BMC2 and CS4. Relay R15 opens its contacts A and disconnects wire W3 from line wire W1 thereby ensuring that the brush magnet BM will remain deenergized. The circuit for relay R15 extends from line wire W1 the coil of relay R15, switch AES, and contacts EKC, to line wire W2. Contacts B of relay R15 establish a holding circuit for said relay through cam contacts CS3.

The energization of the tabulating solenoid TS (see Fig. 14) causes the rack 194 to become disengaged from pinion 198 but the stop finger will be prevented from moving into the path of a stop portion 302a due to the action of lever 377 connected to the eject key as described.

As a result, the carriage will move completely to the left until stopped in the last column position by the stop 367a and the column contacts LCC1, LCC2 will be closed and opened, respectively. The opening of contacts LCC2 disconnects the escapement magnet EM from line wire W2, while closure of contacts LCC1 initiates an eject cycle by a circuit established as follows: Line wire W1, cam shaft contacts CS4, brush magnet contacts BMC2, contacts B of relay R18, eject clutch solenoid ECS, eject stop switch ESS, and contacts LCC1, to line wire W2. The energization of the solenoid ECS causes shaft 100 (Figs. 10a and 11) to be driven by shaft 64 as previously described.

During the first part of the eject cycle the arms 175, 176 (see Fig. 36) and the card flippers 94 are moved rearwardly. The feed rollers 158, 159 are also engaged about this time. Then the pin 353 releases arm 351 (Fig. 11) allowing shaft 350 to rock clockwise (Fig. 17) and cause the carriage return mechanism to start returning the card carriage 174. Near the middle of the cycle (Fig. 36), while the carriage is returning, cam 137 operates the card picker (Figs. 1 and 2) to push the first blank card toward feed rollers 143, 144 which then grip the card and commence feeding it into the card guide frame (Fig. 6).

After about 240° of rotation of shaft 100 (Fig. 36), the carriage reaches its column 1 position. By this time cam 184 has moved the arms 175, 176 into the intermediate position where arm 175 is in the path of the left edge of the first blank card but arm 176 is still clear. Between 250° and 270° the card strikes arm 175 and both arms 175, 176 move to their foremost position with the card between. The cams are so timed that the card strikes arm 175 at or very shortly after the 250° point in the cycle. The carriage return mechanism is disconnected by screw 366 at about the 240° point. Shaft 350 is restored to normal position by pin 353 between the 300° and 360° point. During this portion of the cycle the eject key is released by the action of latch 371 (Fig. 14), also the feed rollers 158, 159 are disengaged by the action of pin 171.

Contacts LCC1 open when the carriage starts to return at the 70° point in the eject cycle. Cam contacts CS4 open early in the eject cycle and break the circuit through relays R16 to R18 and cause solenoid ECS to become deenergized, but cam contacts CS3 keep relay R15 energized until close to the end of the cycle. The tabulating solenoid TS is deenergized when the contacts B of relay R17 open early in the cycle under the influence of contacts CS4.

When the eject cycle comes to an end the card carriage will occupy its column 1 position with an unpunched card between the arms 175, 176 which will occupy their foremost positions ready to push the card to the left when the carriage moves. The operator can now operate the numerical and letter keys to punch and print the card. The manner in which the punching, printing, and escapement mechanisms operate under manual control has been described.

Depression of the space bar 229 (Fig. 37) during manual punching operations causes space bar contacts SBC to close establishing a circuit as follows: Line wire W1 (Fig. 30b), contacts A of relay R15, wire W3, back space contacts BSC, space bar contacts SBC, escapement magnet EM, and last column contacts LCC2, to line wire W2. Energization of magnet EM (Fig. 9) operates the escapement mechanism as described in section X.

It will be assumed that when the carriage reaches a predetermined column position, say column 8, it is desired to tabulate the carriage to another column, say column 40. A No. 6 stop will be placed on bar 300 in the column 39 position before commencing operation of the machine. After column 7 has been punched the carriage will space to column 8 by the normal operation of the escapement mechanism and the operator will depress tabulating key 232 closing contacts TKC1, TKC2 (Fig. 12). The following circuits will be established: Line wire W1 (Fig. 30b), contacts A of relay R15, wire W3, back space contacts BSC, tabulating key solenoid TKS, also contacts C of relay R17 and tabulating solenoid TS, contacts TKC2, contacts A of relay R19, and contacts LCC2, to line wire W2. Solenoid TKS holds key 232 in depressed position so that contacts TKC1, TKC2 remain closed. Solenoid TS causes the escapement rack 194 to become disengaged from pinion 198 and the card carriage 174 will be drawn to the left by the spring drum 190 and tape 191 (Figs. 9 and 14). Also stop finger 303 will be raised into the path of the stop portion 302a of the No. 6 stop 302 in the 39th column position of rack 300.

Eventually the finger 303 will be struck by the stop portion 302a and will be forced to the left (Fig. 13) closing contacts SC and TEC. This action takes place when the carriage is between the 38th and 39th column positions. Contacts SC energize relay R19 causing its contacts A to open to deenergize solenoids TS and TKS, causing contacts B of relay R19 to close and establish a momentary holding circuit for relay R19 through contacts TKC1. The deenergization of tabulating solenoid TS permits springs 317, 318, 322 (Fig 14) to restore frame 315, stop finger 303, and solenoid plunger 310 to normal position, thereby releasing finger 303 from the No. 6 stop in column 39.

Contacts TEC energize escapement magnet EM by establishing the following circuit: Line wire W1 (Fig. 30b), contacts A of relay R15, wire W3, back space contacts BSC, contacts A of relay R18, tabulating escapement contacts TEC, magnet EM, and contacts LCC2, to line wire W2. The escapement magnet operates the escapement mechanism opening contacts EC while the card carriage is moving from the 38th to the 39th column position.

Deenergization of tabulating key solenoid TKS permits the tabulating key to return to normal position, reopening contacts TKC1, TKC2. Relay R19 becomes deenergized when contacts SC reopen due to the stop finger 303 being restored to normal position.

The operation of escapement magnet EM while the carriage is between the 38th and 39th column positions causes the pawl 203 to move to the left (Fig. 9) before the finger 303 is restored to normal position. When the finger 303 is finally disengaged from the No. 6 stop 302, the carriage, instead of moving approximately one-half a column space to the 39th column position, will move one and one-half spaces to the 40th column position.

It has been stated that the stops are not placed in the column position of bar 300 in which punching is to begin but instead, are placed in the last column position of a field to be skipped. This is contrary to the usual practice in the typewriter art and is done because it has been found by practical experience that certain misoperations of the automatic duplicating mechanism are likely to occur. For instance, when the machine is conditioned for automatic duplication preceded by automatic column skipping, the spreading of the brushes B0 to B12 by pressure on the master card may cause a strand or two of the brushes to project through one or more holes in the card while the carriage is in a position half-way between two successive column positions with finger 303 engaging a stop 302. This might cause undesired circuits to be established through the duplicating relays when solenoid TS is subsequently deenergized and contacts TSC reclose. In other words, it is possible that contacts TSC may reclose to establish duplicating circuits at the end of a field to be skipped before the carriage can move to the first column position of a field to be automatically duplicated. By stopping the carriage approximately one and one-half column spaces from the position at which duplicating is to commence and causing magnet EM to be energized to space the carriage the remaining distance, the contacts EC will be opened and prevent any duplicating circuits from being established until the carriage comes to rest exactly in the first column position of the field to be duplicated.

There is also a second possibility, that, even if the brushes do not spread sufficiently to do any harm, the magnet EM may be automatically energized when the brushes come to rest on the card material between the holes in two successive columns, thereby causing the carriage to stop in the second column of the field to be duplicated instead of the first. As will be explained more fully hereinafter, it is desirable to automatically space the carriage one space for each unpunched column in a field containing alphabetical data to be automatically duplicated. For this purpose a switch SS (Fig. 30b) is closed and its effect is to place magnet EM in series with contacts TSC. It will be seen that if TSC reclosed before the carriage started to move the half space that in ordinary tabulating mechanisms would be necessary to carry it to the first column position of a field to be automatically duplicated, magnet EM might be automatically energized to operate the escapement mechanism permitting the carriage to move one column space further than desired. This action is prevented by causing the last step of movement of the carriage during a tabulating operation to be effected by means of the escapement mechanism instead of by a direct tabulating movement in which a stop like 302 arrests the carriage in its ultimate position. As many No. 6 stops 302 may be placed on the bar 300 as desired.

When it is desired to back space the carriage, the operator will manipulate lever 401 (Fig. 19) as explained in Section XIV. This will cause the back space contacts BSC to open and interrupt the automatic duplicating circuits, the tabulating circuits, and the various circuits by which the escapement magnet EM is controlled. The brush magnet BM becomes deenergized (Fig. 28) thereby permitting the card sensing brushes B0 to B12 to drop before the carriage moves, thereby preventing damage to these brushes or tearing of the master card on the card table 420.

When the punching and printing operations on the card are completed it will be necessary to eject the completed card by feeding it into the hopper 77 and replace the punched card with another blank card. This may be done in two ways when the machine is operating under manual control.

If the carriage is left in a position other than the last column position when punching operations are completed, it is necessary to depress the eject key 233. This causes the machine to operate in exactly the same way as described in the beginning of this section. During the eject cycle the feed rollers 158, 159 will engage at about the 35° point in the cycle and feed the punched card into the hopper 77. As the card enters the hopper, spring finger 172 will warp the card forwardly causing the right hand upper corner of the card to snap forward when it clears the edge of plate 80 (Figs. 1 and 2) and prevent rebound of the card. The card flippers 94 then move forward to the position of Fig. 2 from 210° to 235° in the cycle (Fig. 36) forcing the card in front of shoulder or rib 99 (Fig. 2).

If holes are punched in the last column of the card, the eject cycle will be initiated automatically provided switches ESS and AES are in the positions of Fig. 30b. Contacts LCC1 close and LCC2 open when the carriage moves from the next-to-the-last column to the last column. When the appropriate key is operated to punch holes in the last column the machine will operate in the usual way so far as printing and punching are concerned but the escapement mechanism will be locked by the action of slide 394a and the carriage cannot move further to the left due to stop 367a.

During this last column punching and printing operation punch bail contacts PBC1 (Fig. 7) close and complete a circuit through contacts LCC1 to the relay R15 and eject key solenoid EKS. This causes the eject key 233 to be drawn downwardly closing contacts EKC. An eject cycle then takes place exactly as if key 233 had been depressed manually.

When eject stop switch ESS is open the closure of contacts LCC1 will have the same general effect as described above but clutch ECS will not be energized when contacts B of relay R18 close and the eject cycle will not take place. Instead the card carriage will remain stationary in the last column position. This feature makes it possible to insert master cards on table 420, as will be explained later in section XXVI.

XXIV—Automatic eject in a predetermined column

The machine may be caused to eject the cards automatically when the last punching operation is effected with the carriage in a position other than the last column position. This is accomplished by placing a No. 2 stop 302 on bar 300 in the column after the last one punched. Assume that the card punching operations are to end in column 35, for example. A No. 2 stop 302 is placed on bar 300 in the column 36 position and the automatic eject switch AES is placed in the dotted line position (Fig. 30b).

When the 35th column is punched, the card carriage will escape to the 36th column and cam lug 302b on the No. 2 stop 302 will strike the cam projection 387a of the lever 387 associated with contacts PEC (Figs. 23 and 24) causing these contacts to close. A circuit is then established through the solenoid EKS as follows: Line wire W1 (Fig. 30b), contacts CS4 and BMC2, solenoid EKS, switch AES, contacts PEC, and contacts CS1, to line wire W2. The eject key 233 is drawn down by solenoid EKS and the effect is the same as when the key is depressed manually. The sequence of operations will be the same as described in section XXIII except that relay R15 will be energized by closure of contacts B of relay R17.

XXV—Automatic tabulating

Entire fields comprising a plurality of columns may be skipped under control of a No. 1 stop placed in the first column position of a field to be skipped and a No. 6 stop in the last column position of a field to be skipped. Assume columns 40 to 50 are to be skipped. A No. 1 stop is placed in the column 40 position of rack 300 while a No. 6 stop is placed in the column 50 position.

When the carriage moves from the column 39 position to the column 40 position contacts ATC will be closed by the action of the lug 302b on the lever 387 associated with contacts ATC (Fig. 24). This has the same effect as a depression of key 232 and establishes a circuit as follows: Line wire W1 (Fig. 30b), contacts A of relay R15, wire W3, contacts BSC, solenoid TKS, also contacts C of relay R17 and solenoid TS, contacts ATC, and contacts CS1, to line wire W2. Energization of solenoid TS causes the carriage to move as described in section XXIII until the No. 6 stop in column 50 is effective to arrest the carriage, close contacts SC and TEC, and cause an operation of the escapement magnet EM.

When a single column is to be spaced, a No. 3 stop is placed in the desired column and switch SS is opened. Assuming column 10 is to be skipped, the carriage in moving from the column 9 position to the column 10 position will cause contacts SCC to close by the action of the cam lug 302b of the No. 3 stop on the associated lever 387. Also escapement contacts EC reclose as the carriage reaches the column 10 position completing a circuit as follows: Line wire W1 (Fig. 30b), contacts A of relay R15, wire W3, contacts BSC, contacts A of relay R18, wire W4, contacts TSC (Fig. 30a), contacts EC, wire W5, contacts SCC (Fig. 30b) magnet EM, and contacts LCC2, to line wire W2. Magnet EM operates the escapement mechanism as described in section X causing the carriage to move to the column 11 position.

Each time the tabulating solenoid TS operates contacts TSC open to prevent operation of the solenoids KSS while the carriage is moving through the column positions to be skipped. This will be made clearer in the following section.

XXVI—Automatic duplicating

It will be assumed that it is desired to automatically duplicate in a blank card the data in a field of a master card, say the field comprising columns 40 to 65, inclusive, some of the data being numerical, represented by a single hole in each column while other data is alphabetical and represented by two holes in each column.

It will be assumed that the card carriage is in its column 1 position to which it is moved after each eject cycle. In order to insert the master card it is necessary to move the carriage to the left to the last column position. This is done by opening eject stop switch ESS and depressing eject key 233 causing tabulating solenoid TS to be energized exactly as is described in section XXIII and the card carriage to move to the last column position, closing contacts LCC1. Since switch ESS is open contacts LCC1 will have no effect on eject clutch solenoid ECS so that shaft 100 and the card carriage will remain stationary. However, the eject key will remain in depressed position keeping contacts EKC closed. The master card is now slipped under door 431 between the pusher blocks 463. A No. 5 stop is placed in the column 40 position of bar 300 and a No. 4 stop in the column 66 position. A No. 4 stop is also placed in the column 1 position.

After the master card has been placed in proper position, door 431 is pushed down causing card lever contacts CLC and door contacts DC to close. Switch ESS is now reclosed, and, bearing in mind that contacts LCC1 and EKC are still closed, the eject clutch solenoid ECS will be energized and an eject cycle will be initiated causing the carriage to return to its column 1 position and a blank card to be fed into position between the arms 175, 176, exactly as described in section XXIII. Relay R15 is deenergized at the end of the eject cycle, when contacts EKC open as a consequence of release of the eject key, and, by the reclosure contacts A of relay R15, a circuit to energize brush magnet BM is established as follows: Line wire W1 (Fig. 30b), contacts A of relay R15, wire W3, contacts BSC, contacts A of relay R18, wire W4, brush magnet BM (Fig. 30a), and contacts DC and CLC, to line wire W2. The brushes CB and B0 to B12 are raised into contact with the underside of the first column of the master card.

The No. 4 stop in the first column energizes the relay R14 over a circuit as follows: Line wire W1 (Fig. 30b), contacts A of relay R15, wire W3, relay R14 (Fig. 30a), and contacts DSC1, to line wire W2. Contacts A of relay R14 close and establish a holding circuit for this relay through contacts DSC2 to line wire W2. Contacts B of relay R14 open and disconnect relays R0 to R12, the key selecting solenoids KSS, and brushes B0 to B12 from line wire W4 thus preventing their operation. The machine is now operated under manual control between columns 1 and 40 exactly as described in section XXIII. During this period brushes B0 to B12 will remain in contact with the master card but the presence of holes in one or more of columns 1 to 40 will have no effect as contacts B of relay R14 remain open.

The No. 5 stop in the column 40 position on bar 300 will cause contacts DSC2 to open at column 40, breaking the holding circuit for relay R14, which will permit its contacts B to close. Duplicating will commence automatically with column 40. Assume there is a hole in this column, say a "1" hole. When the carriage comes to rest in column 40 and contacts EC and PBC2 reclose, the brush B1 will be touching contact roll CR through the "1" hole and circuits will be established as follows: Line wire W1, contacts A of relay R15 (Fig. 30b), wire W3, contacts BSC, contacts A of relay R18, wire W4, contacts TSC, EC, and PBC2 (Fig. 30a), contacts B of relay R14, wire W6, key interlock contacts KIC, brush CB, contact roll CR, brush B1 through the "1" hole in the master card, cable C, relay R1, relay R13, wire W8, and relay R21 (Fig. 30b), to line wire W2. Relay R1 closes its contacts A to establish a holding circuit around the brush B1, from wire W10 (which is connected to wire W6), to the coil of said relay. Relay R1 also closes three sets of contacts B of which the lower set connects the solenoid KSS operating the "1" key to wire W10 and another circuit is established. This circuit extends from wire W10, solenoid KSS operating the "1" key, wire W9, contacts C of relays R0, R11, and R12, to line wire W2. Although the coils of the solenoids KSS operating the "A" and "J" keys are also connected to line wire W10 by relay R1, circuits are not established through these solenoids as contacts B of relays R12 and R11 are open. Thus only the "1" key is operated by its solenoid KSS and a "1" hole will be punched in column 40 of the blank card exactly as if the "1" key had been manually operated. During this punching operation escapement contacts EC (operated by escapement pawl 204) and punch bail contacts PBC2 open and break the circuit through relay R1 and solenoid KSS. The carriage escapes automatically to the column 41 position by the operation of bail 213. Relay R21 opens contacts in series with the escapement magnet and prevents its operation from causing a premature escapement of the carriage.

Assuming that the brushes B0 to B12 sense a combination of holes representing a letter of the alphabet, say "9" and "11" holes designating the letter "R", the operation of the machine will be as follows: The brushes B9 and B11 will establish parallel circuits through relays R9 and R11 exactly as was the case with relay R1. Relays R9 and R11 will close their contacts A and D, respectively, to establish parallel holding circuits as in the case of relay R1. Relay R11 will open its contacts C and close its contacts B. The relay R9 closes all its contacts B but establishes a solenoid selecting circuit as follows: Line wire W10, the contacts B of relay R9 associated with the "R" solenoid KSS, wire W11, contacts B of relay R11 and contacts C of relay R12, to line wire W2. The "R" key will be operated and an "R" printed in the blank card above "9" and "11" holes. The solenoids KSS for the "9", "I", and "Z" keys cannot be operated as contacts C of relay R11, B of relay R12, and B of relay R0 are all open. Solenoid KSS of the "11" key cannot be operated because the contacts of relay R13 disconnect wire W13 from contacts A of relay R11. If an "11" hole appears alone, the relay R13 will not be energized but contacts A of relay R11 will close to select the "11" solenoid KSS for operation, the circuit extending from line wire W10, contacts of relay R13, wire W13, contacts A of relay R11, "11" solenoid KSS, contacts B of relay R11, and contacts C of relay R12, to line wire W2: Wire W10 remains "live" only until the contacts EC and PBC2 open during the punching operation.

The system of connecting relays R1 and R9 and the upper two groups of solenoids KSS (Fig. 30a), comprising those associated with the I, J, and A keys in one group and 9, Z, R, I in the other, respectively, is followed in connecting the remaining solenoids KSS and relays R2 to R8 which are not shown in order to simplify the diagram.

The relays R2 to R8 are connected to brushes B2 to B8, wire W10, and solenoid R13 in exactly the same way as relays R1 and R9 are shown in Fig. 30a. The right hand leads of solenoids KSS for the numerical keys 2 to 8 are all connected to wire W9. The solenoids KSS for the letters S, T, U, V, W, X, Y are similarly connected directly to the wire W0 and are selectively controlled by different contacts B of the relays R2 to R8, respectively. The solenoids KSS for the letters K, L, M, N, O, P, Q, are connected to wire W11 and are also controlled by other contacts B of relays R2 to R8. Likewise to wire W12 are connected the coils of the solenoid KSS for the B, C, D, E, F, G, H keys and these solenoids are controlled by still other contacts B of relays R2 to R8.

This system will be easily understood by a specific example. The C solenoid KSS is connected to a pair of contacts B of relay R3 and to the wire W12 since this letter is represented by the combination of a "3" and a "12" hole (Fig. 26). The relay R3 is connected to wire W10 and relay R13 exactly like relay R9 in Fig. 30a. If the designations "R9" and "I", "R", "Z", "9" on the coils of the four solenoids KSS associated with relay R9 are changed to "R3" and "C", "L", "T", "3", respectively, it will be easily seen how the system is followed for the relays not shown.

XXVII—Blank column spacing

When alphabetical data such as names and addresses, descriptions of items, and the like are punched in the cards it is customary to separate the parts of a name or description by blank columns so that the parts of the name will be properly spaced when printed by the record controlled machine in which they are used. In order to duplicate alphabetical data in which such blank columns are likely to appear, it is necessary to provide some means for spacing the carriage automatically to bring the brushes B0 to B12 into register with the next punched column. Relays R20 and R21 control this automatic spacing.

Relay R20 is a slow acting relay, being much slower in action than the relays R0 to R12 while relay R21 is a high speed relay operating at least as fast as relays R0 to R12. Contacts EC close at the end of each operation of the escapement mechanism and tend to energize relay R20 by circuit as follows: Line wire W1 (Fig. 30b), contacts A of relay 15, wire W3, contacts BSC, contacts A of relay R18, wire W4, contacts TSC, EC, and PBC2 (Fig. 30a), contacts B of relay R14, wire W6, contacts KIC, wire W7, contacts CS2 (Fig. 30b), relay R20, wire W14, contacts DC and CLC (Fig. 30a), to line wire W2. At the same time the brushes B0 to B12 are connected to line wire W1 over part of the circuit just traced.

If there is no hole in the column sensed by the brushes, relay 21 will remain dormant and the contacts of relay R20 will close, energizing magnet EM by a circuit from wire W6, wire W10, switch SS, contacts of relay R21 and R20, magnet EM, and contacts LCC2, to line wire W2. Magnet EM operates the escapement once, causing contacts EC to open and deenergize relay R20 and the carriage will move one column space. When contacts EC reclose the same operations take place if the next column is blank. The carriage will be automatically spaced once for each unpunched column.

If there should be a hole in any column when the carriage comes to rest at the end of a previous column spacing or tabulating movement of the carriage, one at least of the relays R0 to R12 will be energized. Since all the relays R0 to R12 are in series with relay R21, the latter will be energized and will open its contacts before the contacts of relay R20 can close, thereby preventing magnet EM from operating. The contacts PBC and EC both operate whenever a hole is punched, the contacts EC remaining open until the carriage stops moving. This will deenergize both relays R20, R21 and keep them deenergized until the brushes are in registry with the next column of the master card.

*XXVIII.—Complete automatic operation*

It may be desired to duplicate cards without manual intervention, as where it may be desired to prepare several facsimile copies of cards in a file without manually controlling the machine to record data on the cards. In other words, the machine may be used as a gang punch.

This mode of operation is easily secured by setting appropriate stops 302 on the bar 300, and is more easily explained by specific examples, assuming that 80 column cards are used as master cards.

In one example, assume that the master card is to control the machine as follows:
Columns 1 to 10 are to be skipped.
Columns 11 to 30 are to be duplicated.
Column 31 of the master card has a hole but is to be skipped.
Columns 32 to 65 are to be duplicated.
Columns 66 to 72 are to be skipped.
Columns 73 to 76 are to be duplicated.
Card is to be automatically ejected at column 77.

Switch AES is placed in dotted line position and switch SS closed.

The stops 302 are set in bar 300 as follows:

Column 1—No. 1
Column 10—No. 6
Column 31—No. 3
Column 32—No stop
Column 66—No. 1
Column 72—No. 6
Column 77—No. 2

The stops are placed on bar 300 while the carriage is in the last column position as when the master card is placed on table 420. When switch ESS is reclosed an eject cycle will take place. Near the end of this cycle contacts CS1 reclose and, since contacts ATC are held closed by the No. 1 stop in the column 1 position, solenoid TS will be energized as shaft 100 comes to rest with the result that the card carriage will move to the left until the No. 6 stop strikes stop finger 303.

The relay R14 is deenergized during each eject cycle by the opening of contacts A of relay R15, and contacts B of relay R14 will always be closed when punching is resumed unless a No. 4 stop is in the column 1 position of bar 300. The No. 1 stop has the same effect as a No. 4 stop when the first column is not to be punched, but instead a field including column 1 is to be skipped, as contacts TSC open when solenoid TS is energized and prevent duplicating, regardless of the condition of relay R14. Thus, while the brushes B0 to B12 are in contact with the card and contacts B of relay R14 are energized during the tabulating movement of the carriage from the column 1 position to the column 11 position, contacts TSC are open and render the duplicating circuits ineffective. Contacts TSC reclose when the carriage reaches the column 11 position and solenoid TS is deenergized, thereby permitting duplicating to commence.

The No. 3 stop operates contacts SCC to establish a circuit as follows: Line wire W1 (Fig. 30b), contacts A of relay R15, wire W3, contacts BSC, contacts A of relay R18, wire W4, contacts TSC (Fig. 30a), contacts EC, wire W5, contacts SCC (Fig. 30a), magnet EM, and contacts LCC2, to line wire W2. Energization of magnet EM in this manner causes column 31 to be skipped automatically.

The No. 1 stop in column 66 causes energization of the tabulating solenoid TS by direct action of contacts ATC and the carriage will be tabulated to the column 73 position as previously described in section XXIII. Duplicating of columns 73 to 76 will take place and in column 77 the No. 2 stop will close contacts PEC. This closes a circuit through relays R16 to R18. Contacts A of relay R18 interrupt the duplicating circuits, contacts A of relay R17 and contacts B of relay R16 select the tabulating solenoid for operation causing contacts TSC to open and the carriage to move to the last column position. Last column contacts LCC1 then close and energize the clutch ECS. Relay R15 is energized through contacts B of relay R17. CS4 open shortly after and deenergize relays R16 to R18. Relay R15 opens its contacts A to deenergize relay R14. The eject cycle takes place exactly as if the eject key had been depressed. The energization of relay R18 causes the brushes B0 to B12 to drop, closing contacts BMC2 which, besides permitting energization of solenoid ECS, causes the energization of the eject key solenoid EKS which pulls down the eject key. This locks the keyboard and also establishes a momentary holding circuit for relays R16 to R18 and solenoids ECS, EKS, and TS. This circuit is broken when contacts CS4 open very soon after the shaft 100 starts to turn.

If in the above example, it had been desired to duplicate columns 1 to 30 instead of skipping columns 1 to 10, the Nos. 1 and 6 stops in the column 1 and column 10 positions would be omitted. Relay R14 is deenergized during each eject cycle by the opening of contacts A of relay R15, but the reclosure of the contacts of relay R14 when contacts CS3 open at the end of the eject cycle does not reenergize relay R14 but does reestablish the duplicating circuits through contacts A of relay R18. Thus the machine commences to duplicate as soon as or even slightly before the shaft 100 stops turning.

A No. 4 stop should be used to stop automatic tabulating movement which is to be followed by manual control of punching in order to ensure that the duplicating circuits will be broken before keys are operated. If previous to the tabulating movement, the machine had been under manual control with relay R14 energized, a No. 5 stop should be used to arrest tabulating movement and deenergize relay R14 to establish the duplicating circuits.

When duplicating is not desired but all data is to be recorded under manual control, latch 432 is released, permitting door 431 to rise and open contacts DC. This causes the brushes to drop closing contacts BMC1, BMC2. The dropping of the brushes prevents duplicating in spite of the fact that relay R14 may be deenergized.

Back space contacts BSC prevent damage to the brushes in back spacing operations by deenergizing brush magnet BM and permitting the brushes to drop.

Contacts BMC1, BMC2 are interlock contacts to prevent an eject cycle from starting before the brushes drop as the brushes would otherwise be damaged when the carriage is returned.

Contacts PBC1 prevent an eject cycle from taking place before the punches have been withdrawn from holes in the last column of the card. PBC2 prevent the duplicating circuits from being reestablished before the punches are withdrawn. When contacts DC are open the escapement magnet EM cannot be operated.

I claim:

1. In a machine of the class described, a recording element, a continually rotating actuator, an operating member for said element having a projection adapted to engage the actuator to operate said element, and an element pivotally mounted adjacent said projection and adapted to momentarily delay engagement of the projection with the actuator to compel positive engagement between the operating member and actuator.

2. In a machine for punching statistical record cards, a punch, a continually operating fluted driver, a punch operating member having a hook portion engageable with the flutes to operate the punch, and a member pivotally mounted adjacent said hook portion and adapted to momentarily delay engagement of the hook portion with the flutes when said hook portion and flutes tend to engage by point-to-point contact.

3. In a machine of the class described, a recording element, a power operated fluted driver, and an operating member connected to said element, said member being adapted to engage the flutes in the driver to operate the recording element and having part thereof adapted to be engaged by another flute to positively disengage said member from the driver after the recording element has been operated.

4. In a statistical card punching machine, a punch, a continually rotating fluted driver, and a punch operating member adapted to engage one of the flutes in the driver to operate the punch, and having a part thereof engageable with another flute to positively disengage said member from the driver after the punch has been operated.

5. In a machine for punching statistical records, a punch, a rotary power actuator, means engageable with the power actuator for operating the punch, means for drawing said engageable means into engagement with the actuator, a key normally holding the engageable means out of engagement with the actuator and adapted when operated to release the engageable means for engagement with the actuator, and means integral with the engageable means and adapted by engagement with the actuator to disengage the engageable means from the actuator.

6. In a machine for punching statistical record cards, a punch, a power operated fluted driver, a punch operating member connected to the punch and having a projection adapted to engage a flute in the driver to operate the punch, and an element carried by said member for preventing point-to-point engagement between said projection and a flute in the driver.

7. In a machine for punching statiscal record cards, a punch, a continually rotating driver, a punch operating member normally tending to engage the driver to operate the punch, a key for controlling engagement of said member with said driver, means on said member engageable with the driver whereby the driver positively disengages the member after the punch has been operated, means operated by said driver for positively restoring said member after each punch operation, and means controlled by the key for preventing reengagement of said member with the driver while said member is being restored.

8. In a machine of the class described, a recording device, a continually rotating driver having a rib, an operating member for said device having a projection positively engageable with said rib whereby said driver operates said device, and an element carried by said member for compelling positive engagement between said projection and rib.

9. In a machine of the class described, a device to be operated, a power actuator, means engageable with said actuator for operating said device, means tending to engage said member with said actuator for operation by the latter, releasable means for preventing such engagement, and means carried by the engageable means and operated by said actuator for positively disengaging said engageable means from the actuator.

10. In a machine for punching statistical record cards, a power operated driver, a punch, a punch operating hook having a tooth adapted to engage the driver to operate the punch, and a lug formed in said hook and engageable with the driver to positively release the hook from engagement with the driver.

11. In a machine of the class described, a rotary power actuator having at least two operating projections, a device to be operated by said actuator, an operating member connected to said device and having a part adapted to engage one of the projections in the actuator for operating said device, and means on said hook engageable by the other projection for positively disengaging the member from the first named projection.

12. In a machine of the class described having recording mechanism, a keyboard for manually controlling the recording mechanism, a master card and means controlled by the master card for controlling the recording mechanism, and means controlled by the keyboard for preventing operation of the master card controlled means when the recording mechanism is manually controlled.

13. In a machine of the class described, recording elements, a series of keys for manually selectively controlling the operation of said elements; a master card and means controlled by said card for controlling the operation of the recording elements automatically and independently of the keys, a bail common to said keys and operated whenever a key is manually operated, and means operated by said bail for preventing operation of the card controlled means.

14. In a machine of the class described, recording means, a series of keys for selectively controlling the recording means, automatic duplicating mechanism adapted to control said recording means, and means controlled by said keys for rendering the automatic duplicating mechanism inoperable when a key is manually operated.

15. In a machine of the class described, recording mechanism, a master card, a series of sensing devices for sensing data designations in the master card, a series of control circuits each associated with a sensing device, means controlled by said circuits for selectively operating the recording mechanism in accordance with said designations, a series of keys for manually controlling the recording mechanism, and means controlled by said keys for interrupting said circuits when a key is operated.

16. In a machine of the class described, a master card, a series of sensing elements adapted to sense data designations in said card, a movable carrier for said elements, means for moving the carrier to a position wherein said elements may sense said designations, a master card lever engageable by the master card when it is in position to be sensed by said elements, and means controlled by said card lever for preventing operation of the moving means when the master card is not in position to be sensed by said elements.

17. In a machine of the class described, a master card sensing device including a contact roll and a series of brushes adapted to sense data designations in a master card between said brushes and contact roll, a movable carrier for said brushes, electromagnetic means for moving the carrier in a direction whereby said brushes press the master card against the contact roll for designation sensing purposes, card lever contacts controlling the electromagnetic means, and a card lever operated by the master card and adapted to permit said contacts to open when the master card is absent or not in its proper position between the brushes and contact roll.

18. In a machine of the class described, perforating mechanism, power means for operating the perforating mechanism including a series of trip levers for selectively controlling the operation of the perforating mechanism, a master card sensing device, a selective relay system controlled by said device, and electromagnetic means associated with said trip levers and controlled by said relay system for selectively controlling the perforating mechanism.

19. In a machine of the class described, a card carriage, escapement mechanism for causing step-by-step feeding movement of the carriage, recording mechanism for recording on a card in said carriage one character at a time, power means for operating the recording mechanism including an operating connection to the escapement mechanism to operate the latter each time a character is recorded, a keyboard including character keys for controlling the power means and a space bar, and electromagnetic means controlled by the space bar for operating the escapement mechanism independently of the power means.

20. In a machine of the class described, a card carriage, means for returning the carriage, a rebound rack on said carriage and a rebound pawl normally engaging said rack to prevent return movement of the carriage, and means controlled by said carriage return mechanism for disengaging said pawl when the carriage is returned.

21. In a machine of the class described, a card carriage, tabulating mechanism for the carriage, a rebound trap associated with said mechanism comprising a rack and a pawl engaging said carriage to prevent reverse movement of the carriage during tabulation of the carriage, carriage return mechanism for effecting reverse movement of the carriage including a tape connected to the carriage, and a member rockable to disengage the pawl from the rack to permit reverse movement of the carriage, said member being engaged by the tape and rocked by tension applied to the tape.

22. In a machine of the class described, a card carriage, a rebound trap comprising a rack mounted in the carriage, and a pawl normally engaging the rack to prevent rebound of the carriage, a feed rack mounted in the carriage, a member movable parallel with the carriage, a back space pawl carried by said member and adapted to reversely feed the carriage when the member is moved, means on said member for disengaging said pawl when the member is moved, and means for moving said member to back space the carriage.

23. In a machine of the class described, a card carriage, tabulating mechanism for said carriage including an electromagnet for operating said mechanism and a control circuit for said magnet, back space mechanism operable to back space the carriage, and means controlled by the back space magnet for interrupting said circuit during back spacing operations.

24. In a machine of the class described, a card carriage, tabulating mechanism for said carriage, means for controlling said mechanism, back space mechanism for said carriage, and means controlled by the back space mechanism for rendering the controlling means ineffective during back spacing operations.

25. In a machine of the class described, a card carriage, recording mechanism operable to record data on a blank card fed by said carriage, a master card, means controlled by the master card for automatically operating the recording mechanism to duplicate on the blank card data appearing on the master card, back spacing mechanism for said carriage, and means controlled by said back spacing mechanism for disabling the operating means during a back spacing operation.

26. In a machine of the class described, a carriage adapted to feed both a blank card and a perforated master card, a series of sensing elements adapted to be projected through data designating holes in the master card, retractible means for supporting said elements, back spacing mechanism operable to back space both cards a predetermined distance for each operation of said mechanism, and means controlled by the back space mechanism for retracting the retractible means during back spacing operation.

27. In a machine of the class described, a card carriage; feed mechanism for said carriage including a spring motor, a feed rack on said carriage, and escapement mechanism having a feed pinion normally meshing with said rack; a stop bar on said carriage having a tabular stop, a movable stop having a primary movement to a position adapted to engage the tabular stop in the course of tabulating movement of the carriage, and a secondary movement when the tabular stop strikes said movable stop, an electromagnet for disengaging said rack from said pinion and effecting primary movement of the movable stop, a control circuit with means for energizing said magnet and retaining it in energized condition while the spring motor is feeding the carriage, and means controlled by the secondary movement of the movable stop for deenergizing said magnet.

28. In a machine of the class described, a card carriage, a stop bar on said carriage, stops settable on said bar, automatic eject mechanism adapted to remove cards from the carriage, and means controlled by one of said stops for automatically initiating operation of the eject mechanism.

29. In a machine of the class described, a card carriage, a stop bar and a stop settable along said bar, automatic eject mechanism including means for removing a card from the carriage and means for stacking said card after it has been removed, a control circuit for said eject mechanism including an electromagnetic device for initiating operation of the eject mechanism, and a control device for said circuit actuated by said stop through relative movement between the stop bar and said device.

30. In a machine of the class described, a card carriage, feed mechanicm for moving the carriage one space at a time including escapement mechanism, an electromagnet for operating the escapement mechanism, a stop bar on the carriage having stops adjustable along said bar for controlling the operation of the machine, and a machine controller selectively actuated by said stops in the course of movement of the carriage and controlled by a predetermined stop to energize said magnet whereby to automatically space the carriage a single space.

31. In a machine of the class described, a punch, a continually rotating actuator, an operating member connected to the punch, a spring normally tending to draw the operating member into engagement with the actuator, a trip lever normally holding the operating member out of engagement with the actuator, means operated by said actuator for positively restoring said operating member to the control of the trip lever after each operation of said member by the actuator, and means associated with the trip lever for preventing reengagement of said member and actuator while the operating member is being restored to the control of the trip lever.

32. In a machine of the class described the combination of a recording element, a continually operating power actuator, operating means connected to said element and adapted to positively engage said actuator to operate said element, means normally tending to engage the operating means with the actuator, releasable means for holding said operating means out of engagement with the actuator, means for positively restoring the operating means to the control of the releasable means, and an element associated with said releasable means for preventing reengagement between the actuator and operating means before the latter is restored to control the releasable means.

33. In a machine of the class described, a card carriage, means to feed said carriage including escapement mechanism, a stop bar mounted in the carriage, a pair of column stops adjustable along said bar to mark the limits of a tabulating zone, a stop movable into the path of the tabular stops and having a limited movement in the line of travel of said stops, an electromagnet for moving said movable stop into the path of the column stops and releasing the carriage from the control of the escapement, a control circuit for said magnet, means in said circuit and controlled by one of said stops for energizing the magnet, and means controlled by the second named movement of the movable stop by the other column stop for deenergizing said magnet to restore the carriage to the control of the escapement.

34. In a machine of the class described, a card carriage, means tending to feed said carriage including escapement mechanism, a stop bar mounted in the carriage, a pair of column stops adjustable along said bar to mark the limits of a tabulating zone, a stop movable into the path of the tabular stops and having a limited movement in the line of travel of said stops, an electromagnet for moving said movable stop into the path of the column stops and releasing the carriage from the escapement, a control circuit for said magnet, means in said circuit and controlled by one of said stops for energizing the magnet, and means controlled by movement of the movable stop by the other column stop for deenergizing said magnet to restore the carriage to the control of the escapement, and means controlled by the movable stop for actuating the escapement when the column stop strikes the movable stop.

35. In a machine of the class described, a card carriage, eject mechanism operable to remove a card from the carriage, a stop bar on the carriage, column stops settable along the stop bar one of which is effective to initiate an eject cycle at a predetermined point in the travel of the carriage, tabulating mechanism controlled by others of said stops including a stop finger moved into the path of said stops when a tabulating operation takes place, means controlled by the reject cycle initiating stop for initiating an operation of the tabulating mechanism prior to ejection of a card whereby to cause the card to be brought into the control of the eject mechanism, and means for preventing movement of the movable stop into the path of the column stops while the eject mechanism is operating.

36. In a machine of the class described, a card feeding carriage, a stop bar mounted in the carriage, column stops variably settable on said bar, a machine control device selectively actuated by said stops, automatic eject mechanism for cards fed by said carriage, and means controlled by said device when actuated by a predetermined stop in a predetermined column for initiating an operation of the eject mechanism.

37. In a machine of the class described, a card feeding carriage, a card hopper, means for transferring a card from said hopper to the control of said carriage, a stop bar on the carriage, a column stop variably settable along said bar, a machine control device actuated by said stop during the course of movement of the carriage, and means controlled by said device for initiating operation of the transferring means.

38. In a machine of the class described, a card carriage, a stop bar on the carriage, column stops on said bar, tabulating mechanism including a stop movable into the path of the column stops, automatic eject mechanism, a key for initiating operation of both the tabulating and eject mechanism, and means controlled by said key for preventing movement of the movable stop.

39. In a machine of the class described, a card carriage, a rebound rack, a rebound pawl engaging said rack to prevent rebound of the carriage, carriage return mechanism, means for initiating operation of said mechanism, means actuated by said return mechanism for disengaging said pawl, a latch for returning the disengaging means in pawl disengaging position, and means on the carriage for releasing said latch when the carriage is fully returned.

40. In a machine of the class described, a power operated actuator having two abutments, a recording element, and an operating member for said element adapted to engage one of the abutments to operate the element, said member having a part thereof engageable with the other abutment for the purpose of disengaging said member from the first abutment during the course of the operation of said member by the actuator.

41. In a machine of the class described, a recording element, a power operated actuator having a pair of projections, and an actuating member for said element having a projection engageable with one of the projections on the actuator whereby to positively operate said element and a second projection engageable with the other projection on the actuator for positively disengaging said member from the actuator during the course of the operation of said element.

42. In a machine of the class described, a recording element, a power actuated driver having a rib, an operating member connected to said element and having a part adapted to positively engage said rib to actuate said element, and an element adapted to prevent point to point engagement between said rib and said part.

43. In a machine of the class described, a power operated actuator having two abutments, a device to be operated, and an operating member for said device adapted to engage one of the abutments to operate said device, said member being also adapted to be engaged by the other abutment during the operation of said device to positively disengage said member from the first abutment.

44. In a machine of the class described, a master card table having a guide channel for the master card, a member movable to a position to hold the master card in said channel, a contact roll carried by said member and adapted when the member is in operative position to hold the master card in the channel, a series of master card sensing elements, a carrier for said elements, means for moving the carrier whereby said elements are brought to a position to cooperate with said roll to sense data designations in the master card; a card lever coacting with said roll to sense the presence of a master card, said card lever being actuated by the master card when the movable member is operated with a master card in said channel; means controlled by said movable member for causing operation of the moving means, and means operated by the card lever for preventing operation of the moving means when the master card is displaced from said channel or absent.

45. In a machine for punching statistical record cards, a series of differently valued punches, a rotary power actuator, a series of punch operating members engageable with said actuator to operate the punches, a series of trip levers selectively operable to control engagement of said members with the actuator, a master card sensing device, a selective relay system controlled by said device, and a series of differently valued electromagnets each associated with a trip lever for operating said trip levers selectively under control of said relay system.

46. In a power drive mechanism, a power actuator, recording mechanism, means engageable with the power actuator for operating the recording mechanism, and a device for preventing impositive engagement of the engageable means with said actuator.

47. In a power drive mechanism, a power actuator, a member engageable with said actuator for operation by the latter, and means whereby said actuator positively disengages said member from said actuator.

48. In a machine of the class described, printing mechanism, power means for operating said mechanism including a series of selectively operable control devices for controlling the operation of the printing mechanism by the power means, means to sense data designations in a master record, a selective relay system controlled directly by said sensing means, and electro-magnetic means for operating the selectively operable devices and controlled by the sensing means through said relay system.

49. In a machine of the class described, a device to be operated, a power actuator, operating means engageable with said actuator for operating said device, and means mounted on the engageable means for delaying positive engagement between the actuator and the engageable means when the relation between said actuator and engageable means is unfavorable for positive operation of the engageable means by the actuator.

50. In a machine of the class described, a power operator; means engageable with said operator for operation by the latter, and means to prevent impositive operation of the engageable means by the power operator.

51. In a machine of the class described, a device to be operated, a power actuator, means engageable with said actuator for operating said device, means for controlling the engagement of the engageable means with said actuator, and means associated with the engageable means and engaged by said actuator for positively disengaging the engageable means from said actuator after said device has been operated.

52. In a machine of the class described, a device to be operated, a power actuator, means engageable with said actuator for operating said device, means to control the engagement of the engageable means with the actuator, means whereby said actuator first positively disengages the engageable means from said actuator and thereafter positively restores said engageable means, and means for preventing reengagement of said engageable means with the actuator while the latter is restoring the engageable means.

53. In a machine controlled by statistical record cards, a card printing mechanism, power means to operate the printing mechanism, selecting means for controlling the operation of the printing mechanism, means for sensing data designations in a card, and electromagnetic means controlled by the sensing means for actuating the selecting means.

54. In a machine of the class described, power operated typewriting mechanism, selective means for controlling the printing of characters by said mechanism, means to feed a statistical card to said mechanism, statistical card sensing means, and means controlled by the sensing means for selectively operating the selecting means.

55. In a machine for printing data on statistical record cards, means to typewrite data along one edge of the card, power means to operate the typewriting means, statistical card sensing means, and means controlled by the sensing means for selectively controlling the typewriting means.

56. In a machine of the class described, a card carriage, means to sense record cards fed by said carriage, means to move the sensing means into co-operation with the record card, back-space mechanism for said carriage, and means controlled by the back-space mechanism for preventing operation of the moving means.

57. In a machine of the class described, means normally effective to sense a record card, a carriage for feeding the card to the sensing means, means to back-space said card, and means associated with the back-space mechanism for preventing the sensing means from having its normal effect when the carriage is back-spaced.

58. In a machine of the class described, a card carriage, a circuit controller comprising a plurality of switching devices each of which controls a different type of machine operation; a stop bar, said stop bar and circuit controller being moved relative to each other in response to movement of the carriage; and column stops manually variably settable along said bar, said stops being adapted to selectively operate the switching devices as the carriage moves whereby the moving carriage automatically controls the type of machine operation.

59. In a machine of the class described, a group of control circuits for causing several different types of machine operations, a circuit controller for rendering said circuits effective and ineffective selectively, a carriage; a stop bar, said stop bar and circuit controller being movable relative to each other as the carriage moves; and column stops manually variably settable along said bar and operative as the carriage moves to variably actuate the circuit controller whereby movement of the carriage automatically controls the operation performed by the machine.

60. In a machine of the class described, tabulating mechanism including a series of column stops and a movable stop projectable into the path of the column stops, eject mechanism, and means for locking the movable stop out of the path of the column stops during operation of the eject mechanism.

61. In a machine of the class described, tabulating mechanism including a series of column stops and a stop movable into the path of the column stops, eject mechanism, means to initiate operation of the eject and tabulating mechanisms, and means for preventing said movable stop from moving into the path of the column stops while the eject mechanism is in operation.

62. In a machine of the class described, a carriage, a rebound trap for said carriage, carriage return mechanism, means operated by said mechanism for disabling the rebound trap, and means actuated by the carriage for releasing said disabling means at substantially the end of the return movement of the carriage.

63. In a machine of the class described, a card carriage, a support; a machine control device, said device and said support being moved relative to each other in step with movement of the carriage, means controlled by said device for removing cards from the carriage, and a column stop variably settable along said support and adapted to actuate said device to initiate operation of the removing means.

64. In a machine of the class described, a card carriage, a support; a machine control device, said device and support being moved relative to each other in step with movement of the carriage, means for placing a card under control of the carriage, and a column stop variably settable along said support and adapted to actuate said device to initiate operation of the removing means.

65. In a machine of the class described, a card carriage; feed mechanism for said carriage including a spring motor, a feed rack on said carriage, and escapement mechanism having a feed pinion normally meshing with said rack; a stop bar on said carriage having a tabular stop, a movable stop having a primary movement to a position adapted to engage the tabular stop in the course of tabulating movement of the carriage, and a secondary movement when the tabular stop strikes said movable stop, an electromagnet for disengaging said rack from said pinion and effecting primary movement of the movable stop, a control circuit with means for energizing said magnet and retaining it in energized condition while the spring motor is feeding the carriage, and means controlled by the secondary movement of the movable stop for deenergizing said magnet.

66. In a machine of the class described, a card carriage, a stop bar and a stop settable along said bar, automatic eject mechanism including means for removing a card from the control of the carriage and means for stacking said card after it has been removed, a control circuit for said eject mechanism including an electromagnetic device for initiating operation of the eject mechanism, and a control device for said circuit actuated by said stop through relative movement between the stop bar and said device.

67. In a machine of the class described, a card carriage, feed mechanism for moving the carriage one space at a time including escapement mechanism, an electromagnet for operating the escapement mechanism, a stop bar on the carriage having stops adjustable along said bar for controlling the operation of the machine, and a machine controller selectively actuated by said stops in the course of movement of the carriage and controlled by a predetermined stop to energize said magnet whereby to automatically space the carriage a single space.

68. In a machine of the class described, a card carriage, means to feed said carriage including escapement mechanism, a stop bar mounted in the carriage, a pair of column stops adjustable along said bar to mark the limits of a tabulating zone, a stop movable into the path of the tabular stops and having a limited movement in the line of travel of said stops, an electromagnet for moving said movable stop into the path of the column stops and releasing the carriage from the control of the escapement, a control circuit for said magnet, means in said circuit and controlled by one of said stops for energizing the magnet, and means controlled by the second named movement of the movable stop by the other column stop for deenergizing said magnet to restore the carriage to the control of the escapement.

69. In a machine of the class described, a card carriage, means tending to feed said carriage including escapement mechanism, a stop bar mounted in the carriage, a pair of column stops adjustable along said bar to mark the limits of a tabulating zone, a stop movable into the path of the tabular stops and having a limited movement in the line of travel of said stops, an electromagnet for moving said movable stops into the path of the column stops and releasing the carriage from the escapement, a control circuit for said magnet, means in said circuit and controlled by one of said stops for energizing the magnet, and means controlled by movement of the movable stop by the other column stop for deenergizing said magnet to restore the carriage to the control of the escapement, and means controlled by the movable stop for actuating the escapement when the column stop strikes the movable stop.

70. In a machine of the class described, a card carriage, eject mechanism operable to remove a card from the carriage, a stop bar on the carriage, column stops settable along the stop bar one of which is effective to initiate an eject cycle at a predetermined point in the travel of the carriage, tabulating mechanism controlled by others of said stops including a stop finger moved into the path of said stops when a tabulating operation takes place, means controlled by the eject cycle initiating stop for initiating an operation of the tabulating mechanism prior to ejection of a card whereby to cause the card to be brought into the control of the eject mechanism, and means for preventing movement of the movable stop into the path of the column stops while the eject mechanism is operating.

ALBERT W. MILLS.